US008812482B1

(12) United States Patent
Kapoor et al.

(10) Patent No.: US 8,812,482 B1
(45) Date of Patent: Aug. 19, 2014

(54) APPARATUSES, METHODS AND SYSTEMS FOR A DATA TRANSLATOR

(76) Inventors: Vikas Kapoor, New York, NY (US);
Abhilash Madhavarapu, Nutley, NJ (US)

( * ) Notice: Subject to any disclaimer, the term of this patent is extended or adjusted under 35 U.S.C. 154(b) by 20 days.

(21) Appl. No.: 12/904,676

(22) Filed: Oct. 14, 2010

Related U.S. Application Data

(63) Continuation-in-part of application No. 12/763,320, filed on Apr. 20, 2010, which is a continuation of application No. 12/650,542, filed on Dec. 31, 2009, now abandoned, application No. 12/904,676, which is a continuation-in-part of application No. 12/760,948, filed on Apr. 15, 2010, which is a continuation of application No. 12/650,493, filed on Dec. 30, 2009, now abandoned, application No. 12/904,676, which is a continuation-in-part of application No. 12/762,570, filed on Apr. 19, 2010, which is a continuation of application No. 12/650,442, filed on Dec. 30, 2009, now abandoned, application No. 12/904,676, which is a continuation-in-part of application No. 12/763,331, filed on Apr. 20, 2010, which is a continuation of application No. 12/650,530, filed on Dec. 30, 2009, now abandoned, application No. 12/904,676, which is a continuation-in-part of application No. 12/762,577, filed on Apr. 19, 2010, which is a continuation of application No. 12/650,548, filed on Dec. 31, 2009, now abandoned.

(60) Provisional application No. 61/252,611, filed on Oct. 16, 2009.

(51) Int. Cl.
*G06F 17/30* (2006.01)

(52) U.S. Cl.
USPC ........... 707/713; 707/706; 707/722; 707/736; 707/758; 707/781; 705/75; 705/30; 709/213; 709/217; 726/26; 379/114.14

(58) Field of Classification Search
USPC ................ 707/706, 713, 722, 736, 758, 781, 707/999.003, 999.004, 999.005; 709/213, 709/217; 705/75, 30; 379/114.14; 726/26
See application file for complete search history.

(56) References Cited

U.S. PATENT DOCUMENTS

| | | |
|---|---|---|
| 5,436,965 A | 7/1995 | Grossman et al. |
| 5,442,780 A | 8/1995 | Takanashi et al. |
| 5,594,791 A | 1/1997 | Szlam et al. |
| 5,802,161 A | 9/1998 | Svoronos et al. |
| 5,848,415 A | 12/1998 | Guck |
| 5,911,776 A | 6/1999 | Guck |
| 6,026,233 A | 2/2000 | Shulman et al. |
| 6,094,684 A | 7/2000 | Pallmann |
| 6,098,052 A | 8/2000 | Kosiba et al. |
| 6,233,584 B1 | 5/2001 | Purcell |
| 6,311,323 B1 | 10/2001 | Shulman et al. |
| 6,381,599 B1 | 4/2002 | Jones et al. |

(Continued)

*Primary Examiner* — Syling Yen
(74) *Attorney, Agent, or Firm* — Chadbourne & Parke LLP

(57) ABSTRACT

The APPARATUSES, METHODS AND SYSTEMS FOR A DATA TRANSLATOR ("Data-Translator") implement an application on a computerized system, whereby the Data-Translator may collect consumer account information from a variety of data sources, arrange the collected data to score each consumer with regard to their contactability, and devise consumer-specific contact strategies for automatic execution. In one embodiment, the Data-Translator may translate imported consumer data updates into a format complying with existing consumer data records in the database, and incorporate the updates into the related consumer data records.

17 Claims, 65 Drawing Sheets

(56) References Cited

U.S. PATENT DOCUMENTS

| | | |
|---|---|---|
| 6,460,043 B1 | 10/2002 | Tabbara et al. |
| 6,480,842 B1 | 11/2002 | Agassi et al. |
| 6,571,245 B2 | 5/2003 | Huang et al. |
| 6,643,635 B2 | 11/2003 | Nwabueze |
| 6,654,806 B2 | 11/2003 | Wall et al. |
| 6,952,714 B2 | 10/2005 | Peart |
| 7,155,433 B2 | 12/2006 | Lasken et al. |
| 7,191,150 B1 | 3/2007 | Shao et al. |
| 7,222,130 B1 | 5/2007 | Cras et al. |
| 7,284,005 B1 | 10/2007 | Wiryawan et al. |
| 7,318,049 B2 | 1/2008 | Iannacci |
| 7,379,934 B1 | 5/2008 | Forman et al. |
| 7,505,985 B2 | 3/2009 | Kilroy |
| 7,516,403 B1 | 4/2009 | Fisher et al. |
| 7,519,553 B2 | 4/2009 | Abe et al. |
| 7,536,348 B2 | 5/2009 | Shao et al. |
| 7,586,901 B2 | 9/2009 | Jhingan |
| 7,596,573 B2 | 9/2009 | O'Neil et al. |
| 7,603,378 B2 | 10/2009 | Ivanova |
| 7,730,003 B2 | 6/2010 | Pinto et al. |
| 7,756,789 B2 | 7/2010 | Welker et al. |
| H2252 H | 1/2011 | Bohanan et al. |
| 7,870,153 B2 | 1/2011 | Croft et al. |
| 7,954,150 B2 | 5/2011 | Croft et al. |
| 8,005,981 B2 | 8/2011 | Tuck et al. |
| 8,051,180 B2 | 11/2011 | Mazzaferri et al. |
| 8,219,518 B2 | 7/2012 | Jin et al. |
| 2002/0062249 A1 | 5/2002 | Iannacci |
| 2002/0120462 A1 | 8/2002 | Good |
| 2002/0128960 A1 | 9/2002 | Lambiotte et al. |
| 2002/0145051 A1* | 10/2002 | Charrin .......................... 235/492 |
| 2003/0158767 A1* | 8/2003 | Nwafor et al. .................... 705/7 |
| 2003/0177356 A1 | 9/2003 | Abela |
| 2003/0195950 A1 | 10/2003 | Huang et al. |
| 2004/0019652 A1* | 1/2004 | Freimuth et al. ............... 709/213 |
| 2004/0044604 A1 | 3/2004 | O'Neil |
| 2004/0083199 A1 | 4/2004 | Govindugari et al. |
| 2004/0220907 A1* | 11/2004 | Camarillo .......................... 707/3 |
| 2005/0214782 A1 | 9/2005 | Chen et al. |
| 2005/0234878 A1 | 10/2005 | Dettinger et al. |
| 2006/0031547 A1 | 2/2006 | Tsui et al. |
| 2006/0070131 A1 | 3/2006 | Braddy et al. |
| 2006/0106735 A1* | 5/2006 | Bartz et al. ...................... 705/75 |
| 2006/0167711 A1 | 7/2006 | Chakraborty et al. |
| 2007/0093342 A1 | 4/2007 | Pesiridis et al. |
| 2007/0156557 A1 | 7/2007 | Shao et al. |
| 2007/0169042 A1 | 7/2007 | Janczewski |
| 2008/0005197 A1 | 1/2008 | Chang et al. |
| 2008/0018649 A1 | 1/2008 | Yuan et al. |
| 2008/0208906 A1 | 8/2008 | Penner |
| 2008/0222027 A1 | 9/2008 | Megdal et al. |
| 2008/0244689 A1 | 10/2008 | Dalton |
| 2008/0275800 A1 | 11/2008 | Abe et al. |
| 2008/0288448 A1 | 11/2008 | Agredano et al. |
| 2009/0043840 A1 | 2/2009 | Cherukuri et al. |
| 2009/0106846 A1* | 4/2009 | Dupray et al. .................... 726/26 |
| 2009/0172000 A1 | 7/2009 | Lavdas et al. |
| 2009/0248573 A1 | 10/2009 | Haggerty et al. |
| 2009/0276341 A1* | 11/2009 | McMahan et al. ............... 705/30 |
| 2010/0287093 A1 | 11/2010 | He et al. |
| 2010/0318992 A1 | 12/2010 | Kushwaha et al. |
| 2012/0185515 A1 | 7/2012 | Ferrel et al. |

\* cited by examiner

FIGURE 5C

| Score 550 | Variable 551 | Coefficient 552 | Std.Err. 553 | z 554 | P>z 555 | Input 556 | Coeff*Input 557 |
|---|---|---|---|---|---|---|---|
| 0.1619962 | ln(Consumer-phone Dial Attempts) | -0.585 | 0.006 | -104.590 | 0.000 | 10 | -1.402 |
| 5 60 | Consumer dial Attempt 0-5 | 0.000 | - | - | - | | 0.000 |
| | Consumer dial Attempt 5-15 | -0.175 | 0.012 | -14.540 | 0.000 | 1 | -0.175 |
| | Consumer dial Attempt 15-25 | -0.428 | 0.016 | -26.620 | 0.000 | | 0.000 |
| | Consumer dial Attempt 25-100 | -0.662 | 0.019 | -35.320 | 0.000 | | 0.000 |
| | Consumer dial Attempt 100-250 | -0.965 | 0.029 | -33.850 | 0.000 | | 0.000 |
| | Consumer dial Attempt 250> | -1.139 | 0.041 | -27.640 | 0.000 | | 0.000 |
| 5 62 | Prior_rpc_count=0 ( Consumer Phone) | 0.000 | - | - | - | | 0.000 |
| | Prior rpc count=1 | 1.326 | 0.020 | 67.630 | 0.000 | | 0.000 |
| | Prior rpc count=2 | 1.856 | 0.021 | 86.610 | 0.000 | 1 | 1.856 |
| | Prior rpc count=3 | 2.247 | 0.024 | 93.060 | 0.000 | | 0.000 |
| | Prior rpc count=4 | 2.603 | 0.028 | 92.880 | 0.000 | | 0.000 |
| | Prior rpc count=5 | 2.850 | 0.034 | 84.870 | 0.000 | | 0.000 |
| | Prior rpc count>5 and <10 | 3.334 | 0.030 | 112.050 | 0.000 | | 0.000 |
| | Prior rpc count>9 and <16 | 4.062 | 0.041 | 97.910 | 0.000 | | 0.000 |
| | Prior rpc count>15 and <21 | 4.557 | 0.069 | 66.030 | 0.000 | | 0.000 |
| | Prior rpc count >20 | 5.065 | 0.074 | 68.820 | 0.000 | | 0.000 |

| Score | Variable | Coefficient | Std. Err. | z | P>z | Input | Coef*Input |
|---|---|---|---|---|---|---|---|
| 5.63 | Prior unreachable count=0 | | | | | | 0.000 |
| | Prior unreachable count>=1 | -1.046 | 0.041 | -25.410 | 0.000 | 0 | 0.000 |
| | Prior other party count=0 | | | | | | 0.000 |
| | Prior other party count>=1 | 0.528 | 0.009 | 58.640 | 0.000 | 1 | 0.528 |
| 5.65 | Prior busy count=0 | 0.000 | - | - | - | | 0.000 |
| | Prior busy count=1 | 0.130 | 0.013 | 10.220 | 0.000 | | 0.000 |
| | Prior busy count=2 | 0.048 | 0.022 | 2.230 | 0.026 | | 0.000 |
| | Prior busy count=3 | 0.089 | 0.032 | 2.770 | 0.006 | 1 | 0.089 |
| | Prior busy count>=4 | -0.068 | 0.026 | -2.620 | 0.009 | | 0.000 |
| | CLIENT AND LEXUS AND EXPERIAN | 0.000 | - | - | - | | 0.000 |
| | CLIENT AND LEXUS | 0.120 | 0.110 | 1.090 | 0.276 | | 0.000 |
| | CLIENT AND EXPERIAN | 0.130 | 0.074 | 1.730 | 0.079 | | 0.000 |
| 5.67 | CLIENT | 0.391 | 0.111 | 3.510 | 0.000 | 1 | 0.391 |
| | LEXUS AND EXPERIAN | 0.216 | 0.110 | 1.970 | 0.049 | | 0.000 |
| | LEXUS | -0.141 | 0.111 | -1.280 | 0.201 | | 0.000 |
| | EXPERIAN | -0.113 | 0.119 | -0.950 | 0.341 | | 0.000 |
| 5.68 | Ln_seq =1 Dummy | 0.250 | 0.017 | 14.800 | 0.000 | 0 | 0.000 |
| | Ex_Seq=(1,2) Dummy | 0.255 | 0.101 | 2.530 | 0.011 | | 0.000 |

| Score | Variable | Coefficient | Std. Err. | z | P>z | Input | Coeff*Input |
|---|---|---|---|---|---|---|---|
| | Type TA (DA) | 0.000 | - | - | - | | 0.000 |
| | Type TB (EDA Accurint) | -0.014 | 0.015 | -0.900 | 0.367 | 0 | 0.000 |
| | Type TC (Gateway) | -0.593 | 0.043 | -13.820 | 0.000 | 0 | 0.000 |
| | Type TD (EDA Current Address) | -0.476 | 0.023 | -20.490 | 0.000 | 0 | 0.000 |
| 5.69 | Type TE (EDA Most Recent Co-Hab) | -0.737 | 0.025 | -30.040 | 0.000 | 0 | 0.000 |
| | Type TF (EDA Possible) | -0.028 | 0.024 | -1.170 | 0.242 | 0 | 0.000 |
| | Type TG (Alternate Cell Phone/I phone) | 0.064 | 0.028 | 2.250 | 0.025 | 0 | 0.000 |
| | Type TH (Unverified) | 0.093 | 0.022 | 4.190 | 0.000 | 0 | 0.000 |
| | Experian Tag="5F" Dummy | -0.235 | 0.073 | -3.240 | 0.001 | | 0.000 |
| | Zip code category - highest by income | 0.006 | 0.023 | 0.250 | 0.801 | 1 | 0.006 |
| | Zip code category | 0.000 | 0.025 | -0.010 | 0.996 | 0 | 0.000 |
| 5.70 | Zip code category | -0.021 | 0.028 | -0.760 | 0.444 | 0 | 0.000 |
| | Zip code category - lowest | -0.037 | 0.032 | -1.160 | 0.245 | 0 | 0.000 |
| | ZIP Missing | 0.000 | | | | | 0.000 |
| 5.71 | Prior presence on Consumer phone | 0.174 | 0.016 | 11.130 | 0.000 | 1 | 0.174 |
| | Prior Presence on Consumer | 0.067 | 0.015 | 4.390 | 0.000 | 1 | 0.067 |

| Score | Variable | Coefficient | Std. Err. | z | P>z | Input | Coeff*Input |
|---|---|---|---|---|---|---|---|
| 5.72 | Number of phones associated with consumer =1 | 0.000 | | | | | 0.000 |
| | Number of phones associated with consumer =2 | -0.047 | 0.010 | -4.880 | 0.000 | 1 | -0.047 |
| | Number of phones associated with consumer =3 | -0.251 | 0.015 | -16.650 | 0.000 | | 0.000 |
| | Number of phones associated with consumer =4 | -0.334 | 0.019 | -17.720 | 0.000 | | 0.000 |
| | Number of phones associated with consumer =4-10 | -0.512 | 0.018 | -28.330 | 0.000 | | 0.000 |
| | Number of phones associated with consumer >10 | -0.670 | 0.043 | -15.590 | 0.000 | | 0.000 |
| 5.73 | # of RPC phones associated with consumer=0 | 0.000 | | | | | 0.000 |
| | # of RPC phones associated with consumer=1 | 0.464 | 0.018 | 25.280 | 0.000 | 1 | 0.464 |
| | # of RPC phones associated with consumer>=2 | 0.880 | 0.025 | 35.330 | 0.000 | | 0.000 |
| 5.74 | # VWN phones associated with consumer=0 | 0.000 | | | | | 0.000 |
| | # VWN phones associated with consumer>=1 | -0.138 | 0.013 | -10.700 | 0.000 | | 0.000 |
| 5.75 | Unreachable* VWN phones | 0.431 | 0.054 | 8.040 | 0.000 | | 0.000 |
| 5.75 | Intercept | -3.593 | 0.112 | -32.120 | 0.000 | 1 | -3.593 |

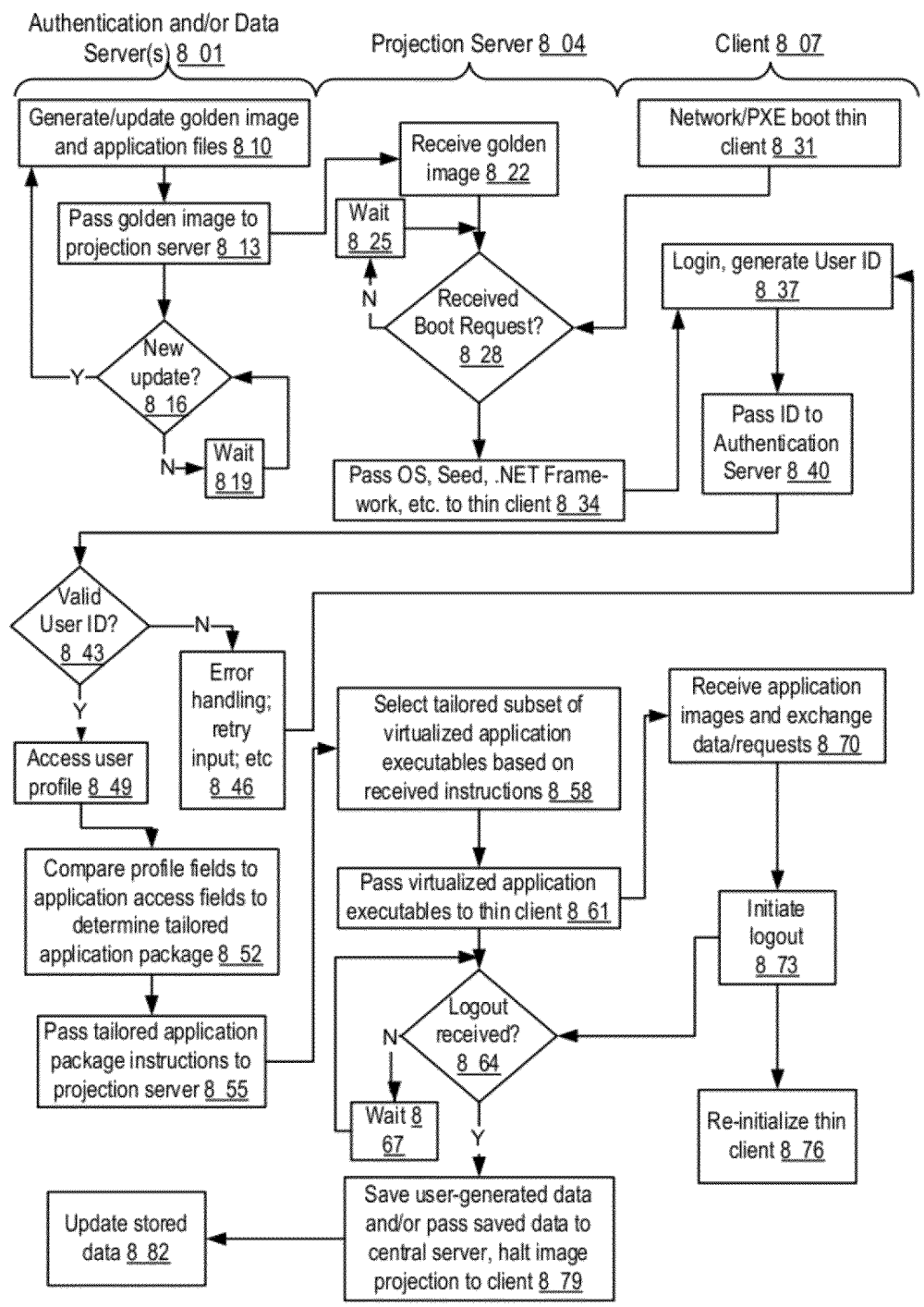

FIGURE 8B

| CLIENT | APPLICATION | TITLE | FUNCTION | SUB FUNCTION | DEPARTMENT | PROGRAM | NAME |
|---|---|---|---|---|---|---|---|
| ALL | | | | | IQ.REC.COL.FIN | | |
| Client1 | NUASION | SVP | FINANCE | | | | |
| Client2 | CALL BAR | AVP | OPERATIONS | | | | |
| Client3 | ODFUS | AVP | OPERATIONS | | | | |
| Client4 | ODFUS | VP | OPERATIONS | | | | |
| Client5 | FRODOR | EVP | Telbot | | | | |
| Client6 | FRODOR | Agent | | Center Management | | a.p.x | |
| Client7 | 49PECT | Sr. Agent | | | | | |
| | PARS | VP | TECHNOLOGY | | | | |
| | SOFT PHONE | VP | | | | | |

| | A | B | C | D | E | F | G |
|---|---|---|---|---|---|---|---|
| | CALLACCOUNTNUMBER | CALLUSERNAME | CALLPHONENUMBER | CALLRESULT | EXTENDED RESULT | CALLDATE | |
| 1 | 2089068 | | 2505552734 | BUSY | | 12/29/2009 13:00 | |
| 2 | 732578 | | 6045550198 | BUSY | | 12/29/2009 13:06 | |
| 3 | 1048685 | | 5065559441 | NO ANSWER | | 12/29/2009 8:06 | |
| 4 | 1797521 | | 9025558514 | NO ANSWER | | 12/29/2009 8:06 | |
| 5 | 2357994 | | 7095559354 | NO ANSWER | | 12/29/2009 8:08 | |
| 6 | 2548592 | | 9025557864 | NO ANSWER | | 12/29/2009 8:08 | |
| 7 | 873844 | | 2225552222 | NO ANSWER | | 12/29/2009 8:08 | |
| 8 | 2977502 | | 5065553891 | NO ANSWER | | 12/29/2009 8:10 | |
| 9 | 996892 | | 5065559087 | NO ANSWER | | 12/29/2009 8:10 | |
| 10 | 667345 | | 9025554605 | ABANDON | | 12/29/2009 8:10 | |
| 11 | 1452804 | | 5065555725 | RIGHT PARTY | RIGHT PARTY PROMISE | 12/29/2009 8:10 | |
| 12 | 1252063 | | 9025559366 | RIGHT PARTY | RIGHT PARTY ALREADY PAID | 12/29/2009 8:10 | |
| 13 | 426601 | | 9025559101 | RIGHT PARTY | RIGHT PARTY | 12/29/2009 8:10 | |
| 14 | 2975920 | | 5065558975 | RIGHT PARTY | RIGHT PARTY PROMISE | 12/29/2009 8:12 | |
| 15 | 1751999 | | 7095553802 | RIGHT PARTY | RIGHT PARTY ALREADY PAID | 12/29/2009 8:12 | |
| 16 | 2682201 | | 9025558825 | RIGHT PARTY | RIGHT PARTY PROMISE | 12/29/2009 8:12 | |
| 17 | 2994622 | | 5065554719 | NO ANSWER | | 12/29/2009 8:12 | |
| 18 | 1523794 | | 9025552013 | NO ANSWER | | 12/29/2009 8:12 | |
| 19 | 3063609 | | 5195556713 | NO ANSWER | | 12/29/2009 8:14 | |
| 20 | 2458941 | | 5065550443 | NO ANSWER | | 12/29/2009 8:14 | |
| 21 | 1742486 | | 9025559360 | NO ANSWER | | 12/29/2009 8:14 | |
| 22 | 1908813 | | 5065559400 | NO ANSWER | | 12/29/2009 8:14 | |
| 23 | 1190669 | | 5065559242 | NO ANSWER | | 12/29/2009 8:16 | |
| 24 | 2953636 | | 9025553453 | NO ANSWER | | 12/29/2009 8:16 | |
| 25 | 2659688 | | 7095553645 | NO ANSWER | | 12/29/2009 8:16 | |
| 26 | 1685619 | | 9025550008 | NO ANSWER | | 12/29/2009 8:16 | |
| 27 | 1511278 | | 5065552830 | NO ANSWER | | 12/29/2009 8:16 | |

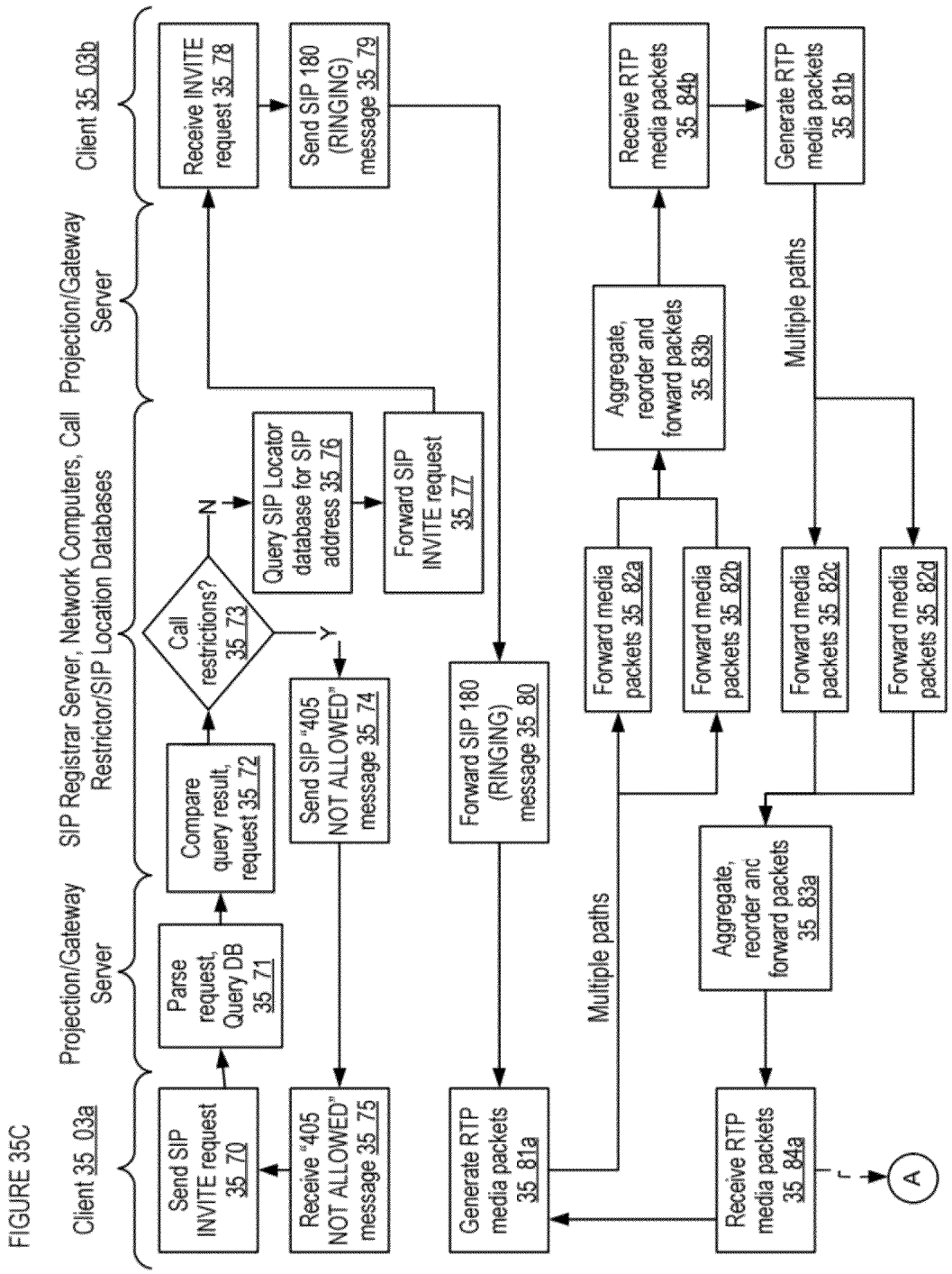

FIGURE 36A

- Program Filter:
  - A program may be made up of following entities
    - Client – 3 characters
    - Country – 2 characters
    - Vertical – 2 characters
    - Business Type – 2 characters
    - Description – 1 to 7 characters
  - A compliance rule may be defined for any combination of the above entities.

For example – the program filter below will apply to any US clients of Business Type starting with 'F'.

| CLIENT | COUNTRY | VERTICAL | TYPE | DESCRIPTION |
|---|---|---|---|---|
| * | US | * | F* | * |

36.01

However, the rule defined below will apply only to one specific client

| CLIENT | COUNTRY | VERTICAL | TYPE | DESCRIPTION |
|---|---|---|---|---|
| DTV | US | FC | FE | XX |

- Rule Structure:
  - Conditions (e.g., account properties)
  - Results (e.g., allowed/disallowed actions)

- Rule Levels:
  - "Regulation" (e.g., legal/regulatory/corporate compliance)
  - "Client" (e.g., instructions)
  - "Internal" (e.g., best practices)

- Rule Conflict Resolution:
  - Priority: Regulation rule > Client rule > Internal rule.
  - A rule may be defined by selecting conditions, which are generally the account properties, and results which are generally the actions that can be performed on the accounts.

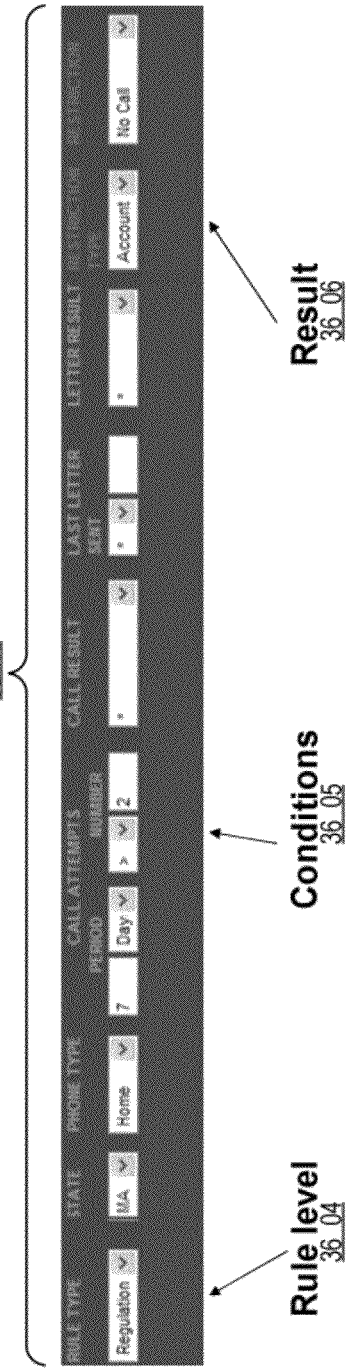

APPARATUSES, METHODS AND SYSTEMS FOR A DATA TRANSLATOR

PRIORITY CLAIM AND RELATED APPLICATIONS

This application is a Non-Provisional of prior U.S. Provisional Patent Ser. No. 61/252,611 entitled, "Apparatuses, Methods and Systems for Tailored and Customizable Management of Enterprise and Human Resources," filed Oct. 16, 2009, to which priority under 35 U.S.C. §119 is claimed.

This application is also a Continuation-in-Part of and claims priority under 35 U.S.C. §120 to prior U.S. Non-Provisional patent application Ser. No. 12/763,320, filed Apr. 20, 2010 entitled, "Apparatuses, Methods and Systems for a Descriptive Business Grammar Syntax Querier," which in turn claims priority to U.S. Non-Provisional patent application Ser. No. 12/650,542 filed Dec. 31, 2009 entitled, "Apparatuses, Methods and Systems for a Descriptive Business Grammar Syntax Querier," which in turn claims priority to U.S. Provisional Patent Application Ser. No. 61/252,611 filed Oct. 16, 2009 entitled, "Apparatuses, Methods and Systems for Tailored and Customizable Management of Enterprise and Human Resources".

This application is also a Continuation-in-Part of and claims priority under 35 U.S.C. §120 to prior U.S. Non-Provisional patent application Ser. No. 12/760,948, filed Apr. 15, 2010 entitled, "Apparatuses, Methods and Systems for a Universal Data Librarian," which in turn claims priority to U.S. Non-Provisional patent application Ser. No. 12/650,493 filed Dec. 30, 2009 entitled, "Apparatuses, Methods and Systems for a Universal Data Librarian," which in turn claims priority to U.S. Provisional Patent Application Ser. No. 61/252,611 filed Oct. 16, 2009 entitled, "Apparatuses, Methods and Systems for Tailored and Customizable Management of Enterprise and Human Resources".

This application is also a Continuation-in-Part of and claims priority under 35 U.S.C. §120 to prior U.S. Non-Provisional patent application Ser. No. 12/762,570 filed Apr. 19, 2010 entitled, "Apparatuses, Methods and Systems for a Global Data Exchange," which in turn claims priority to U.S. Non-Provisional patent application Ser. No. 12/650,442 filed Dec. 30, 2009 entitled, "Apparatuses, Methods and Systems for a Global Data Exchange," which in turn claims priority to U.S. Provisional Patent Application Ser. No. 61/252,611 filed Oct. 16, 2009 entitled, "Apparatuses, Methods and Systems for Tailored and Customizable Management of Enterprise and Human Resources".

This application is also a Continuation-in-Part of and claims priority under 35 U.S.C. §120 to prior U.S. Non-Provisional patent application Ser. No. 12/763,331, filed Apr. 20, 2010 entitled, "Apparatuses, Methods and Systems for an Automated Data Extractor," which in turn claims priority to U.S. Non-Provisional patent application Ser. No. 12/650,530 filed Dec. 30, 2009 entitled, "Apparatuses, Methods and Systems for an Automated Data Extractor," which in turn claims priority to U.S. Provisional Patent Application Ser. No. 61/252,611 filed Oct. 16, 2009 entitled, "Apparatuses, Methods and Systems for Tailored and Customizable Management of Enterprise and Human Resources."

This application is also a Continuation-in-Part of and claims priority under 35 U.S.C. §120 to prior U.S. Non-Provisional patent application Ser. No. 12/762,577, now U.S. Pat. No. 8,489,872, filed Apr. 19, 2010 entitled, "Apparatuses, Methods and Systems for a Real-Time Desktop Configurer," which in turn claims priority to U.S. Non-Provisional patent application Ser. No. 12/650,548 filed Dec. 31, 2009 entitled, "Apparatuses, Methods and Systems for a Real-Time Desktop Configurer," which in turn claims priority to U.S. Provisional Patent Application Ser. No. 61/252,611 filed Oct. 16, 2009 entitled, "Apparatuses, Methods and Systems for Tailored and Customizable Management of Enterprise and Human Resources."

This disclosure is related to co-pending U.S. Non-Provisional patent application Ser. No. 12/904,706 filed Oct. 14, 2010, entitled "Apparatuses, Methods and Systems for a Consumer Contactability Evaluator," co-pending U.S. Non-Provisional patent application Ser. No. 12/904,723 filed Oct. 14, 2010, entitled "Apparatuses, Methods and Systems for a Consumer Liquidity Evaluator," co-pending U.S. Non-Provisional patent application Ser. No. 12/904,735 filed Oct. 14, 2010, entitled "Apparatuses, Methods and Systems for a Consumer Contact Strategy Builder," and co-pending U.S. Non-Provisional patent application Ser. No. 12/904,753 filed Oct. 14, 2010, entitled "Apparatuses, Methods and Systems for a Strategic Customer Dialer".

The entire contents of the aforementioned patents are herein expressly incorporated by reference.

FIELD

The present invention is directed generally to apparatuses, methods, and systems of database interfacing and operation, and more particularly, to APPARATUSES, METHODS AND SYSTEMS FOR A DATA TRANSLATOR.

BACKGROUND

Call centers are operated to provide support for information inquiries from consumers. For examples, businesses may hire call center companies for telemarketing, clientele, product services, debt collection, and/or the like. A call center may maintain databases of consumer information, such as phone numbers, etc. Database technologies may be implemented for consumer data management. For example, some database management systems use database computer languages, such as the structured query language ("SQL"), to facilitate database queries, transactions, and other manipulations. Organizations have employed databases in managing their information.

SUMMARY

The APPARATUSES, METHODS AND SYSTEMS FOR A DATA TRANSLATOR (hereinafter "Data-Translator") implement an application on a computerized system, whereby the Data-Translator may collect consumer account information from a variety of data sources, arrange the collected data to score each consumer with regard to their contactability, and devise consumer-specific contact strategies for automatic execution.

In some embodiments, the Data-Translator may access data via a plurality of universal variables linked to tables and/or fields across multiple, otherwise disparate database systems, providing economical access to data in those tables and/or fields. In some implementations, the universal variables may be selectively chosen for broad applicability to a vast swath of enterprise data types and organizations, and may themselves be organized in accordance with a hierarchical schema facilitating business understanding and decision making. The Data-Translator may further facilitate, in various implementations, report generation, data accessibility, scheduled and/or triggered distribution of data updates, and/or the like through the use of universal variables and economical interface features.

In one embodiment, a method is disclosed, comprising: obtaining data pertaining to at least one consumer; categorizing the obtained data based on a plurality of criteria retrieving a regression formula; determining regression coefficients under each category based on the regression formula; and calculating a consumer contactability score and liquidity scores using the determined regression coefficients based on the obtained data pertaining to the at least one consumer.

In one embodiment, a method is disclosed, comprising: obtaining data pertaining to at least one consumer; categorizing the obtained data based on a plurality of criteria; retrieving a regression formula; determining regression coefficients under each category based on the regression formula; and calculating a consumer contactability score and liquidity scores using the determined regression coefficients based on the obtained data pertaining to the at least one consumer.

In one embodiment, a method is disclosed, comprising: retrieving a list of consumer phone numbers, each number associated with a contactability score and liquidity scores; developing a dialing strategy for the list of consumer phone numbers based on the associated contactability scores and liquidity scores; and automatically executing the developed dialing strategy.

BRIEF DESCRIPTION OF THE DRAWINGS

The accompanying appendices and/or drawings illustrate various non-limiting, example, inventive aspects in accordance with the present disclosure:

FIGS. 5A-F provide diagrams illustrating aspects of consumer scoring in one embodiment of Data-Translator operation;

FIG. 8A shows an implementation of logic flow for user authentication and application resource allocation in one embodiment of Data-Translator operation;

FIG. 8B shows an implementation of a user interface for specifying user application privileges in one embodiment of Data-Translator operation;

FIG. 22 shows an implementation of a user interface for universal variable allocation in one embodiment of Data-Translator operation;

FIG. 23 shows another implementation of a user interface for universal variable allocation in one embodiment of Data-Translator operation;

FIGS. 27A-C show implementations of a user interface for data exchange specification in one embodiment of Data-Translator operation;

FIG. 31 shows an implementation of a user interface for database integration in one embodiment of Data-Translator operation;

FIGS. 32A-C show implementations of a user interface for report generation and generated reports in one embodiment of Data-Translator operation;

FIGS. 35A-E illustrate an implementation of data and logic flow among and between Data-Translator components and/or affiliated entities for managing a telecommunications session between client terminal users and/or telephone users in an exemplary embodiment of Data-Translator operation;

Figure 36C:
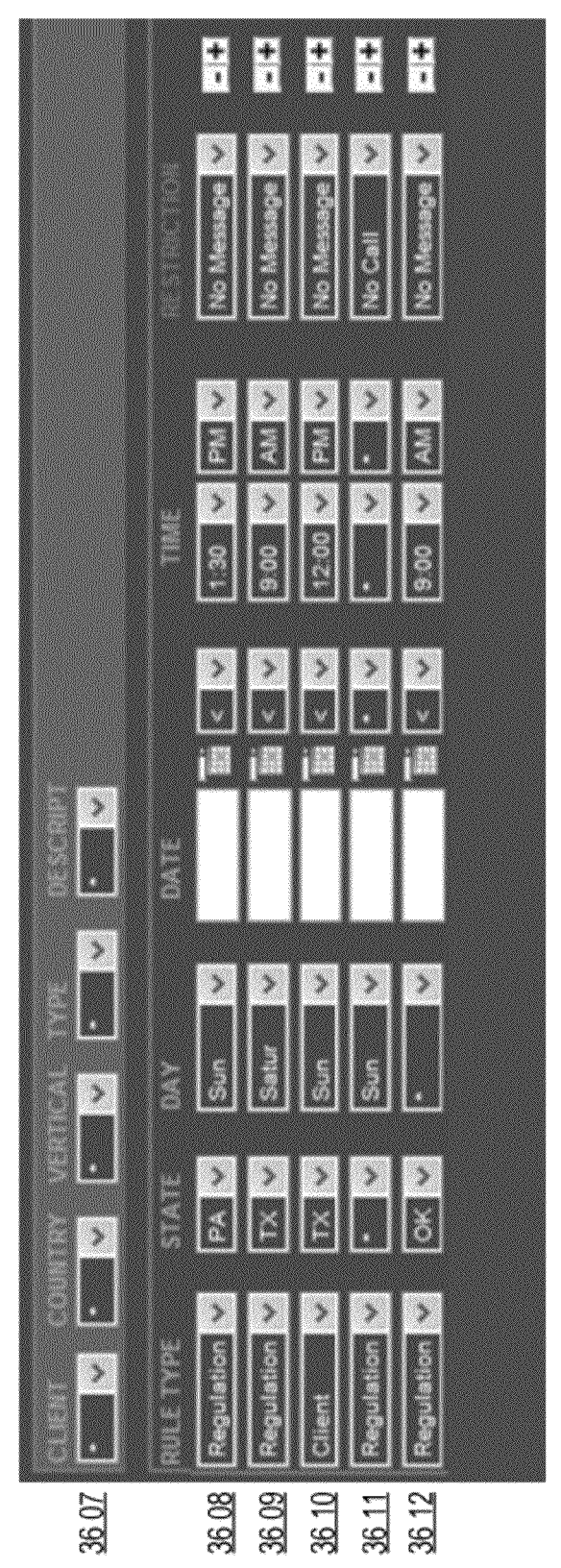
Figure 36D:
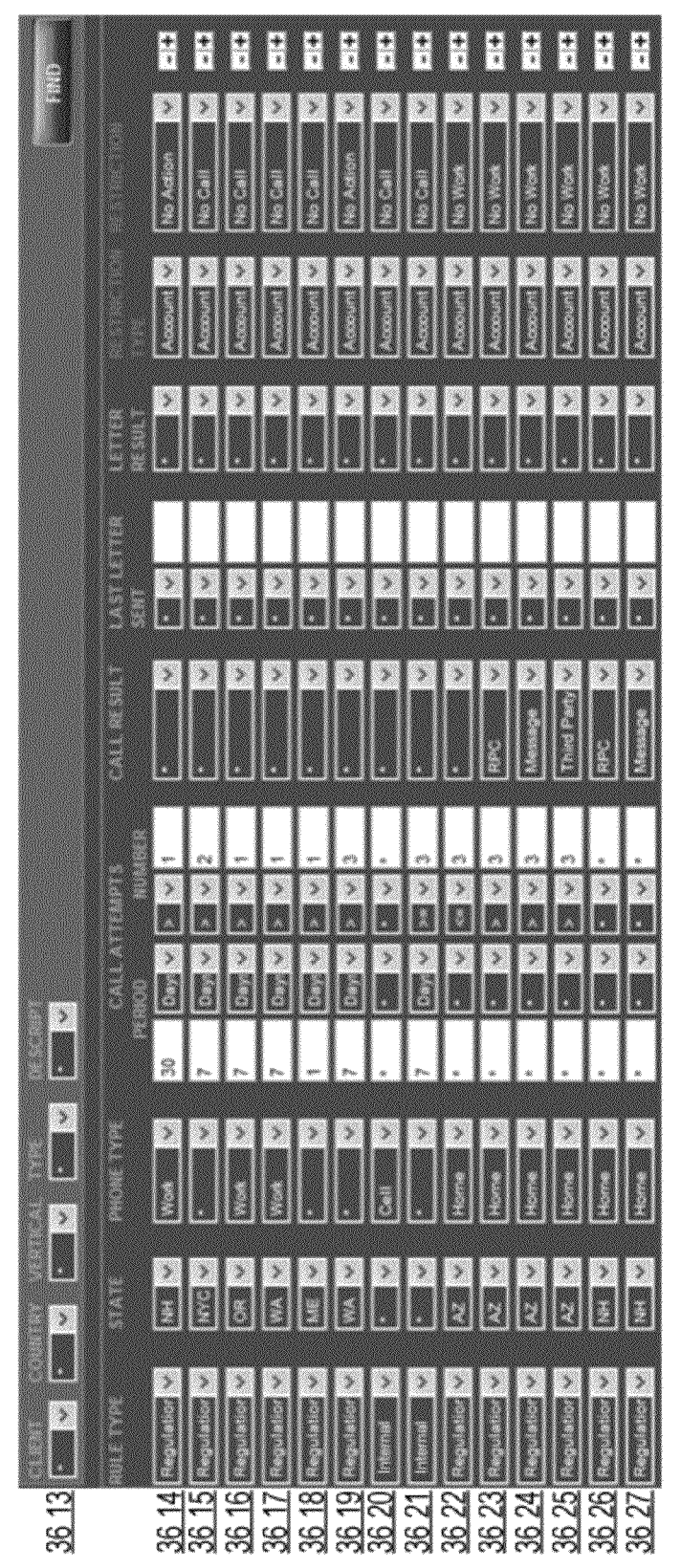

FIGS. 36A-E illustrate implementations of a user interface system for entry of call restriction rules into the Call Restrictor database in one embodiment of Data-Translator operation.

Figure 1:
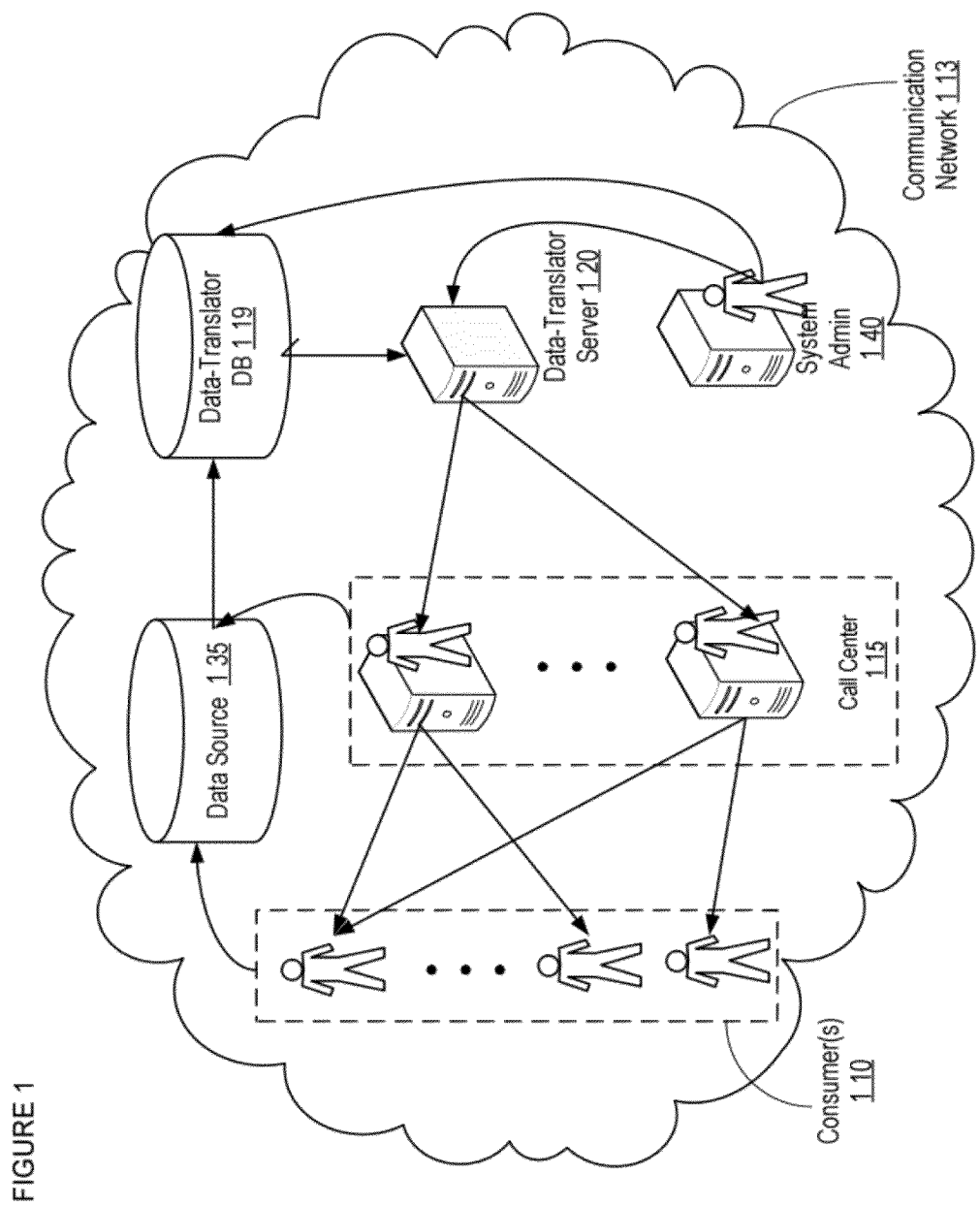
FIG. 1 provides an overview of an implementation of data flow between a strategic consumer dialer (hereinafter "Data-Translator") system and affiliated entities in one embodiment of Data-Translator operation.

Appendix A includes further details of an implementation of hierarchically arranged universal variables for a universal data library in one embodiment of Data-Translator operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Data-Translator Overview

This disclosure details the implementation of apparatuses, methods and systems of a strategic customer dialer (hereinafter, "Data-Translator"). Data-Translator systems may, in one embodiment, implement an application on a computerized system, whereby the Data-Translator may collect consumer account information from a variety of data sources, arrange the collected data to score each consumer with regard to their contactability, and devise consumer-specific contact strategies for automatic execution.

For example, in one embodiment, the Data-Translator may connect to a variety of data sources to obtain consumer information. In one implementation, the data source may be a database of a call center recording consumer profiles and the contact history associated therewith. The Data-Translator may dump the original consumer information, which may include consumer name, consumer ID, consumer address, consumer contact information, and/or the like, into an intermediate "translation" database. The translation database may re-arrange and summarize the obtained raw data, for example, to find and match existing consumer in record, to generate new consumer entries, to store consumer data in compliant formats, and/or the like.

In one embodiment, the consumer information may be stored in a Data-Translator database, whereby the consumer information in the database is linked/mapped to universal variables. In this manner, the Data-Translator may be able to search and locate information related to a specific consumer across different databases/data sources based on the universal variable associated with the consumer. For example, the universal variable may be the consumer demographic information.

In one embodiment, the Data-Translator may analyze and estimate consumer contactability based on the profile and contact history of the consumer. For example, in one implementation, the Data-Translator may calculate the successful contact probability of each telephone number on record with a consumer. In another implementation, the Data-Translator may analyze the payment willingness probability of a consumer, e.g., the probability that the consumer will be persuaded to pay via a variety of contact methods, such as, but not limited to telephone call, email, letter, instant messaging, and/or the like. In a further implementation, the Data-Translator may analyze and estimate the financial ability of a consumer, e.g., a range of payment amount that a consumer may commit to within a specified period of time, and/or the like.

In one embodiment, the Data-Translator may develop consumer-specific contact strategies based on the consumer contactability analysis. For example, in one implementation, the Data-Translator may determine to contact a consumer via phone call, email or instant messaging at a specific time of a day based on the maximum successful contact probability of each contact method. For another example, in one implementation, the Data-Translator may determine the time, the consumer, and contact method based on an expected payment amount. For another example, in one implementation, the Data-Translator may assign a consumer contact task to a call center based on the successful contact statistics. For another example, in one implementation, the Data-Translator may determine a set of rules with regard to contacting a specific consumer, e.g., dialing at a home number for weekends, dialing at a cellphone number at night times, and/or the like. In another implementation, universal variables of consumer data entries may be leveraged in strategy making, e.g., the consumer demographic, geographic, and personal information, the corresponding program (e.g., product campaign, etc.) information may be considered and evaluated, etc.

In one embodiment, the Data-Translator may execute the developed contact strategy. In one implementation, an auto-dialer may be instantiated. For example, the auto-dialer may make pre-recorded robot calls, send emails or instant messages to a consumer based on the contact strategy. For another example, the Data-Translator may generate and display a graphic user interface showing the contact strategy, and a call center operator may interfere with the auto-dialing process, e.g., to adjust the calling strategy in real time, physically operate phone calls/emails, and/or the like.

It is to be understood that, depending on the particular needs and/or characteristics of a call center manager, and/or enterprise user, database configuration and/or relational structure, data type, data transmission and/or network framework, analytical and/or implemental models, and/or the like, various embodiments of the Data-Translator, may be implemented that enable a great deal of flexibility and customization. The instant disclosure discusses embodiments of the Data-Translator directed to storage, analysis and manipulation of consumer contact data. However, it is to be understood that the systems described herein may be readily configured and/or customized for a wide variety of other applications and/or implementations. For example, aspects of the Data-Translator may be adapted for general business consumer behavior analysis, program execution, enterprise and/or personal data management, efficient data access by mobile devices, and/or the like applications. It is to be understood that the Data-Translator may be further adapted to other implementations or data and communications management applications.

FIG. 1 provides an overview of an implementation of data flow between a strategic consumer dialer (hereinafter "Data-Translator") system and affiliated entities in one embodiment of Data-Translator operation. A variety of other compositions and arrangements of Data-Translator components and affiliated entities may be used in alternative embodiments of Data-Translator operation. For example, in one embodiment, a Data-Translator server, data source(s), and Data-Translator database may all be localized within a single computing terminal. In another embodiment, the Data-Translator server may access and/or retrieve data records over a network from one or more external data sources. The data flow shown in FIG. 1 is intended for illustrative purposes only, and to describe aspects of a particular embodiment.

In FIG. 1, consumers 110, a call center 115, a Data-Translator server 120, a Data-Translator database 119, data source(s) 135 and a system administrator 140 are shown to interact via a communication network 113. The consumer 110 and the call center 115 may be connected via a wide variety of different communications devices and technologies within embodiments of Data-Translator operation. For example, in one embodiment, the consumers 110 may operate devices including, but are not limited to, terminal computers, work stations, servers, cellular telephony handsets, blackberries, Apple iPhones, PDAs, and/or the like; and the call center 115 may include a telephony call center equipped with Internet service, an instant message server, an automatic email server, and/or the like. In one embodiment, the Data-Translator server 120 may be equipped at a the call center 115. In another embodiment, the Data-Translator server 120 may be a remote server which is accessed by the call center 115 via the communication network 113, such as, but not limited to local area network (LAN), in-house intranet, the Internet, 3G networks, Blue Tooth, and/or the like.

In one embodiment, the call center 115 may contact the consumers 110 via phone calls, instant messages, emails and/or the like. In one implementation, the contact history between the call center and the consumers may be recorded in a data source 135. For example, in one implementation, the consumer information, contact time, contact method, and contact success/failure may be recorded. In one implementation, the data source 135 may be housed at the call center 115. In another implementation, the data source 135 may be a remote network database accessed by a plurality of call centers and record all contact history of those call centers.

In one embodiment, the Data-Translator server 120 may communicate with the call center via the communication network 113. In one implementation, the Data-Translator may send contact strategies to call center for execution. For example, the Data-Translator server may instruct the call center to contact a specific consumer based on a series of determined rules/strategies, e.g., contact time, contact method, and/or the like, as will be further illustrated in FIGS. 5A-F and 6A-B. In one implementation, the call center 115 may establish automatic robot calling/emails to contact a consumer based on the contact strategies.

In one embodiment, the Data-Translator server 120 may also communicate with a Data-Translator database 119. In some embodiments, a Data-Translator server 120 may be integrated with a local Data-Translator database 119. In other embodiments, a Data-Translator server 120 may access a remote Data-Translator database 119 via the communication network 113. The Data-Translator server 120 may send the information to the database 119 for storage, such as, but not limited to consumer account information, consumer contactability analysis results, consumer-specific contact strategy, program information, and/or the like. The Data-Translator database may also provide the Data-Translator server 120 with information relating to system information, hardware upgrade information, security tracking data, and/or the like.

In one embodiment, the Data-Translator database 119 may be integrated with a data source 135 and housed with the Data-Translator server 120 as a local database. In another embodiment, the Data-Translator database 119 may be configured to remotely access and synchronize with the data source 135 via network connections. In one implementation, the Data-Translator server 120 may configure the Data-Translator database to periodically retrieve consumer data from the data source 135 and integrate/translate the obtained data into the Data-Translator database, as will be further illustrated in FIGS. 4A-D.

In one embodiment, a system administrator 140 may communicate with the Data-Translator server 120 and the Data-Translator database 119 for regular maintenance, service failure, system updates, database renewal, and/or the like. In one embodiment, the system administrator 140 may directly operate with the Data-Translator server 120 and the Data-Translator database 119 on an in-house basis, such as, but not limited to via an integrated administrator user interface. In another embodiment, the system administrator 140 may remotely access the Data-Translator server 120 and the Data-Translator database 119 and perform its functionality via the communication network 113. In one implementation, the system administrator 140 may configure the consumer data universal variables, data syntax and save it to the Data-Translator system. In one implementation, the system administrator 140 may be part of the business solution management of the program (e.g., a product campaign, debt service, etc.).

Figure 2:
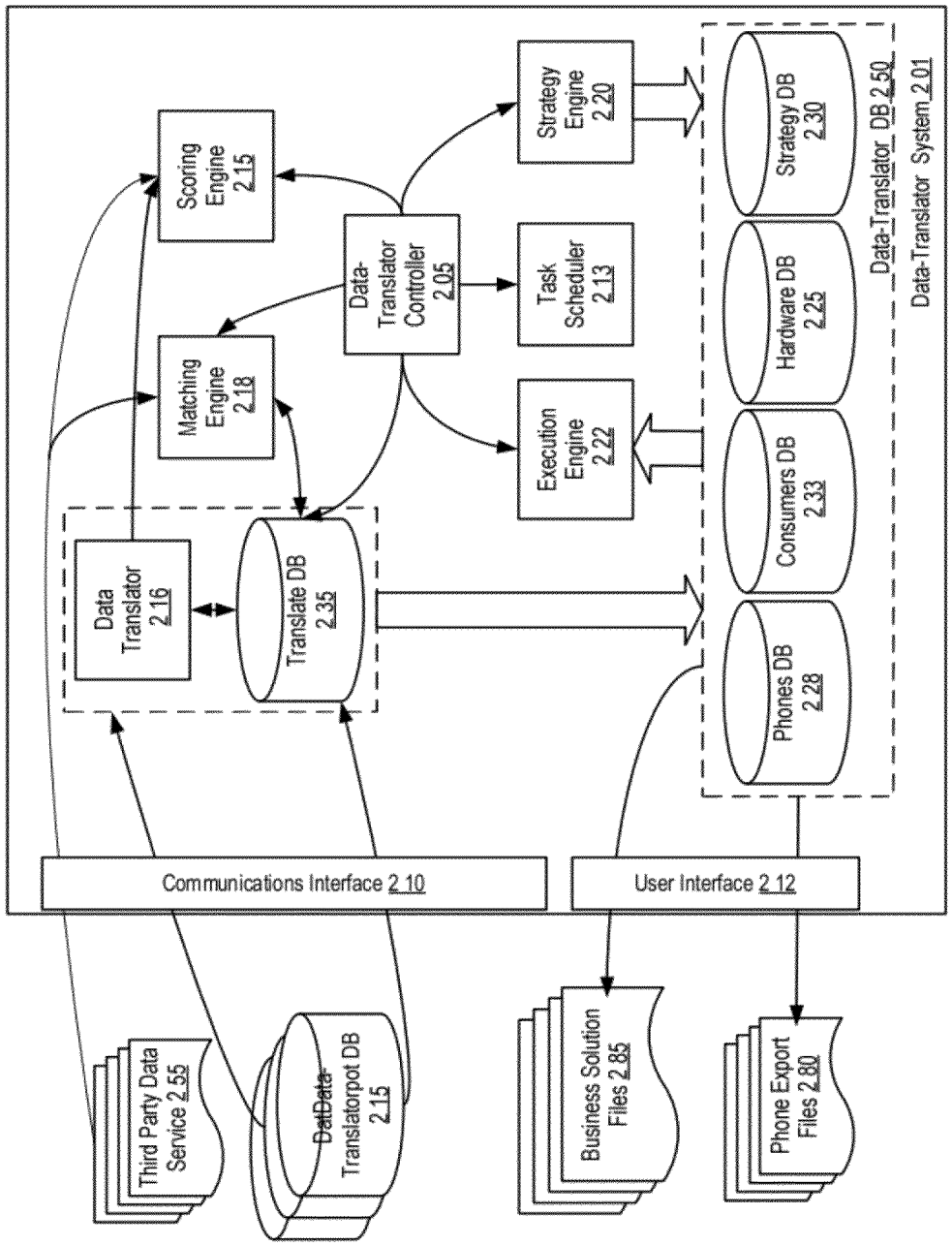
FIG. 2 shows an implementation of Data-Translator system components in one embodiment of Data-Translator operation.

FIG. 2 shows an implementation of Data-Translator system components in one embodiment of Data-Translator operation. The Data-Translator system 201 may contain a number of components and/or data stores. A Data-Translator controller 205 may serve a central role in some embodiments of Data-Translator operation, serving to orchestrate the reception, generation, modification, and distribution of data and/or instructions, to, from, and between Data-Translator components and/or mediate communications with external entities and systems.

In one embodiment, the Data-Translator controller 205 may be housed separately from other components and/or databases within the Data-Translator system, while in another embodiment, some or all of the other modules and/or databases may be housed within and/or configured as part of the Data-Translator controller. Further detail regarding implementations of Data-Translator controller operations, modules, and databases is provided below.

In the implementation illustrated in FIG. 2, the Data-Translator controller 205 may be configured to couple to external entities via a communications interface 210 and a user interface 212. In various implementations, the communications interface 210 may, for example, serve to configure data into application, transport, network, media access control, and/or physical layer formats in accordance with a network transmission protocol, such as, but not limited to FTP(S), TCP/IP, SMTP, Short Message Peer-to-Peer (SMPP) and/or the like. For example, the communications interface 210 may be configured for receipt and/or transmission of data to an external and/or network database. The communications interface 210 may further be configurable to implement and/or translate Wireless Application Protocol (WAP), VoIP and/or the like data formats and/or protocols. The communications interface 210 may further house one or more ports, jacks, antennas, and/or the like to facilitate wired and/or wireless communications with and/or within the Data-Translator system. In one embodiment, the user interface 212 may, for example, receive and configure operational commands/indications from a user (e.g., a call center representative, etc.) to the Data-Translator, secured user account information, user submitted configuration data, and/or the like. In one implementation, the user interface 212 may include, but not limited to devices such as, keyboard(s), mouse, stylus(es), touch screen(s), digital display(s), and/or the like.

In one embodiment, the Data-Translator controller 205 may further be coupled to a plurality of modules configured to implement Data-Translator functionality and/or services. The plurality of modules may, in one embodiment, be configurable to implement a Data-Translator application which may automatically develop and execute contact strategies based on consumer data analysis. Within embodiments, the Data-Translator may periodically, constantly or intermittently monitor all the data sources, e.g., the DataDepot databases 215, etc., and scan for new consumer information from the DataDepot 215. In one implementation, the DataDepot database 215 may be data sources provided by a client (e.g., an enterprise, etc.), by a third party (e.g. Lexus, Experian, credit company, etc.), and/or by an internal database of a call center. For example, the DataDepot database 215 may be an FTP online database, a web-based data service, and/or the like.

In one embodiment, the Data-Translator system may comprise components such as, but not limited to a Task Scheduler 213, a Data Translator 216, a Matching Engine 218, a Scoring Engine 215, a Strategy Engine 220, an Execution Engine 222, and/or the like. In one embodiment, the Task Scheduler 213 may schedule a series of Data-Translator activities and/or functionalities. For example, in one implementation, the Task Scheduler may schedule the Data-Translator Translate database 235 and Data Translator 216 to update with DataDepot database 215 periodically, e.g., every two hours, etc., and the Scoring Engine 215 may be scheduled to update the scoring record accordingly 22 hours a day. In one implementation, the SC-Dailer database may be scheduled to generate Phone Export files 280 every 90 minutes and Business Solution files 285 upon completion of Strategy Engine 220. In one implementation, the Task Scheduler may schedule the Matching Engine to resort to a third party data service 250 to validate consumer information within 2-48 hours delay. In another implementation, the Task Scheduler may schedule all the Data-Translator activities discussed above on demand. For example, if the Data-Translator receives a request from the user interface to update the Data-Translator database with the DataDepot database 215, the Task Scheduler may facilitate the Data Translator 216 and Translate database 235 to perform the synchronization immediately upon request. Such triggering may occur periodically, at specified times, dynamically on-demand/triggered, and/or the like.

In one embodiment, the Matching Engine 218 may operate with the Translate database 235 and Data Translator 216 to update records of new accounts. In one implementation, the Translate Database 235 may periodically update consumer data with a DataDepot database 215, and generate a temporary list of new consumer accounts. For example, in one implementation, consumer data may be downloaded into the Translate database 235 by the Data Translator 216 in a variety of data formats, such as excel spreadsheets, XML, Java, and/or the like. In one implementation, the Matching Engine 218 may retrieve the list of new consumer accounts and process the new accounts to determine whether the new account is associated with an existing consumer. For example, the Matching Engine may form a query based on the universal variable associated with the new account and search a database of existing consumers. In one implementation, the Translate database 235 may delete the temporary new accounts list when the data translation process is accomplished.

In one embodiment, the Data Translator 216 may access the temporary list generated by the Translate database 235 to integrate the new accounts data into the Data-Translator database 250. For example, in one implementation, if a new account is determined to be associated with an existing consumer by the Matching Engine 218, the Data Translator 216 may retrieve and store the new consumer data (e.g., a new account name, a new account password, a new telephone number, a new email address, etc.) in the Data-Translator database associated with the corresponding entries in the Phones database 228, the Consumers database 233 and the Accounts database 225. In another implementation, if no match with any existing consumer is found for a new account, the Data Translator may generate new entries in the Data-Translator database to store the new account. The data translation/integration process described above may be further illustrated in FIGS. 4A-D.

In one embodiment, the Scoring Engine 215 may analyze and evaluate the contactability of each consumer, as will be further illustrated in FIGS. 5A-F. In one implementation, the Scoring Engine 215 may periodically perform the scoring procedure as scheduled by the Task Scheduler 213, e.g., every 2-3 hours. In another implementation, the Scoring Engine 215 may be launched by user demand, or by receiving an indication of Data-Translator database updates from the Data Translator 216. In one implementation, the Scoring Engine 215 may analyze the consumer profile and contact history to calculate a successful contact attempt probability. In one implementation, the Scoring Engine 215 may communicate with a third party service 255 via the communications interface 210 to obtain additional consumer information such as consumer credit history, purchase history, and/or the like.

For example, the Scoring Engine 215 may calculate a successful contact probability of each telephone number on record with a consumer. For another example, the Scoring Engine 215 may calculate a payment willingness probability of a consumer, e.g., the probability that the consumer will be persuaded to pay via a variety of contact methods, such as, but not limited to telephone call, email, letter, instant messaging, and/or the like. For another example, the Scoring Engine 215 may estimate the financial ability of a consumer, e.g., a range of payment amount that a consumer may commit to within a specified period of time, and/or the like.

In one embodiment, the Strategy Engine 220 and the Execution Engine 222 may devise and execute consumer-specific contact strategies based on the contactability evaluation. For example, in one implementation, the Strategy Engine 220 may determine to contact a consumer via phone call, email or instant messaging at a specific time of a day based on the maximum successful contact probability of each contact method. For another example, the Strategy Engine 220 may determine the time, the consumer, and contact method based on an expected payment amount. For another example, the Strategy Engine 220 may assign a consumer contact task to a call center based on the successful contact statistics. For another example, the Strategy Engine 220 may determine a set of rules with regard to contacting a specific consumer, e.g., dialing at a home number for weekends, dialing at a cellphone number at night times, and/or the like. In another implementation, universal variables of consumer data entries may be leveraged in strategy making, e.g., the consumer demographic, geographic, and personal information, the corresponding program (e.g., product campaign, etc.) information may be considered and evaluated, etc.

In one implementation, the Execution Engine may execute the developed contact strategy. In one implementation, an auto-dialer may be instantiated. For example, the auto-dialer may make pre-recorded robot calls, send emails or instant messages to a consumer based on the contact strategy. For another example, the Execution Engine may generate and display a graphic user interface showing the contact strategy, and a call center operator may interfere with the auto-dialing process, e.g., to adjust the calling strategy in real time, physically operate phone calls/emails, and/or the like.

In one embodiment, the Data-Translator controller 205 may further be coupled to one or more databases configured to store and/or maintain Data-Translator data. A Consumers database 233 may contain information pertaining to consumer account information, contact information, profile information, identities of hardware devices, Customer Premise Equipments (CPEs), and/or the like associated with consumers, account preferences, consumer configurations, system settings, and/or the like. A hardware database 225 may contain information pertaining to hardware devices with which the Data-Translator system may communicate, such as but not limited to Email servers, user telephony devices, CPEs, gateways, routers, user terminals, and/or the like. The hardware database 225 may specify transmission protocols, data formats, and/or the like suitable for communicating with hardware devices employed by any of a variety of Data-Translator affiliated entities. A Strategy database 230 may contain data pertaining to consumer contact strategies and associated programs. In one embodiment, the Strategy database 230 may maintain a list of consumers to be contacted, and the phone number, time, contact methods, contact frequency, expected payment amount for each consumer, and/or the like. For example, the consumer strategy list may include fields such as, but not limited to consumer ID, consumer name, consumer phone numbers, consumer addresses, consumer email addresses, program code, program name, preferred contact number, priority level, program start time, program end time, contact frequency, and/or the like.

The Data-Translator database may be implemented using various standard data-structures, such as an array, hash, (linked) list, struct, structured text file (e.g., XML), table, and/or the like. For example, in one embodiment, the XML for a Consumers List in the Consumers database 233 may take a form similar to the following example:

<Consumer>
   ...
   <ID> Consumer_0009377 </ID>
   <Name> Joe Smith </Name>
   <Address>
     <firstline> 000 alma street </firstline>
     ...
   </Address>
   <City> New York </City>
   <State> NY </City>
   <ZipCode> 10000 </ZipCode>
   <WorkInfo> Self-employed </WorkInfo>
   <phone>
     <homephone> 000-000-0001 </homephone>
     <workphone> 000-000-0002 </workphone>
     <mobilephone> 000-000-0003 </mobilephone>
     <otherphone_1> 000-000-0004 </otherphone_1>
     ...
   </phone>
   <DebtHistory>
     <DebtRecord1>
       <Date> Jun-20-2008 </Date>
       <Creditor> ABC Bank </Creditor>
       <Amount> 1000.00 </Amount>
       <Status> 1000.00 unpaid </Status>
     ...
     <DebtRecord1>
     ...
   </DebtHistory>
   <CallHistory>
     <Call_001>
       <Time> 19:23 Jul-10-2008 </Time>
       <DialNumber> mobilephone </DialNumber>
       <Status> busy </Status>
     ...
     </Call_001>
   ...
   </CallHistory>
   ...
</Consumer>

Figure 3:
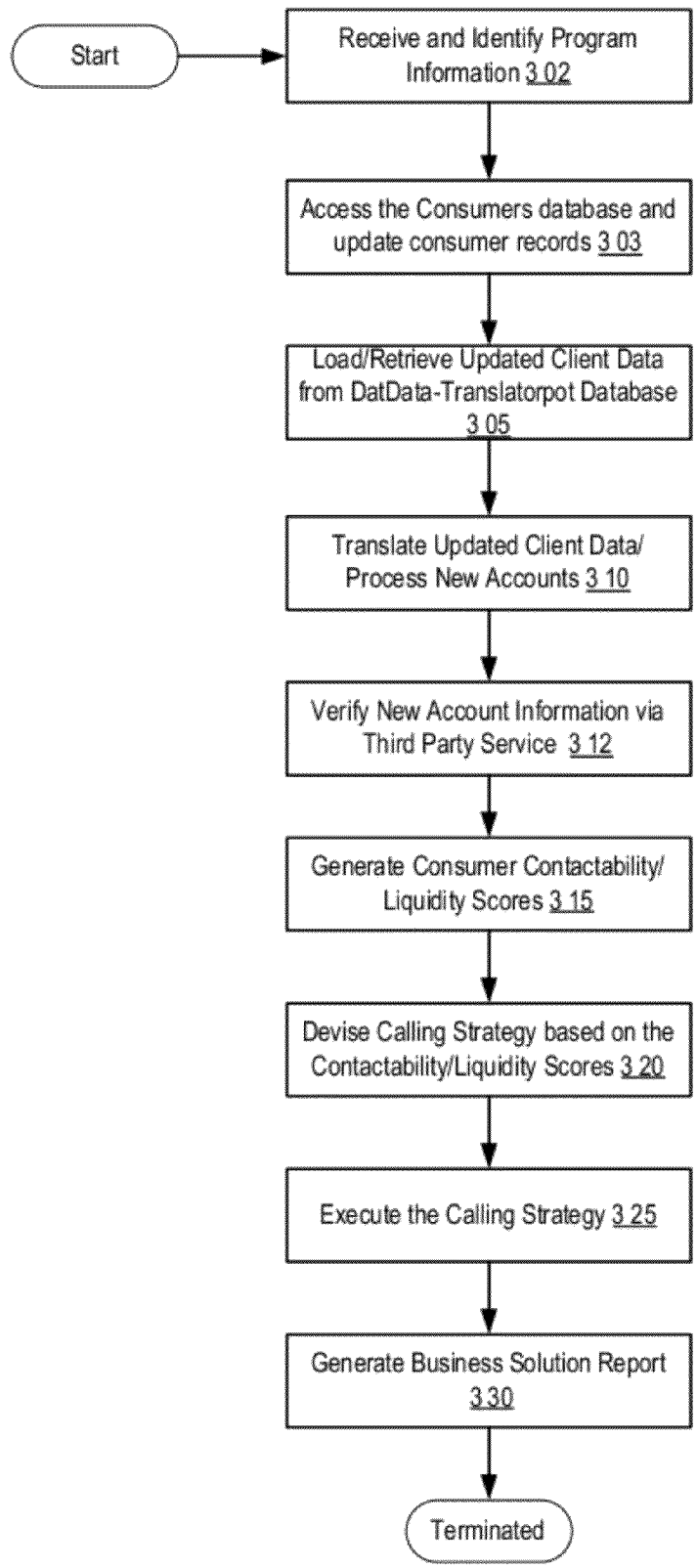
FIG. 3 shows an overview of Data-Translator logic flows within one embodiment illustrating aspects of Data-Translator operation.

FIG. 3 shows an overview of Data-Translator logic flows for implementing a Data-Translator application within one embodiment illustrating aspects of Data-Translator operation. In one embodiment, the Data-Translator may be initiated by receiving and identifying program information 302. For example, in one implementation, the Data-Translator may receive information to implement a consumer contact program for debt enforcement, product advertisement, sales promotion, and/or the like. In one implementation, the consumer contact program may specify a range of potential consumers to be contacted. For example, in one implementation, a debt enforcement program may provide a list of debtors' names; and a product advertisement/sales promotion program may specify consumers within a geographical range, consumers with certain membership at a department store, and/or the like.

In one embodiment, the Data-Translator may access the Data-Translator databases to retrieve and update consumer information based on the program information 303. Form example, the Data-Translator may associate the program ID and related program information with the target consumers (e.g., the debtors, etc.).

In one embodiment, the Data-Translator may load and retrieve updated client data from DataDepot database 305. As discussed above, the DataDepot database may be an external enterprise provided database of consumer (e.g., debtor, etc.) information, a call center database comprising caller information, and/or the like. In one implementation, the Data-Translator may be scheduled to periodically synchronize and update data with the DataDepot database, e.g., every 2 hours, etc. In one implementation, the Data-Translator may search for and translate/integrate new consumer data into the Data-Translator database 310, as will be further illustrated in FIG. 4A-C. In one implementation, the Data-Translator may further access third party data service and verify the new consumer data 312, as will be further illustrated in FIG. 4B.

In one embodiment, the Data-Translator may generate consumer contactability scores and liquidity scores 315 to estimate the efficiency to contact a consumer, and an affordable amount of money that the consumer is able to pay. In one implementation, the Data-Translator may obtain external vendor information from a third party service (e.g., LexusNexus, Experian, etc.), internal consumer payment history and client provided information and/or the like, to perform the scoring, as will be further illustrated in 5A-F.

In one embodiment, the Data-Translator may devise calling strategy to contact a consumer based on the consumer contactability and liquidity scores 320 and execute the calling strategy 325. In one implementation, the Data-Translator may generate a prioritized list of contact numbers and make automatic robot calls through the list. In another implementation, the Data-Translator may generate robot calls to consumers with regard to a probability distribution. In another implementation, the Data-Translator may transfer the calling requests to a call center representative and display a user interface for contacting consumers. In one implementation, the Data-Translator may record the call history into an internal call database, and generate call history report. The call strategy development and execution will be further illustrated in FIGS. 6A-B.

In one embodiment, the Data-Translator may generate business solution report 330 based on the calling strategy execution. For example, in one implementation, the Data-Translator may summarize the calling history of the contact strategy and automatically generate a business report comprising an analysis of the contact success/failure rates.

Data Translation/Integration

Figure 4A:
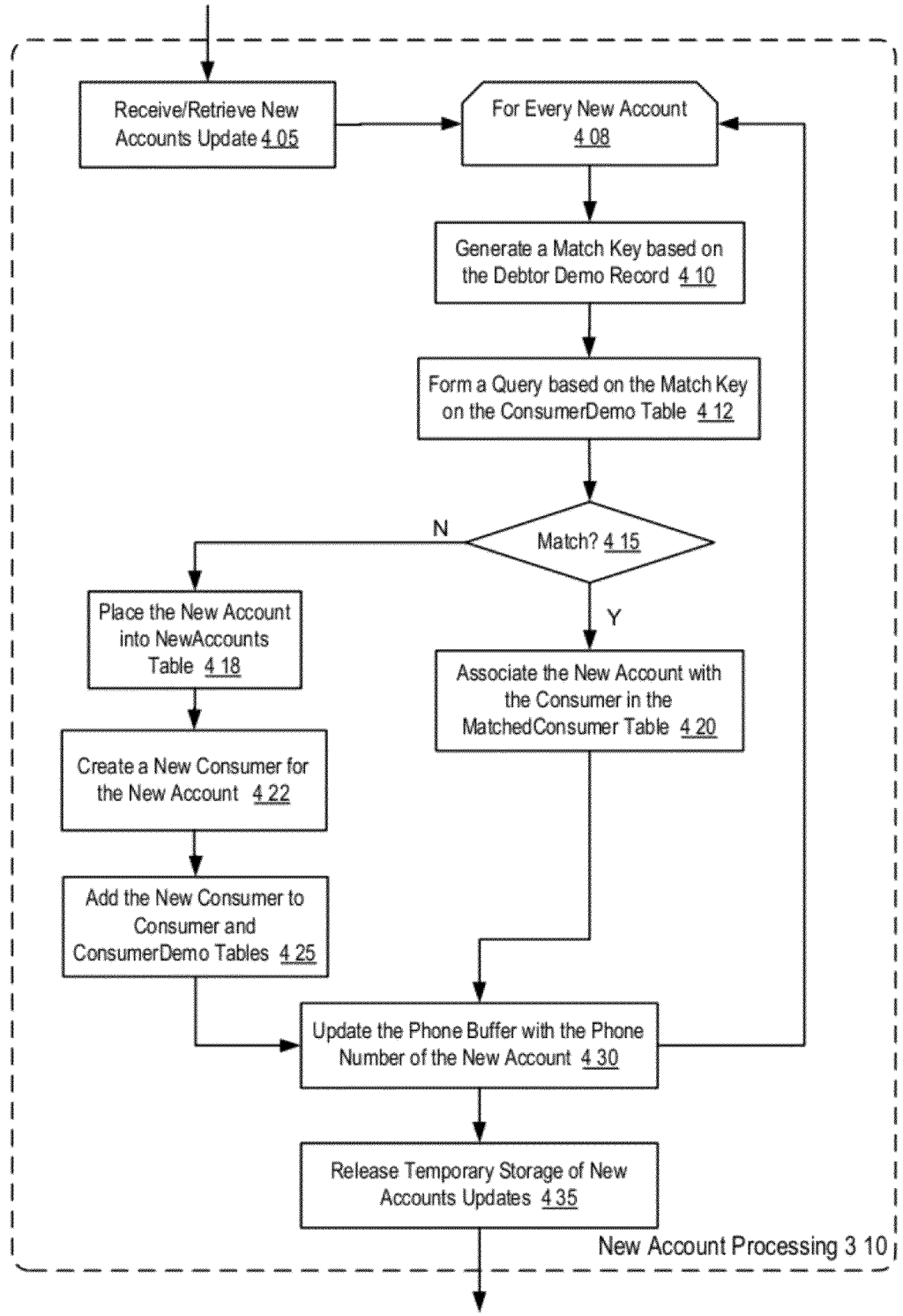
FIGS. 4A-D show logic flow diagrams illustrating aspects of data translation in one embodiment of Data-Translator operation.

FIG. 4A is of a logic flow diagram illustrating aspects of processing new consumer accounts in one embodiment of Data-Translator operation. In one embodiment, the Data-Translator may receive new consumer data from a DataDepot database (e.g., client provided data), and receive/retrieve new consumer accounts update 405 for temporary storage. For example, in one implementation, the Data-Translator may load a complete list of all available consumer accounts from the client DataDepot database (e.g., download via XML) into the Translate database, and for every account, determine whether it is related to an existing consumer profile in the Consumer database.

In an alternative embodiment, the Data-Translator may periodically synchronize and update with the client DataDepot database. In one implementation, the Data-Translator may stamp the time and date of each periodic synchronization, and form a SQL query based on the timestamp of the latest synchronization on the loaded list of available consumer accounts from the client DataDepot database. In that case, the Data-Translator may generate a list of new consumer accounts that have been updated in the client database since the latest synchronization, e.g., a NewAccounts table.

In one embodiment, the Data-Translator may automatically extract data from a database based on data storage formats as further illustrated in FIGS. 7-36.

For every new consumer account on the list 408, the Data-Translator may generate a match key to form a query on the Consumers table in the Data-Translator database 410. In one embodiment, the consumers data stored in various databases associated with a universal variable, and the match key may be generated based on the universal variable associated with each consumer record. For example, the match key may be based on a consumer's demographic profile and the Data-Translator may attempt to match against existing consumer match keys in a consumer demography table.

In one embodiment, if a match is found 415, the Data-Translator may integrate the consumer account data into the Data-Translator database. For example, the Data-Translator may associate information of the new account with the existing consumer data entry in the Consumers database, e.g., adding the account name and account information, etc.

In one embodiment, if no match is found at 415, the Data-Translator may place the new account into a NewAccounts Table 418 in the Data-Translator database, and create a new entry for the new consumer associated with the new account in the Consumers database 422. In one implementation, the Data-Translator may add the created new consumer to the ConsumerDemo Table in the Consumers database 425. Upon integration updated consumer data into the ConsumerDemo Table, the Data-Translator may update the Phone Buffer with the Phone Number associated with the new account 430, as will be further illustrated in FIG. 4D. In one embodiment, after finishing integrating the new accounts, the Data-Translator may release the temporary storage of new accounts 435 in the Translate database.

Figure 4B:
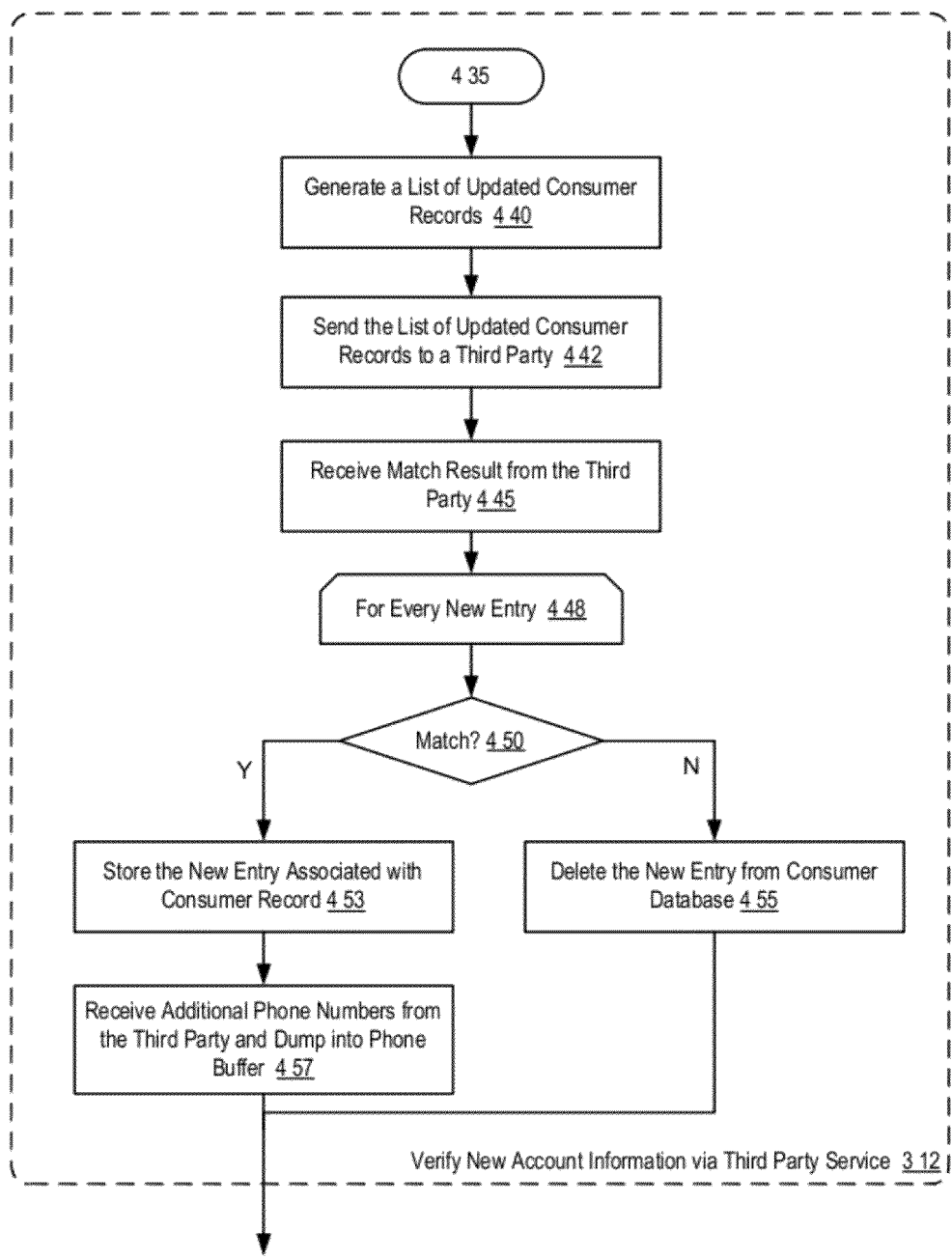

FIG. 4B shows a logic flow diagram illustrating aspects of new account processing within an alternative embodiment of Data-Translator operation. In one implementation, after comparing and integrating the obtained new account data with the existing data in the Consumer database, the Data-Translator may validate the new account data with third party data services, such as, but not limited to LexusNexus data service, Experian data service, and/or the like. In one implementation, the Data-Translator may generate a list of updated consumer records 440. For example, the list may include, but not limited to newly consumer entries, updated consumer entries with newly added information, and/or the like. The Data-Translator may send the list of updated consumer records to a third party 442 for validation and clearing. In one implementation, the third party may compare the consumer data on the list with the data in the third party databases, and return the match result 445.

For example, in one implementation, for every updated consumer record 448, the Data-Translator may send the consumer name, address and social security number (SSN), etc. associated with a new account to LexusNexus for verification. For example, in one implementation, the Data-Translator may form a query based on the consumer's SSN, and retrieve the associated data record based on the query to compare the received consumer information with the LexusNexus-sourced consumer record. In one implementation, example code for a SQL query to retrieve consumer information based on a consumer's SSN may be similar to the following form: SELECT * FROM consumers WHERE consumer_SSN='123456789'

If the consumer data matches 450 any of a LexusNexus-sourced name, address, SSN, etc., the consumer data is validated for storage in the Consumer database 453. Otherwise, if there is no match 448 returned from LexusNexus, the new account may be deleted from the Consumer database 455. In a further implementation, if the consumer data is valid (e.g., the consumer name, address and SSN match with LexusNexus record), the third party may associate additional information from the third party databases and return to the Data-Translator databases, e.g., additional phone numbers 457, etc.

Figure 4C:
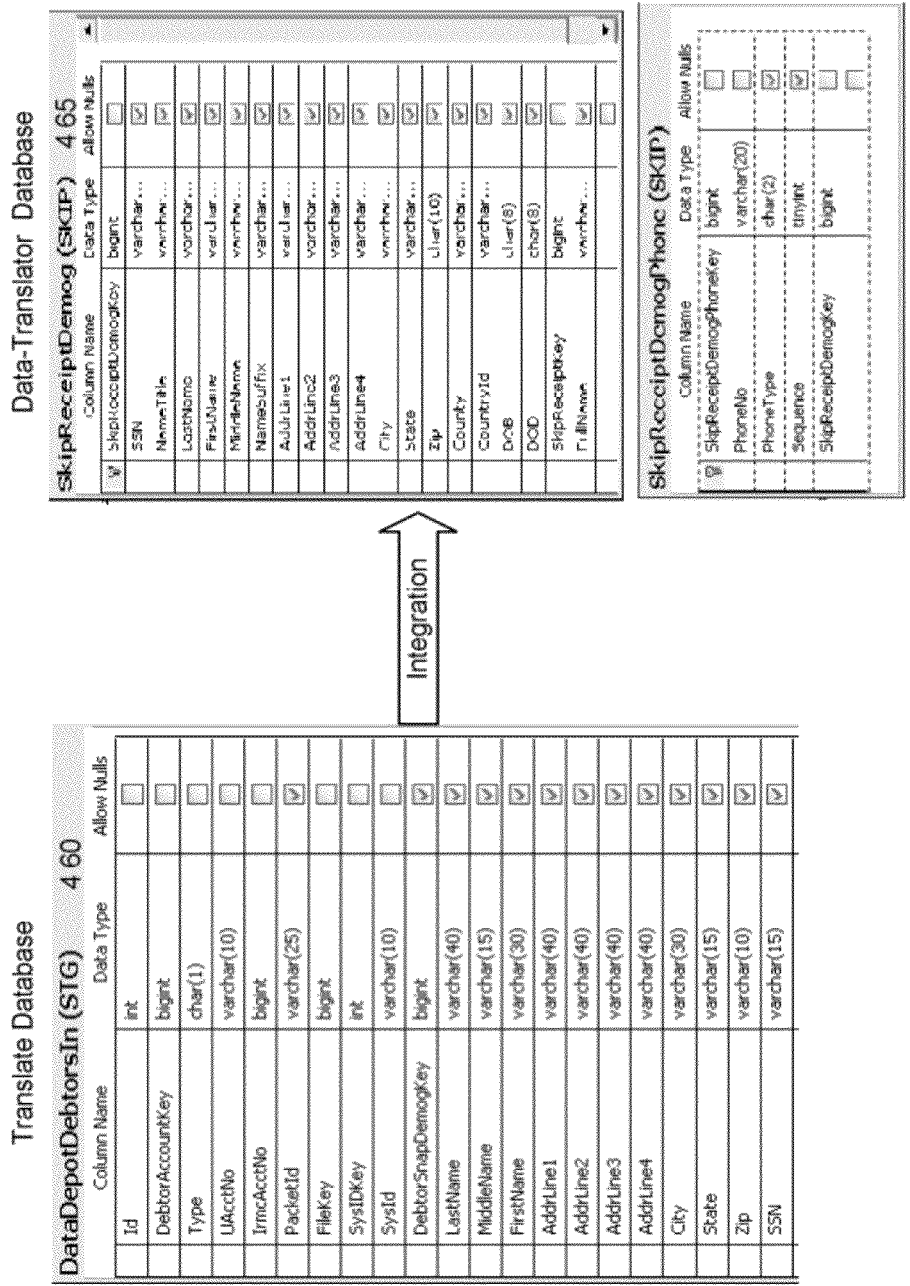

FIG. 4C shows examples of data entries of consumer data in the Translate Database and the stored consumer data in the Consumers database after integration and processing. As shown in FIG. 4C, for example, the Translate database may create a temporary DataDepotDebtors item 460 for the loaded original data from DataDepot databases, and integrate the columns of information associated with a DataDepotDebtors into a SkipReceiptDemog item 465 in the Data-Translator database.

Figure 4D:
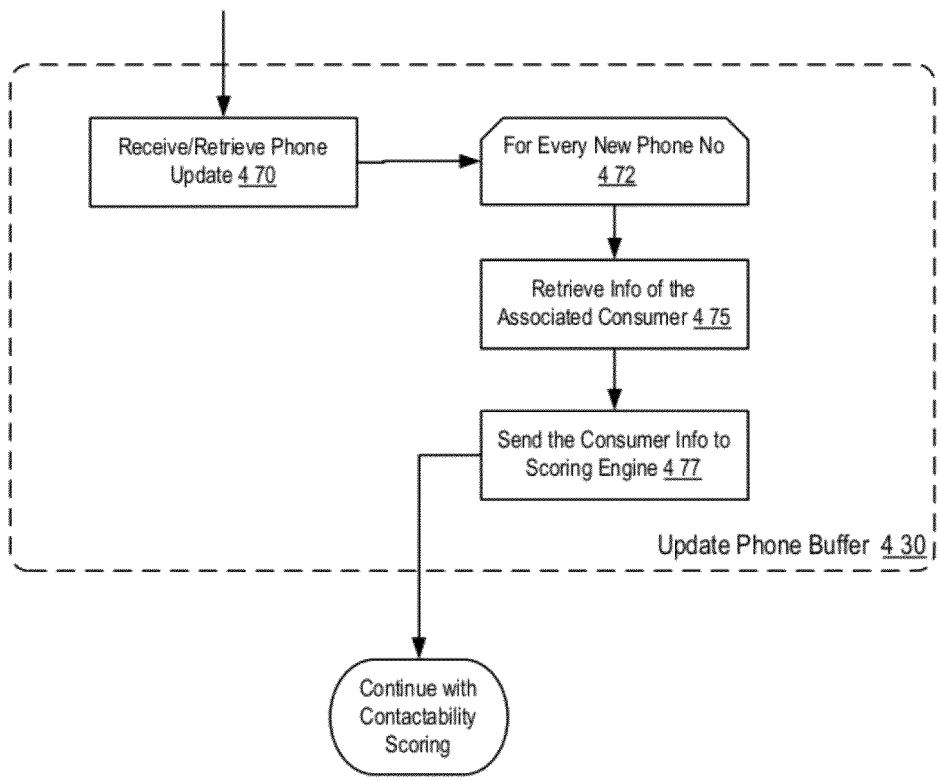

FIG. 4D is of a logic flow diagram illustrating aspects of updating phone buffer in the Data-Translator databases in one embodiment of Data-Translator operation. In one implementation, upon completion of new account integration, the Data-Translator may retrieve phone number updates in the database 470. For every new phone number 472, the Data-Translator may retrieve associated consumer information 475, and send the phone number and associated consumer information to the scoring engine 477. In one embodiment, the phone buffer updating may take place every time new accounts are retrieved and processed. For example, in one implementation, the Data-Translator may generate a NewAccounts table (e.g., a SQL table) maintaining data entries of new consumer accounts, and each data entry of new consumer account is associated with a phone number. In one implementation, the ADDE-TRANSLATOR may query the phone buffer based on the phone number associated with a new consumer account. If the phone number does not exist in the buffer, the phone number may be added to the buffer. In an alternative embodiment, the Data-Translator may be configured to periodically check for phone buffer updates, e.g., every 90 minutes, etc.

Consumer Scoring

Figure 5A:
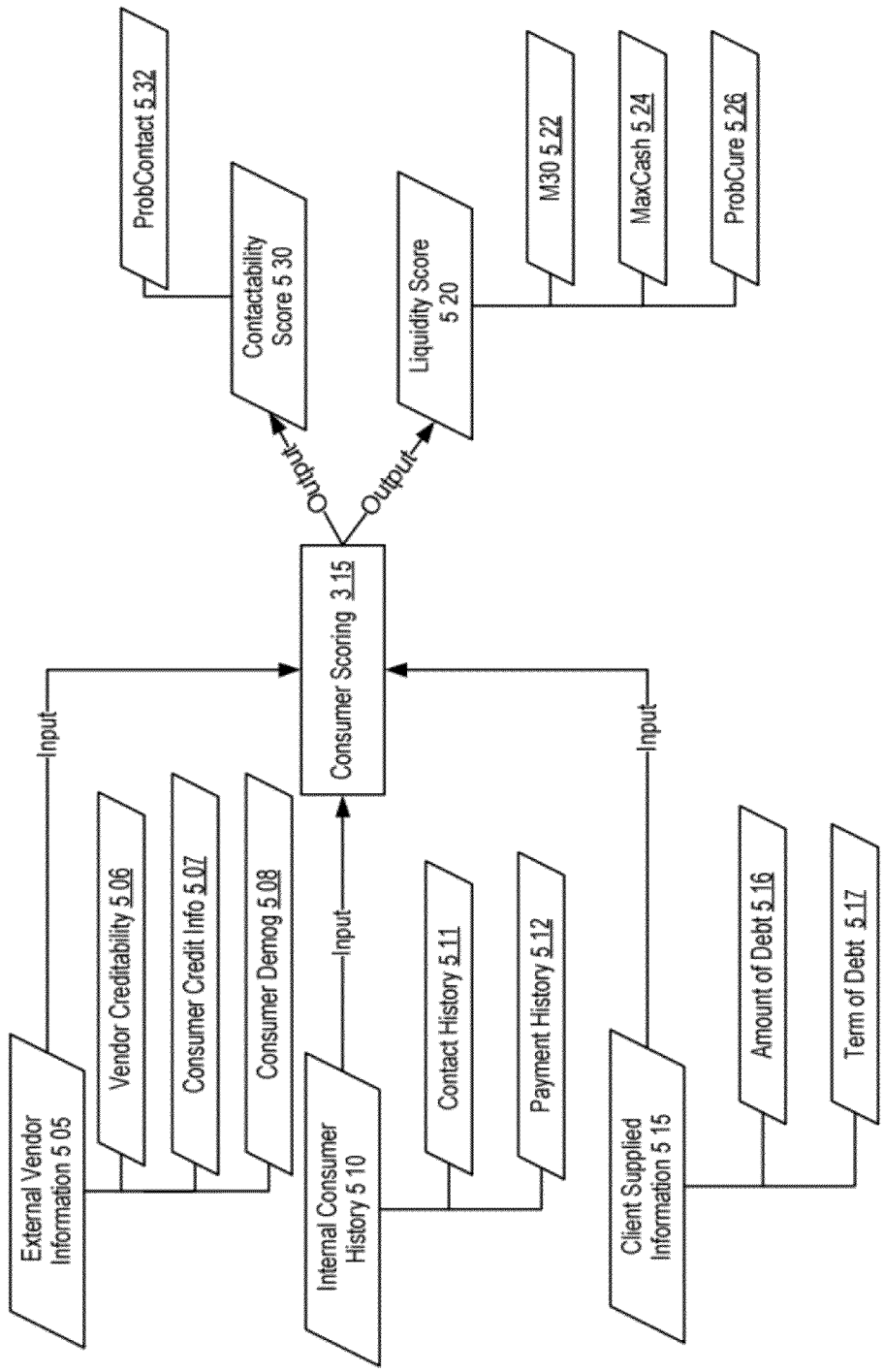

FIG. 5A is a block diagram illustrating aspects of data inputs and outputs of consumer scoring in one embodiment of Data-Translator operation. In one embodiment, the Data-Translator may collect information for consumer scoring 315 to evaluate the probability of a successful dial attempt with regard to a specific consumer.

In one implementation, the Data-Translator may obtain external vendor information 505 from a third party data service entity, such as LexusNexus, Experian, credit rating agencies, mortgage provider, and/or the like. The Data-Translator may obtain data such as consumer credit information 507, vendor creditability 506, consumer demographics information 508 and/or the like and feed into the scoring module. For example, in one implementation, for an individual consumer, the credit history may be considered to analyze the ability of the consumer to provide payment. In one implementation, the credibility of a vendor, i.e., the source of information (LexusNexus, Experian, client, others, etc.) may be leveraged. For example, in one implementation, to score the contactability an individual consumer based on a specific phone number, if the phone number is obtained from a reliable source such as LexusNexus etc., it may be considered high reliability. Otherwise, if the phone number is fed by random Internet search (e.g., Google search etc.), the phone number may be associated with a low reliability score. In one implementation, the consumer demographics information 508 may include information such as, but not limited to, neighborhood income data, and/or the like.

In one embodiment, the Data-Translator may retrieve internal consumer history 510 as an input to the scoring module 315, including the contact history 511 and payment history 512 of an individual consumer. For example, in one implementation, the contact history 511 may include a series of contact attempts, and the phone number, the contact time, the contact dial outcome, and/or the like associated with each contact attempt. In one implementation, the contact dial outcome may be a "right-party-contact" (RPC), i.e., the consumer is successfully reached by the dialing party; or "busy," i.e., the line is busy; or "unreachable," i.e., consumer unavailability, no body answer the dial; or "Voice Wrong Number" (VWN), i.e., the dial fails due to wrong phone number, and/or the like; or "other party," i.e., the consumer is reached by a dial attempt made from parties other than the dialing party). For example, in one implementation, the Data-Translator may adopt a log module, such as Asterisk, and/or the like, to generate call log files to record the call history, which may take a form similar to the following:
AGENTLOGIN (channel no. 006)
. . .
COMPLETEAGENT (holdtime 00:34 |calltime 00:34 |origposition terminal no. 006)
CALLERSTATUS (waittime 00.16 |busy)

For another example, in one implementation, the payment history 512 may include a series of payment events by an individual consumer, such as the payment date, the payment amount, the payment condition (e.g., spontaneous or followed on a contact attempt, etc.), and/or the like.

In one embodiment, the Data-Translator may obtain client supplied information 515. For example, in one implementation, for debt service, the Data-Translator may obtain an amount of debt 516 associated with an individual consumer, the term of the debt 517, and/or the like.

In one embodiment, the obtained and retrieved information may be processed by a scoring module, and the Data-Translator may calculated at least two scores associated with each consumer: a contactability score 530, and a liquidity score 520. In one implementation, the contactability score may take a form similar to a probability value of successfully contacting a consumer based on a specified phone number on the next dial attempt (ProbContact 532). In one implementation, the ProbContact may be a constant value between 0 and 1 indicating an average successful contact probability. In another implementation, the ProbContact may depend on variables, such as the contact time of a day, the contact day of a week, and/or the like. In a further implementation, the ProbContact may be coupled with combinatorial contact logics, e.g., the successful contact probability of consecutive dialing attempts of the one or more phone numbers associated with an individual consumer, etc.

In one embodiment, the liquidity score 520 may indicate the cash payment ability of an individual consumer. The liquidity score may include scores such as, but not limited to, M30 522 (the amount of cash payment a consumer is able to provide in a 30-day time period), MaxCash 524 (the maximum cash payment a consumer is able to provide in total), ProbCure 526 (the probability that the amount in debt will cure its own, i.e., the debtor will just repay the debt without being contacted), and/or the like.

Figure 5B:
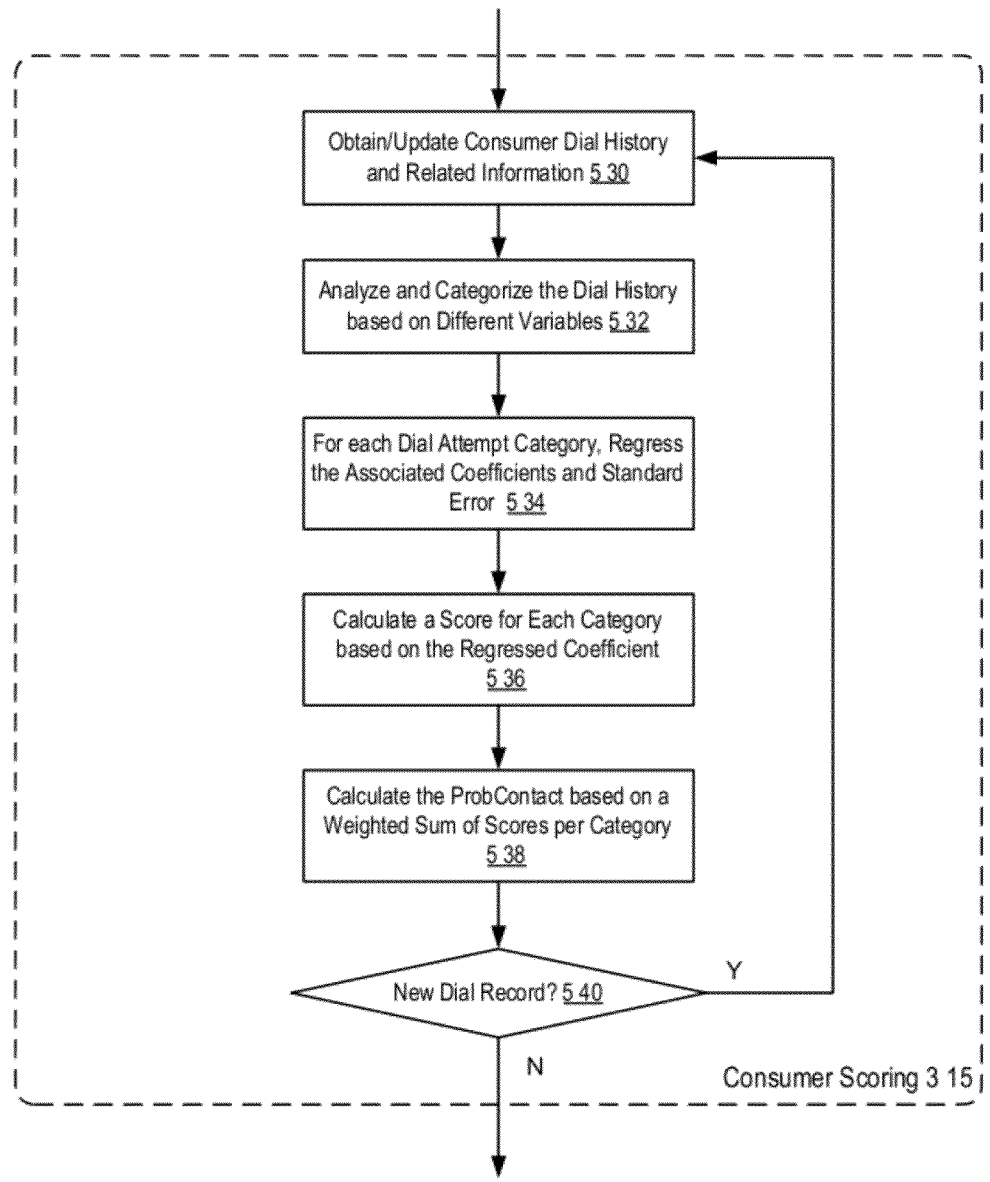

FIG. 5B is of a logic flow diagram illustrating aspects of calculating consumer scores in one embodiment of the Data-Translator. In one embodiment, the Data-Translator may implement statistical analysis of consumer history information and related information to regress and calculate a score. As shown in FIG. 5B in one embodiment, the Data-Translator may obtain consumer dial history and related information 530 as discussed in FIG. 5A. In one embodiment, the Data-Translator may analyze and categorize the obtained dial history based on different variables 532. In one implementation, the Data-Translator may summarize the contact dial history based on at least the following five elements:

Historical number of dial attempts and dial outcomes (RPC, Busy, Unreachable or Other Party);

The source information for the phone number (Client, LexusNexus, Experian or other).

The demographics (neighborhood income, etc) for the consumer;

Total number of phones associated with a consumer; and

Total number of consumers associated with a phone.

In one embodiment, for each dial category, the Data-Translator may build a consumer phone contactability regression model and regress the associated coefficients and standard error 534, based on which a score is calculated for each category based on the regressed coefficients 536. In one implementation, the Data-Translator may calculate the ProbContact based on a weighted sum of the scores per category 538. 534-538 are further illustrated in FIG. 5C.

In one embodiment, the consumer scoring is a dynamic model, wherein the scores will get updated after each additional dial attempt. For example, in one implementation, the Data-Translator may update the consumer dial history and re-calculate the consumer contactability scores if it is determined that new dial record 540 is loaded. For another example, in one implementation, the Data-Translator may be scheduled to update consumer dial history and perform the consumer scoring periodically, e.g., every hour, etc.

FIGS. 5C-5F show exemplary tables illustrating aspects of the consumer contactability scoring in one embodiment of the Data-Translator. As shown in FIGS. 5C-5F, the Data-Translator may summarize the input consumer dial history based on different variables 551. For example, in one implementation, the Data-Translator may consider variables such as, but not limited to the number of consumer dial attempts 560, the number of prior "right-party-contact" (i.e., the consumer is successfully contacted by the client program) count 562, the number of prior "unreachable" count 563, the number of prior "busy" count 565, the source of phone number 567, the ranking of the phone number as indicated in Lexus or Experian record 568, the type of phone number (e.g., current address number, most recent number, cellphone number, unverified number, etc.) 569, zip code category (income level) 570, and the prior presence of the consumer and the phone number (e.g., whether the consumer and the phone number has been involved in the debt service provided by the Data-Translator, etc.) 571.

In one implementation, the Data-Translator may employ regression techniques to calculate consumer contactability predictor coefficients coefficients 552, standard errors 553. For example, in one implementation, the SAS code for obtaining regression coefficients of a linear regression formula may be similar to the following form:
PROC REG DATA=RightPartyContactCounts;
MODEL RPC_Counts=ConsumerDialAttemp PriorRPC-Count PriorUnreachableCount PrioOtherPartyCount PriorBusyCount ClientLexuxExperian ClientLexus ClientExperian Client LexuxExperian Lexus Experian TypeTA TypeTB TypeTC TypeTD TypeTE TypeTF TypeTG TypeTH ZipCodeLevel1 ZipCodeLevel2 ZipCodeLevel3 NumberPhones NumberRPCPhones . . . /p clim;
RUN;

In alternative embodiments, the Data-Translator may adopt other regression models such as double log regression, and/or the like. In one embodiment, the data entries "z" and "P>z" indicate a confidence in the prediction by regression.

In one implementation, the Data-Translator may generate a score for each category on the tables by 557 multiplying the coefficient and the input consumer phone dial attempt value. In one implementation, the Data-Translator may calculate the ProbContact via taking a weighted sum of the generated scores per category. For example, in one implementation, the formula to calculate ProbContact may take a form similar to:

$$ProbContact = \frac{\exp\left\{\sum_{Category} Coefficient \times Input\right\}}{1 + \exp\left\{\sum_{Category} Coefficient \times Input\right\}},$$

where the calculated ProbContact is a value within [0,1], indicating the probability of a right-party-contact outcome on the next dial attempt.

In one embodiment, the Data-Translator may calculate liquidity scores associated with a consumer based on regression models similar to that of calculating the ProbContact. For example, in one implementation, the Data-Translator may determine regression coefficients for M30, MaxCash and ProbCure based on the payment history data of a specific consumer, and generate estimates for each consumer by regression models similar to those described in FIG. 5B. For example, in one implementation, the Data-Translator may analyze the payment history and categorize data such as, but not limited to, the total amount in debt, payment amount within 30 days without being contacted, payment amount within 30 days after being contacted, payment amount within 60 days without being contacted, payment amount within 60 days after being contacted, payment amount within 90 days without being contacted, payment amount within 90 days after being contacted, zip code, prior presence in debt program, default presence, and/or the like. In one implementation, the Data-Translator may calculate regression coefficients of each category in a similar manner as described in FIGS. 5A-F, and determine an estimate for M30, MaxCash and ProbCure based on the coefficients. In a further implementation, the Data-Translator may determine liquidity scores such as M60 (the estimated payment amount that the consumer is able to provide within 60 days) and M90 (the estimated payment amount that the consumer is able to provide within 90 days).

In some cases, there may not be sufficient historical data of debt payment associated with a consumer. For example, a consumer may be involved in a debt program for the first time, or have only been involved for a few times. In such cases, the past debt payment history may not establish enough samples for regression models. In an alternative embodiment, the Data-Translator may calculate M30 and MaxCash by stochastic models. For example, in one implementation, the Data-Translator may subtract an average income value based on the demographic information of a consumer by an estimated average expenses value categorized by consumer address to obtain an estimate of the payment capability.

In one embodiment, the Data-Translator may develop dialing strategies based on the calculated consumer contactability scores and liquidity scores. In one embodiment, the Data-Translator may generate a prioritized list of consumer phone numbers and automatically dial down the list. For example, for a set of consumers needed to be contacted for a program, the Data-Translator may sort all numbers associated with the consumers based on the contactability and liquidity scores to generate a prioritized list.

Strategic Auto-Dialer

Figure 6A:
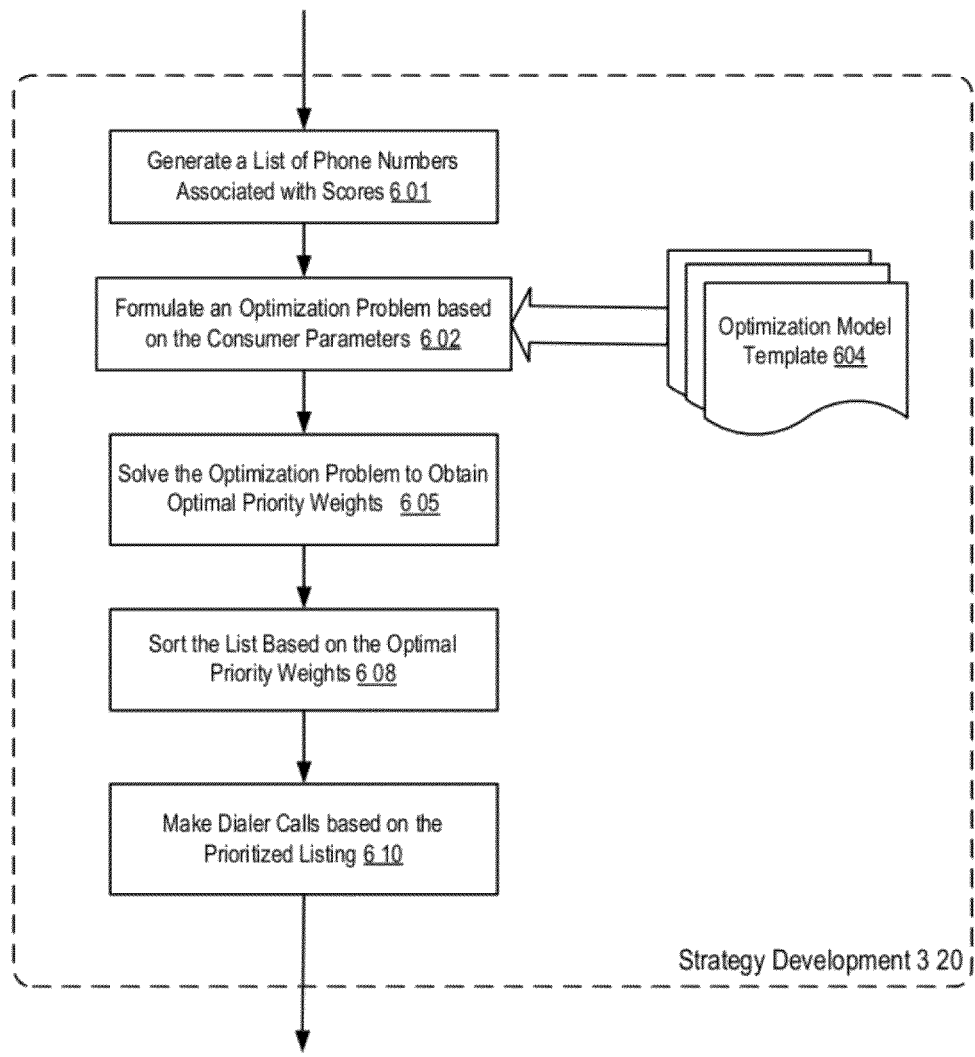
FIGS. 6A-B provide logic flow diagrams illustrating aspects of development and execution of contact strategy in one embodiment of Data-Translator operation.

FIG. 6A shows a logic flow diagram illustrating aspects of optimizing prioritized listing in one embodiment of the Data-Translator. In one embodiment, the Data-Translator may generate a list of phone numbers and associate the calculated scores 601, e.g., each phone number associated with a contactability score and a liquidity score associated with the corresponding consumer. In one embodiment, the Data-Translator may re-order the list of phone numbers based on a variety of criteria. For example, in one implementation, the Data-Translator may formulate an optimization problem 602 to obtain an optimal ranking of dialing list.

In one implementation, the Data-Translator may retrieve an optimization model template 604, which may take a form similar to the following:

| | |
|---|---|
| maximize | $U_{ProbContact, Liquidity}$ (priority weights) |
| subject to | priority weights > 0, |
| | W(ProbContact, Liquidity, priority weights) ≥ minimum expected amount | where the function $U_{ProbContact, Liquidity}$ (priority weights) indicates an objective, and W(ProbContact, Liquidity, priority weights) indicates an expected amount of payment based on the parameters ProbContact and liquidity scores, and the variable priority weights. For example, in one implementation, the $U_{ProbContact,Liquidity}$ (priority weights) may take a form similar to a weighted logarithm utility function:

$$U_{ProbContact,Liquidity}(\text{priority weights}) = \sum_{all\ phones} \text{priority weight} \times \log(ProbContact \times \text{liquidity score}),$$

and the W(ProbContact,Liquidity,priority weights) may take a form similar to:

$$W(ProbContact, \text{Liquidity, priority weights}) = \sum_{all\ phones} ProbContact \times \text{priority weight} \times \text{consumer debt}.$$

In alternative implementations, the $U_{ProbContact,Liquidity}$ (priority weights) and W(ProbContact,Liquidity,priority weights) may be selected or input by a user via a user interface.

In one implementation, the Data-Translator may employ non-linear (e.g., programming) algorithms to solve the optimization problem and obtain a set of optimal priority weights 605. For example, optimization algorithms such as, but not limited to, Newton's method, gradient descent method, bisection algorithm, and/or the like, may be employed.

In one embodiment, the Data-Translator may re-sort the list of phone numbers based on the calculated set of optimal priority weights 608, and make dialer calls based on the prioritized listing of phone numbers 610.

In one embodiment, the Data-Translator may apply a dialing rule filter to the dialing listing. For example, in one implementation, the filter may specify dialing rules to determine which numbers should not be dialed, as further illustrated in FIGS. 36A-E.

Figure 6B:
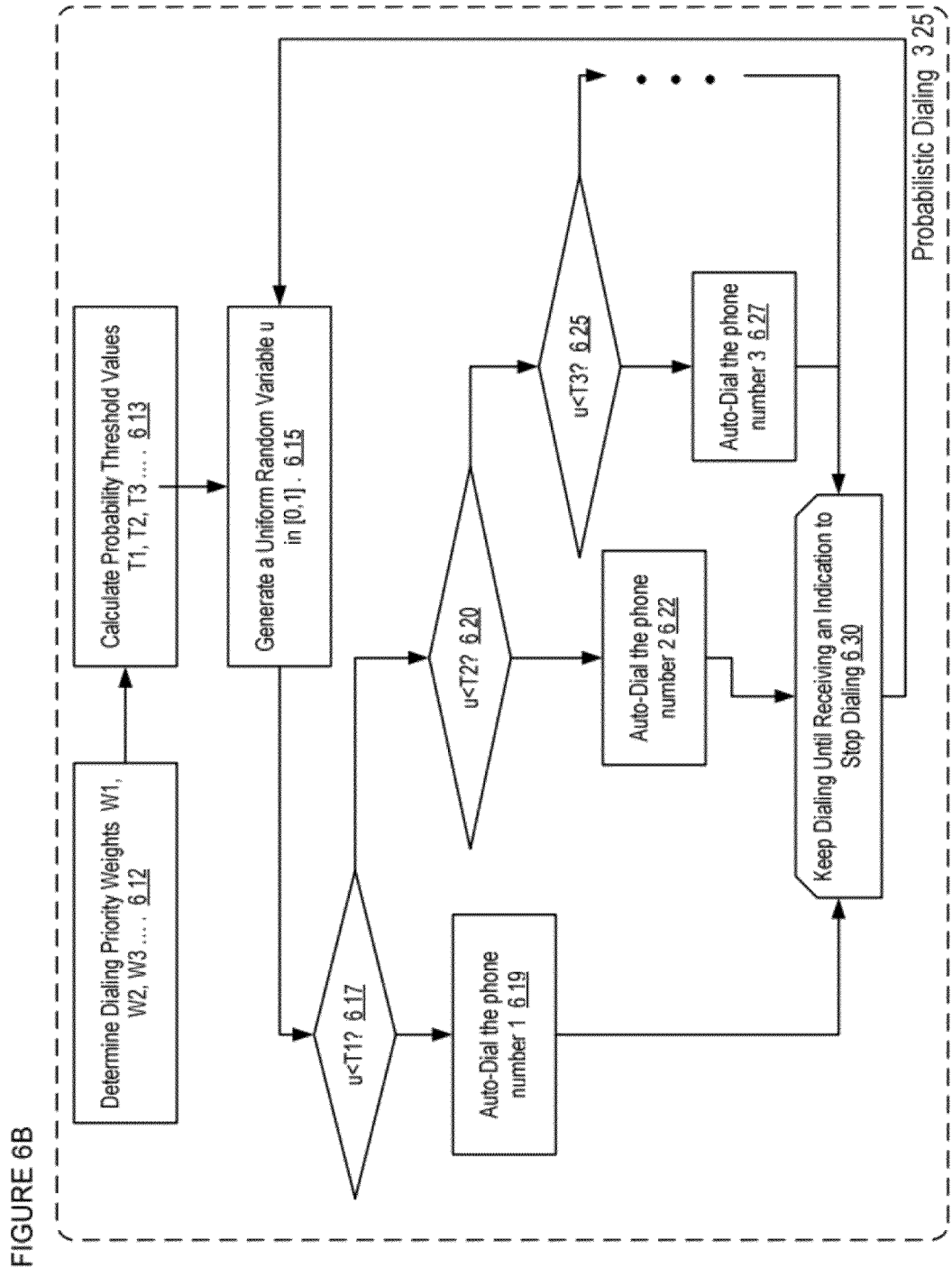

In an alternative embodiment, instead of dialing down a list of phone numbers, the Data-Translator may perform a probabilistic dialing procedure. FIG. 6B shows a logic flow diagram illustrating aspects of automatic dialing strategy based on probabilistic dialing in one embodiment of the Data-Translator. For example, in one implementation, the Data-Translator may select to dial one consumer based on a probability distribution, where the associated probability distribution is determined by the calculated consumer contactability scores and liquidity scores.

As shown in FIG. 6B, in one embodiment, the Data-Translator may determine a dialing probability weight for each phone number 612, denoted by W1, W2, W3 . . . . For example, in one implementation, the dialing probability weights may be a set of (near and/or) optimal solutions to the optimization problem at 602. For another example, in one implementation, the dialing probability weights may be calculated via a predetermined function, e.g., Priority Weight=Contactability Probability×Max30, etc. In one implementation, the Data-Translator may calculate probability threshold values based on the probability priority weights 613, denoted by T1, T2, T3, . . . , such that T1<T2<T3 . . . <1. For example, in one implementation, the probability priority threshold values may be calculated via:

$$T_1 = \frac{W_1}{\sum_i W_i}, T_2 = \frac{W_1 + W_2}{\sum_i W_i}, T_3 = \frac{W_1 + W_2 + W_3}{\sum_i W_i}, \ldots$$

In one embodiment, the Data-Translator may periodically (e.g. every 5 minutes, etc.) generate a uniformly distributed random variable $u \in [0,1]$ 615. For example, in one implementation, the C++ implementation of generating a uniformly distributed random variable between 0 and 1 may take a form similar to:

double AOD;
   srand((unsigned)time(NULL));
   for (int i=0; i<10;++i)
   {
      AOD=((double) rand( )/(RAND_MAX+1));
      cout<<endl<<AOD;
   }

In one implementation, if the generated random variable u<T1 617, the Data-Translator may automatically dial the phone number 1, i.e., the phone number associated with priority weight 1 on the list 619. Otherwise, if the generated random variable T1<u<T2 620, the Data-Translator may automatically dial the phone number 620, the Data-Translator may automatically dial the phone number 2, i.e., the phone number associated with priority weight 2 on the list 622. Otherwise, if the generated random variable T2≤u≤T3 625, the Data-Translator may automatically dial the phone number 3, i.e., the phone number associated with priority weight 3 on the list 627. The Data-Translator may continue determining which phone number should be dialed based on the generated random variable u in similar manners.

In an alternative embodiment, the Data-Translator may generate random variable and make automatic dials based on other probability distributions, such as exponential distribution, Poisson distribution, normal distribution and/or the like.

In one embodiment, the probabilistic dialing may keep running unless the Data-Translator receives an indication to stop 630. For example, in one implementation, a system operator may determine to stop calling one consumer if the consumer has already paid the debt. In that case, the Data-Translator may remove the phone numbers associated with the consumer from the dialing list and re-calculating weights and thresholds for probabilistic dialing.

In alternative embodiments, the Data-Translator may generate a prioritized dialing list based on predetermined rules. For example, in one implementation, phone numbers associated with a shorted remaining time period to the due date of the program may be ranked higher. For another example, in one implementation, priority information of clients and programs may also be considered in determining the dialing list. In one implementation, the pre-determined rules may be submitted by a system operator via a user interface.

In a further embodiment, the Data-Translator may combine automatic robot calls with call center representatives. For example, in one implementation, the Data-Translator may allocate phone numbers to different call centers based on a series of factors such as consumer demographics, call representative availability, client preferences, and/or the like. In one implementation, the Data-Translator may allocate a phone number dial attempt to a call center representative based on predetermined rules. For example, in one implementation, a call center representative may receive a request to talk to a consumer if the consumer is successfully reached by a robot call and request representative service.

FIG. 6C provides a logic flow diagram illustrating aspects of talk strategy with a consumer in one embodiment of the Data-Translator. In one embodiment, the Data-Translator may dial a consumer phone number 635, e.g., via probabilistic dialing as described in FIG. 6B. If the dial attempt fails to reach the consumer, the Data-Translator may proceed with 615. If the consumer is successfully reached 640, in one implementation, the Data-Translator may identify and transfer the call to an available call center representative. For example, in one implementation, the Data-Translator may choose a call center representative located with the closest zip code and/or the phone number to those of the consumer. In an alternative implementation, the Data-Translator may generate a list of available call center representatives at the moment, each associated with a statistical success rate in obtaining consumer payment over the call. The Data-Translator may assign the call to the currently available representative with the highest success rate.

In an alternative embodiment, the Data-Translator may make robot calls based on pre-recorded dialogues. For example, in one implementation, if a consumer is connected over the phone call, the Data-Translator may automatically play a segment of pre-recorded individual debt information to the consumer, and inquire the consumer whether he or she is willing to pay the debt by articulating "Yes" or "No." The Data-Translator may then analyze and extract information from the consumer indication from the phone call and determine the next step strategy.

In one embodiment, as shown in FIG. 6B, the Data-Translator may ask the consumer to pay the total desired payment amount 642. If the consumer submitted an answer of "Yes," the Data-Translator may provide payment option to the consumer 643. For example, in one implementation, the consumer may choose to articulate a credit card number or deposit account number over the line, to manually enter a credit card number or deposit account number (e.g., via IVR), or to speak with a call center representative. In one implementation, the Data-Translator may proceed with consumer payment 644.

In one embodiment, if the consumer submitted an answer of "No" at 642, the Data-Translator may inquire whether the consumer is able to pay an amount based on the liquidity score 650. For example, in one implementation, the Data-Translator may ask the consumer to pay an amount equivalent to M30, and indicates that the consumer will not be reached again within 30 days once he or she makes the payment of M30. Similarly, the Data-Translator may provide an option for the consumer to pay an amount equivalent to M90.

If the consumer submits a positive answer 652, the Data-Translator may proceed with 643. Otherwise, the Data-Translator may keep inquiring the consumer for a minimum payment amount 653. For example, in one implementation, the minimum payment amount may be determined by the debt program associated with the consumer, which may be an amount that has to be made to avoid penalty. If the consumer gives a negative answer at 655, the Data-Translator may inform the consumer of regulatory policies 657, e.g., related regulatory policies and potential penalties of failing to pay.

In one embodiment, if the consumer hangs up the call in the middle of a conversation with the Data-Translator, the Data-Translator may determine re-dial strategies based on the timing of call interruption. For example, in one implementation, if the consumer quits the call without submitting any response (e.g., at 645), the Data-Translator may return to 615 and proceed with the probabilistic dialing. For another example, if the line is unintentionally interrupted due to consumer misoperation, poor connection, and/or the like, e.g., the call is terminated after the consumer submitting a first response at 645, the Data-Translator may re-dial the phone number immediately. In one embodiment, the Data-Translator will retain its current state in the consumer response dialogue, redial the consumer, provide a message apologizing for the disconnection, and proceed where the dialogue left off by moving to the last unanswered response question (i.e., returning to its saved state).

Application Tailoring and Device Virtualization/Configuration

Figure 7:
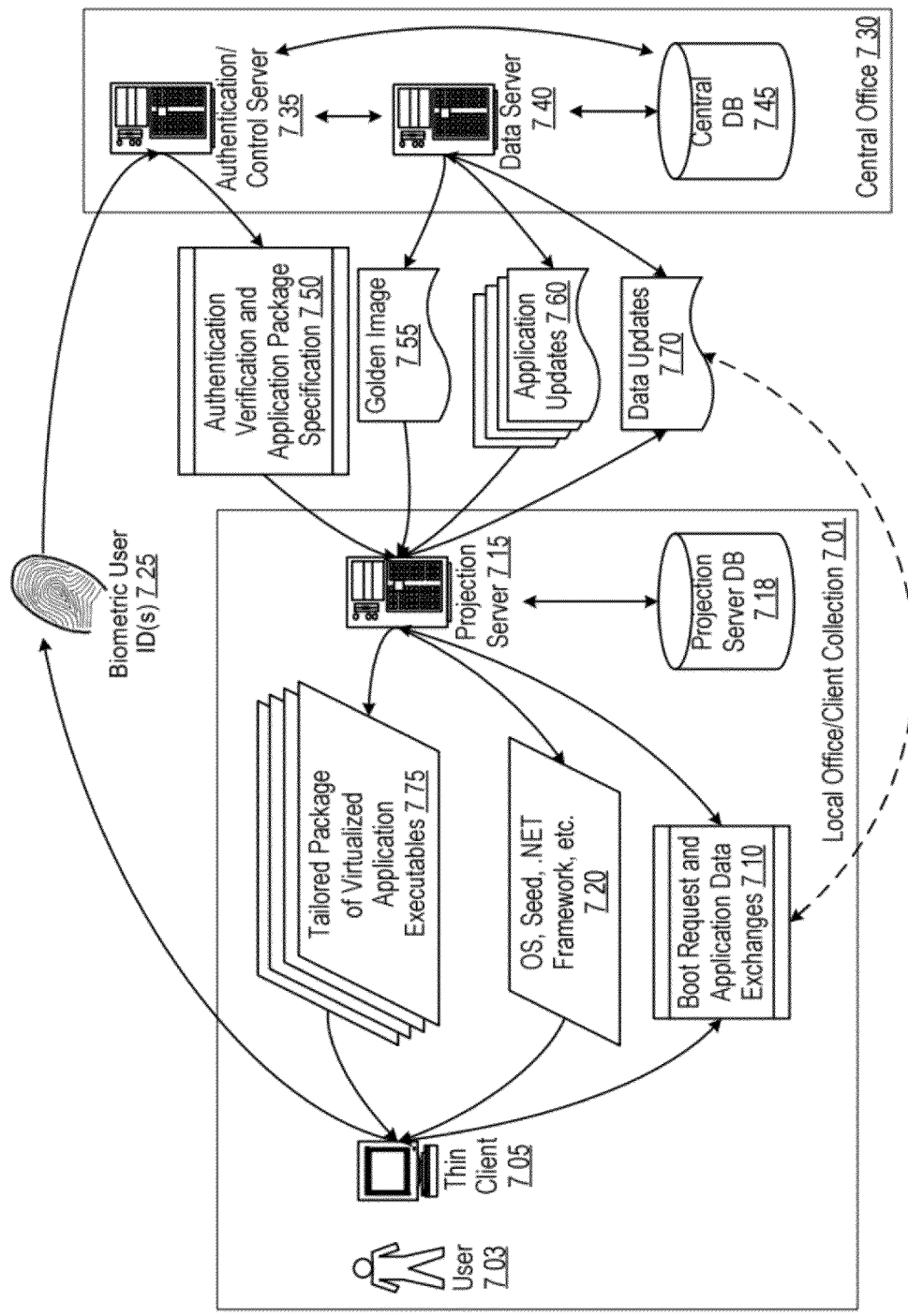
FIG. 7 illustrates an implementation of data flow among and between Data-Translator components and/or affiliated entities for user authentication and application resource allocation in one embodiment of Data-Translator operation.

FIG. 7 illustrates a dataflow of an example embodiment of Data-Translator operation among and between Data-Translator components and/or affiliated entities for user authentication and application resource allocation. A variety of other compositions and arrangements of Data-Translator components and affiliated entities may be used in alternative embodiments of Data-Translator operation. For example, in one embodiment, an Data-Translator, requesting system, and database may all be localized within a single computing terminal. In another embodiment, the Data-Translator may receive input strings over a network from one or more mobile devices and provide access to data from one or more databases in response to such received strings. The data flow shown in FIG. 7 is intended for illustrative purposes only, and to describe aspects of a particular embodiment.

In one embodiment, the Data-Translator includes facilities for thin client virtualization and application tailoring based on user identities and/or profiles. In one implementation, a Data-Translator computing environment may include a local office and/or collection of client terminals 701, wherein each client terminal 705 operated by a user 703 may comprise a thin client. In one implementation, the thin client may have no operating system initially installed. The computing environment may further include a projection server 715 communicatively coupled to the plurality of client terminals 705 in the local office. In one implementation, the projection server 715 may be situated locally with respect to the plurality of client terminals 705. In one implementation, the projection server may comprise a plurality of servers configured as a cloud computing facility. The computing environment may further include a central office facility 730 comprising one or more data 140 and/or authentication servers 735. A data server 740 in the central office may maintain and/or provide access to a central database 745, which may include master copies of one or more operating systems, applications, data files and/or database tables and/or the like. In one implementation, the data server may supply a so-called Golden Master or Golden Image 755 to the projection server 715, such as on a periodic basis, whenever requested by the projection server, whenever updates are made, and/or the like. The Golden Image 755 may, in one implementation, include an operating system destined for installation on one or more client terminals. The Golden Master may include additional files as well in various implementations, such as an authentication application, seed and/or compressed files for other applications, .NET framework files, and/or the like. The data server 740 may further provide a plurality of application files, application file updates 760, data values and/or updates 770, and/or the like to the projection server, which may be destined for installation and/or use on one or more of the client terminals. The projection server 715 may store received application files, data, and/or the like in a projection server database 718. In one implementation, the data server 740 may directly exchange data with one or more client terminals 705, including updated data values, records stored in the central database 745, and/or the like. In one implementation, application files may be "virtualized" prior to installation on the client terminals. In one implementation, application virtualization may be achieved using VMWare Thinapp. In one implementation, application virtualization occurs after application files are received at the projection server. In an alternative implementation, application files are virtualized at the central office, and virtualized application files are then provided to the projection server.

At power on, a client terminal 705 may be configured to boot from a communications network instead of from any local disk. In one implementation, a Preboot Execution Environment (PXE) boot may be engaged to boot the client terminal from the network, wherein the client polls for, contains, and/or is provided an address on the network to obtain boot information and/or to send a boot request. The client terminal's boot request 710 may be relayed to the projection server 715 which, in turn, may provide elements of the Golden Image, such as operating system files, application and/or authentication seed files, .NET framework files, and/or the like 720 for installation at the client terminal. Authentication seed files may then allow a user to submit authentication information in order to identify the user and/or initiate provision of further files and/or application use authorizations. In one implementation, the client terminal may be equipped with one or more biometric login devices (e.g., fingerprint and/or palmprint scanner, retina scanner, facial recognition scanner, earshape recognition scanner, voice recorder, typing rhythm analyzer, and/or the like) configured to admit biometric data associated with a user 725. In one example embodiment, a Digital Persona U.are.U. Fingerprint Reader is employed, which captures an image of the users fingerprint, converts it to a binary format and provides it via a Digital Persona service to the Authentication Control Server 735 server for authentication. In one implementation, software used to engage the one or more biometric login devices is provided from the Golden Image by the projection server to the client terminal after a boot request is made. In one implementation, other authentication measures may be used in place of and/or in addition to biometric authentication, such as use of a password, key device, secret question, and/or the like.

The user may engage the biometric login device and/or any other authentication measures to submit user identification information 725 to an authentication server 735, such as may be located at a central office 730. The authentication server may then verify and/or authenticate the user identification information, such as by comparing it against stored user identification information, e.g., as may be stored in a central database 745, ensuring a match beyond a specified threshold, and/or the like. If a match is detected, the authentication server 735 may query a database (e.g., the central database 745) for a matching user's profile to determine user access authorizations contained therein, such as a package of applications that should be provided to the user. In one implementation, the Data-Translator may employ Microsoft Active Directory for administration of user access and authorizations, which may run on the Data Server. Based on the user identifier (ID) and/or information in an associated user profile, the Data-Translator may determine one or more applications that the user is permitted to access. In one implementation, the applications a user may access may be correlated with one or more of a user's company, a user's department, a user's employment position, a user's location, a user's assignment, and/or the like. The authentication server 735 may provide an instruction 750 to the projection server 715 to provide authorized application files to the client terminal 705 at which the user 703 is logged in. In turn, the projection server may provide application files 775, such as in the form of executable virtualized application files, to the client terminal at which the user is logged in. In one implementation, the user my be required to periodically re-enter login and/or authentication information to ensure that they are still the user of that client terminal, and that another user has not taken their place.

FIG. 8A shows an implementation of logic flow for user authentication and application resource allocation in one embodiment of Data-Translator operation. The implementation in FIG. 8A indicates entities that may perform aspects of the method shown in some implementations, including authentication and/or data server(s) 801, a projection server 804, and a client terminal 807. The authentication and/or data server(s) 801 may generate and/or update a golden image, application files, data tables and/or records, and/or the like 810 and may pass the golden image and/or other updates to the projection server 813, which receives them at 822. The authentication and/or data server(s) may subsequently determine whether to new updates are available for a new golden image 816 and, if not, then wait for a period of time before checking again 819. The projection server, in one implementation, may store the received golden image, application files, data files, and/or the like, such as in a database and/or in temporary storage.

A client terminal may be booted, such as on machine startup, to initiate a network (e.g., PXE) boot 831, passing a boot request over the network, such as to the projection server 804. The projection server 804, in turn, may monitor and/or determine whether a boot request has been received 828. If not, the projection server may wait for a period of time before checking again for a boot request 825. In one embodiment, the boot request may be configured in accordance with the Preboot Execution Environment (PXE) Specification v.2.1 standard.

Once the request is received, the projection server may pass files and/or data to the client terminal 834, such as by employing HP Image Manager. In one implementation, the projection server may provide all or aspects of the Golden Image to the client terminal, such as: operating system files; .NET framework files, Java files, and/or the like; application seed files; authentication and/or login input (e.g., biometric) files; and/or the like. The client starts the boot process and begins to copy and unpackage the materials provided from the projection server. Using files received from the projection server which have now been executed/instantiated, a user at the client terminal may login and/or otherwise generate a user ID 837. In one implementation, the user ID generated at 837 comprises a biometric user ID, such as but not limited to a thumbprint or scan; a print or scan of any other finger, combination of fingers, part of the palm, and/or the like; an iris or retina scan; facial image scan; earshape image scan; voice audio data; and/or the like. For example, one of the packages received at the thin client may be DigitalPersona Pro and/or other thumbprint device drivers and capture programs. The generated user ID may then be passed to the authentication and/or data server(s) 840 (e.g., by sending it via FTP, HTTP Post, SSH, FTPS, SFTP, HTTPS, another Digital Persona service, and/or the like), which may then determine whether the received ID is valid 843. For example, the send message may include an image converted to binary format and may be sent to a server-side component of DigitalPersona Pro fingerprint authentication application, which will perform the recognition/identification of the biometric identifier. In one implementation, this determination may be made based on a comparison of the received ID with stored IDs, stored ID formatting information, and/or the like. If the user ID is determined to be invalid at 843, an error handling procedure may be undertaken, a request may be transmitted for reentry and/or retransmission of the user ID information, and/or the like 846.

For valid user IDs, the authentication and/or data server(s) may access user information and/or a user profile associated with the user ID 849. Accessed user information may then be used to determine which applications to include in a tailored application package for that user 852. For example, in one implementation, a user profile may have fields identifying authorized applications for that user. In another implementation, profile fields may be compared with application access fields defined separately for the applications, and those applications having appropriately matching fields with the user profile may be selected for that user. For example, a user profile and/or other user information may, in one implementation, identify a department code, program code, and/or the like structured syntax string associated with the user (e.g., as may be see in FIGS. 12-13), and various applications may also have associations with various department codes, program codes, and/or the like. The authentication and/or data server(s) may then, in this implementation, instruct provision applications sharing one or more department codes, program codes, and/or the like with those of the user to the user's client terminal. In one implementation, some or all of the determination of which applications to provide to the user may take place at the projection server, and the authentication and/or data server(s) may provide sufficient information to the projection server to allow it to complete the identification of user-appropriate applications.

Once the appropriate package of applications is determined for the user, the authentication and/or data server(s) may pass an instruction message to the projection server 855, the message comprising, in one implementation, specification of applications to be provided to the user. The projection server may receive the instruction and select a package of tailored application files to provide to the client terminal 858. In one implementation, the projection server may select and provide to the client terminal a plurality of virtualized application executable files corresponding to selected applications. For example, FIG. 8B shows an implementation of a user interface for specifying user application privileges in one embodiment of Data-Translator operation. The user interface provides a system administrator with facilities to specify a policy, rule, and/or the like delineating which employees, groups of employees, third parties, and/or the like should receive which applications and/or application packages. In the illustrated implementation, a user may specify at 885 a client and/or group of clients to which a particular specified application distribution and/or access rule and/or policy should be applied. The application may be specified at 886, and characteristics of users, employees, groups, departments, and/or the like who should receive and/or be allowed to use that application may be specified at 887-892. For example, access characteristics may include an employee title 887, an employee function 888, an employee subfunction 889, a department (as may be specified by a department code, which is discussed in further detail below and with reference to FIG. 13) 890, a program (as may be specified by a program code, which is discussed in further detail below and with reference to FIG. 12) 891, an employee name 892, and/or the like. The interface therefore provides both for specification of application privileges for wide classes of users, as well as for user-friendly exception handling whereby a single user or highly specific class of users may be given special access privileges as needed.

In some implementations, application files received from the authentication and/or data server(s) at 822 may be virtualized at the projection server, such as via application of VMWare's Thinapp to the application files to yield virtualized application executables, such as in .EXE format. In another implementation, application files may be virtualized at the authentication and/or data server(s), and the virtualized application executables provided to the projection server for temporary storage until they are to be provided to the client terminals.

In one implementation, virtualized application executables may be pushed to the thin client using a secure file transfer protocol, secure shell (SSH), and/or the like.

The projection server passes the virtualized application executables to the client terminal 861, which receives, unpcackages, and/or runs the files to engage the applications at the client terminal, including exchanges of data related to operation of those applications 870. The projection server may then monitor whether a logout request has been received from the client terminal 864 and, if not, may wait until such a request is received 867. The user at the client terminal may then initiate a logout when he or she is finished with the application session 873, precipitating a re-initialization of the client terminal, whereby data updates are passed over the network to one or more targets, and the client terminal is returned to its pre-login and/or pre-boot state 876. In one embodiment, the terminal may erase (e.g., securely) the contents of its memory to ensure a pre-boot state and enhance security, for example, by issuing root/admin level format command on the storage mechanism, e.g., hard drive. In one implementation, user generated data and/or other saved data may be persisted and/or passed to the authentication and/or data server(s) by the projection server, and projection of application images to the client terminal ceased 879. In an alternative implementation, the client terminal may itself communicate directly with the authentication and/or data server(s) to provide data update information. Data updates received by the authentication and/or data server(s) may be stored and/or persisted, such as in a central database 882.

Figure 9:
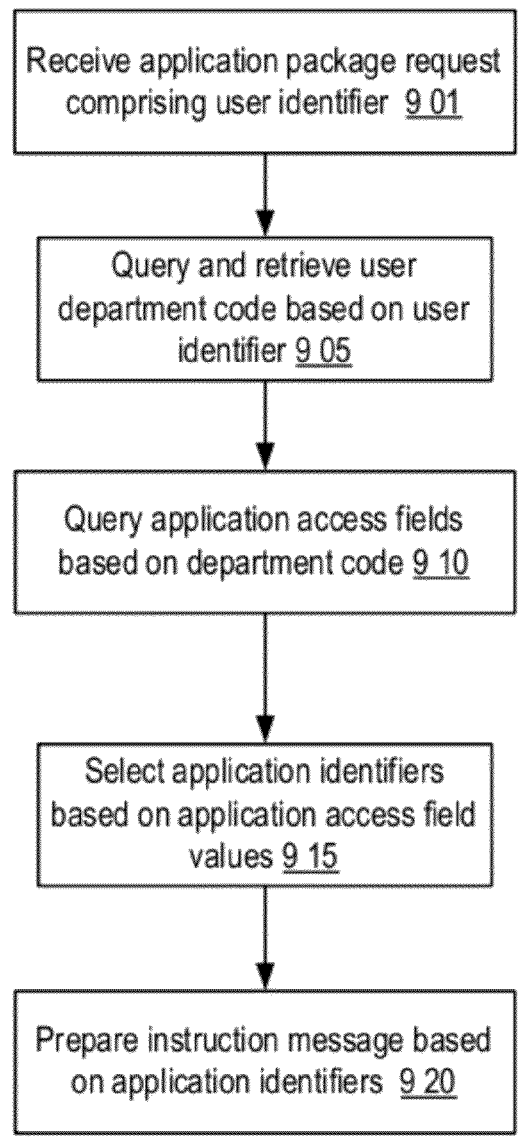
FIG. 9 shows an implementation of logic flow for application tailoring based on department codes in one embodiment of Data-Translator operation.

FIG. 9 shows an implementation of logic flow for application tailoring based on department codes in one embodiment of Data-Translator operation. In one implementation, the method illustrated in FIG. 9 may be operable on an authentication and/or data server. An application package request is received, the request comprising at least a user identifier 901. In another implementation, the request may further comprise a client terminal identifier and/or other information to assist in selecting an application package and/or providing requested applications to a client terminal device. A user department code may be queried based on the user identifier 905, such as, in one implementation, by accessing a user profile containing a department code (e.g., see FIG. 7 for more detail on department codes) associated with the user. A query may then be submitted for application access fields based on the department code 910. In one implementation, application access fields may specify applications accessible to users associated with the particular department code. Application identifiers may be selected based on the application access fields 915, and an instruction message may be prepared including the application identifiers 920. In an alternative implementation, application identifiers may be directly selected based on a department code and/or other user information, and/or a rules-based system may specify correspondences between application identifiers and department codes and/or other user information. An example of user information for obtaining application access may take a form similar to the following XML example:

```
<user info>
    <name> John.Smith </name>
    <title> Agent </title>
    <function> Operations </function>
    <subfunction> "blank"</subfunction>
    <department_code> CORP1.OPS.US.CS.TEAM1 </department_code>
</user info>
```

In one implementation, one or more fields of user information (e.g., name and department code) may be mandatory, with remaining fields optional. An example of a instruction message response to user information for application access may comprise a list of application identifiers and may, in one implementation, take a form similar to the following XML example:

```
<response>
    <application1> Qallbar </application1>
    <application2> Qorus </application2>
    <application3> CRM </application3>
</response>
```

In one implementation, the instruction message may further include a client terminal device identifier to direct the application files to the appropriate target.

Data Construct and Tracking Syntax

Figure 10:
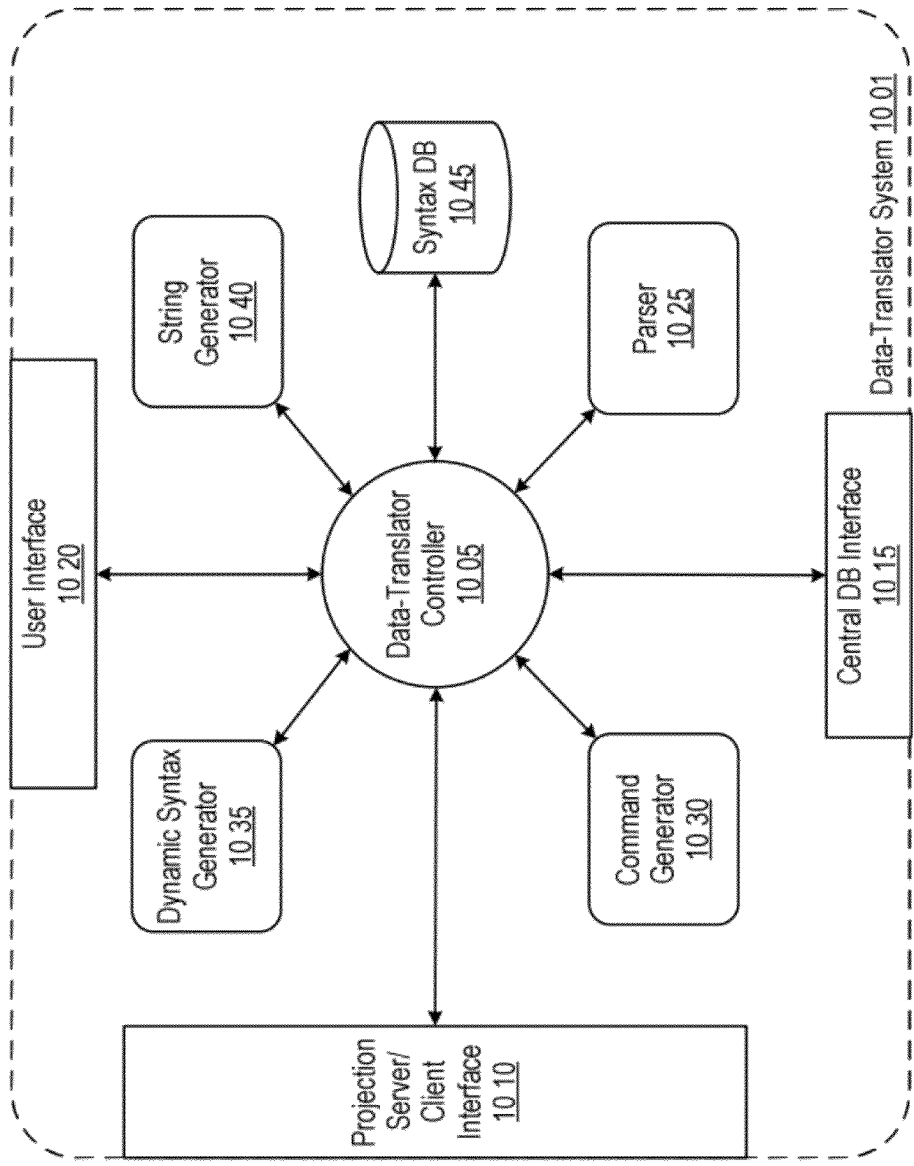
FIG. 10 shows an implementation of data flow between and among Data-Translator system components in one embodiment of Data-Translator operation.

FIG. 10 shows an implementation of data flow between and among Data-Translator system components in one embodiment of Data-Translator operation. The embodiments illustrated in FIG. 10 are directed to a Data-Translator system residing at the Authentication/Control Server 135 and/or Data Server 140 shown in FIG. 1. It is to be understood that aspects of the illustrated embodiment directed to integration with the framework shown in FIG. 1 are for illustrative purposes only, and the Data-Translator system may be deployed in a wide variety of other contexts, including those independent of and apart from the framework illustrated in FIG. 1.

The Data-Translator system 1001 may contain a number of operational components and/or data stores. A Data-Translator controller 1005 may serve a central role in some embodiments of Data-Translator operation, serving to orchestrate the reception, generation, modification, and distribution of data and/or instructions to, from, and between Data-Translator components and/or mediate communications with external entities and systems.

In one embodiment, the Data-Translator controller 1005 may be housed separately from other controllers, modules, components and/or databases within or external to the Data-Translator system, while in another embodiment, some or all of the other modules, components, controllers and/or databases within and/or external to the Data-Translator system may be housed within and/or configured as part of the Data-Translator controller. Further detail regarding implementations of Data-Translator controller operations, modules, components and databases is provided below.

In the implementation illustrated in FIG. 10, the Data-Translator system may be integrated as part of an authentication/control and/or data server, and the Data-Translator controller 1005 may be configured to couple to external entities and/or systems via one or more interface components. For example, the Data-Translator controller 1005 may be coupled to a projection server/client interface 1010. In one implementation, the projection server/client interface 1010 may mediate communications to and from a remote projection server and/or one or more client terminals, such as to receive data requests, data inputs, table-tracking syntax configured strings, rule specifications, organizational structure specification and/or inputs, instructions, and/or the like and to return data, rules, instructions, parsed string tokens, generated table-tracking syntax configured strings, and/or the like. The Data-Translator controller 1005 may further be coupled to a central database interface 1015. In one implementation, the central database interface 1015 may mediate communications to and from a remote central database to send parsed string tokens, data updates, rules, data requests, and/or the like and to receive requested data, rules, table identifiers, field identifiers, column identifiers, and/or the like. The Data-Translator controller 1005 may further be coupled to a user interface 1020. In one implementation, the user interface 1020 may mediate communications to and from a user to receive administrator inputs, settings, configuration inputs and/or files, table-tracking syntax configured strings, data requests, data inputs, updates, and/or the like and to send graphical user interface screens, requested data, generated strings, and/or the like. In various implementations, one or more of the interface components described above may serve to configure data into application, transport, network, media access control, and/or physical layer formats in accordance with a network transmission protocol, such as, but not limited to FTP, TCP/IP, SMTP, Short Message Peer-to-Peer (SMPP), and/or the like. For example, the interfaces may be configured for receipt and/or transmission of data to an external and/or network database. The interfaces may further be configurable to implement and/or translate Wireless Application Protocol, VOIP, and/or the like data formats and/or protocols. The interfaces may further house one or more ports, jacks, antennas, and/or the like to facilitate wired and/or wireless communications with and/or within the Data-Translator system.

In one implementation, the Data-Translator controller 1005 may further be coupled to a plurality of components configured to implement Data-Translator functionality and/or services. For example, the Data-Translator controller 1005 may be coupled to a Parser component 1025 which may, in one implementation, be configured to parse received input strings into constituent string tokens and/or otherwise implement interpretation of inputs in accordance with one or more table-tracking syntaxes and/or descriptive business grammars. The Parser component 1025 may further be configured to parse inputs into a table-tracking syntax configured input string and attendant data, instructions, requests, and/or the like (e.g., a search query, data input, rule request, and/or the like accompanying a table-specifying input string). The Data-Translator controller 1005 may further be coupled to a Command Generator component 1030 which may, in one implementation, be configured to generate database manipulation commands, queries, data input and/or storage commands, and/or the like, such as based on tokens extracted from received input strings. For example, in one implementation, the Command Generator component 1030 may be configured to receive parsed string tokens, such as from the Parser component 1025, and generate a SQL Select command to query data from a Data-Translator database and/or generate a SQL Insert Into command to enter attendant data into a Data-Translator database. Implementations such as these are illustrated in further detail below. The Data-Translator controller 1005 may further be coupled to a Dynamic Syntax Generator component 1035, which may, in one implementation, be configured to dynamically generate a syntax and/or strings configured with a dynamic syntax in response to user action. For example, in one implementation, the Dynamic Syntax Generator may engage a graphical user interface, such as may be provided to a client terminal via the Projection Server/Client Interface 1010 and/or the User Interface 1020, that is accessible by a user and that admits inputs indicative of an organizational structure, said inputs instructing the formation and/or organization of the dynamic syntax. The Data-Translator controller 1005 may further be coupled to a String Generator component 1040, which may, in one implementation, be configured to generate strings in association with various inputs and/or stored data. For example, in one implementation, the String Generator 1040 may be configured to generate strings based on organizational hierarchies generated by and/or with the Dynamic Syntax Generator 1035. In another implementation, the String Generator 1040 may be configured to generate strings matching data queries, such as may be submitted by a user, to see any and/or all syntax-configured strings that match the data query.

In one implementation, the Data-Translator controller 1005 may further be coupled to one or more databases configured to store and/or maintain Data-Translator data. A Syntax database 1045 may contain information pertaining to string token types and/or sequences, delimiters, string token lengths, syntax identifiers, dynamic syntax parameters, and/or the like. In some implementations, the Data-Translator may compare received input strings with fields and/or records in the Syntax database 1045 in order to verify formatting of the input string, assist in parsing the string, and/or the like.

Figure 11A:
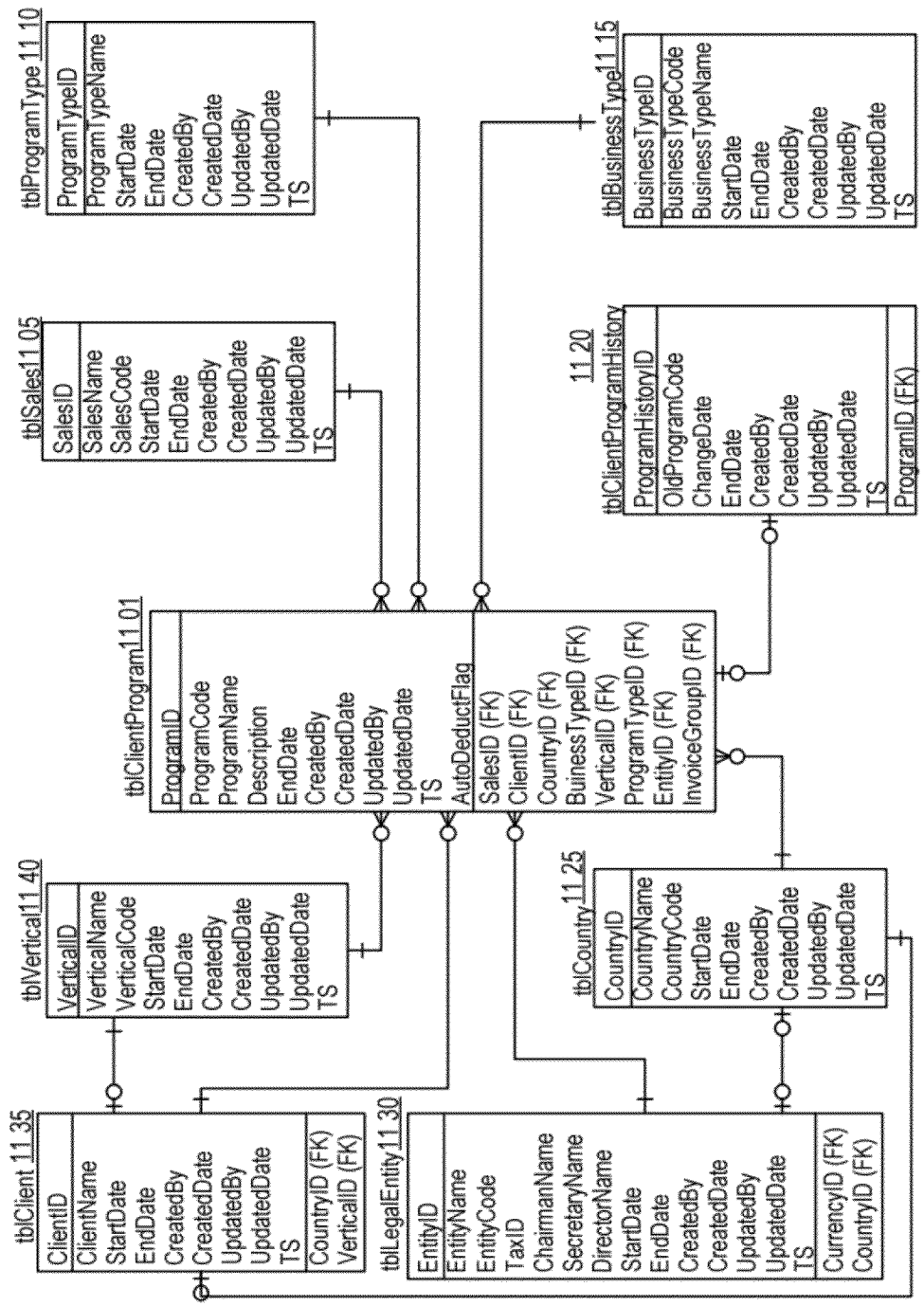
FIGS. 11A-C show aspects of implementations of data models in one embodiment of Data-Translator operation.
Figure 11B:
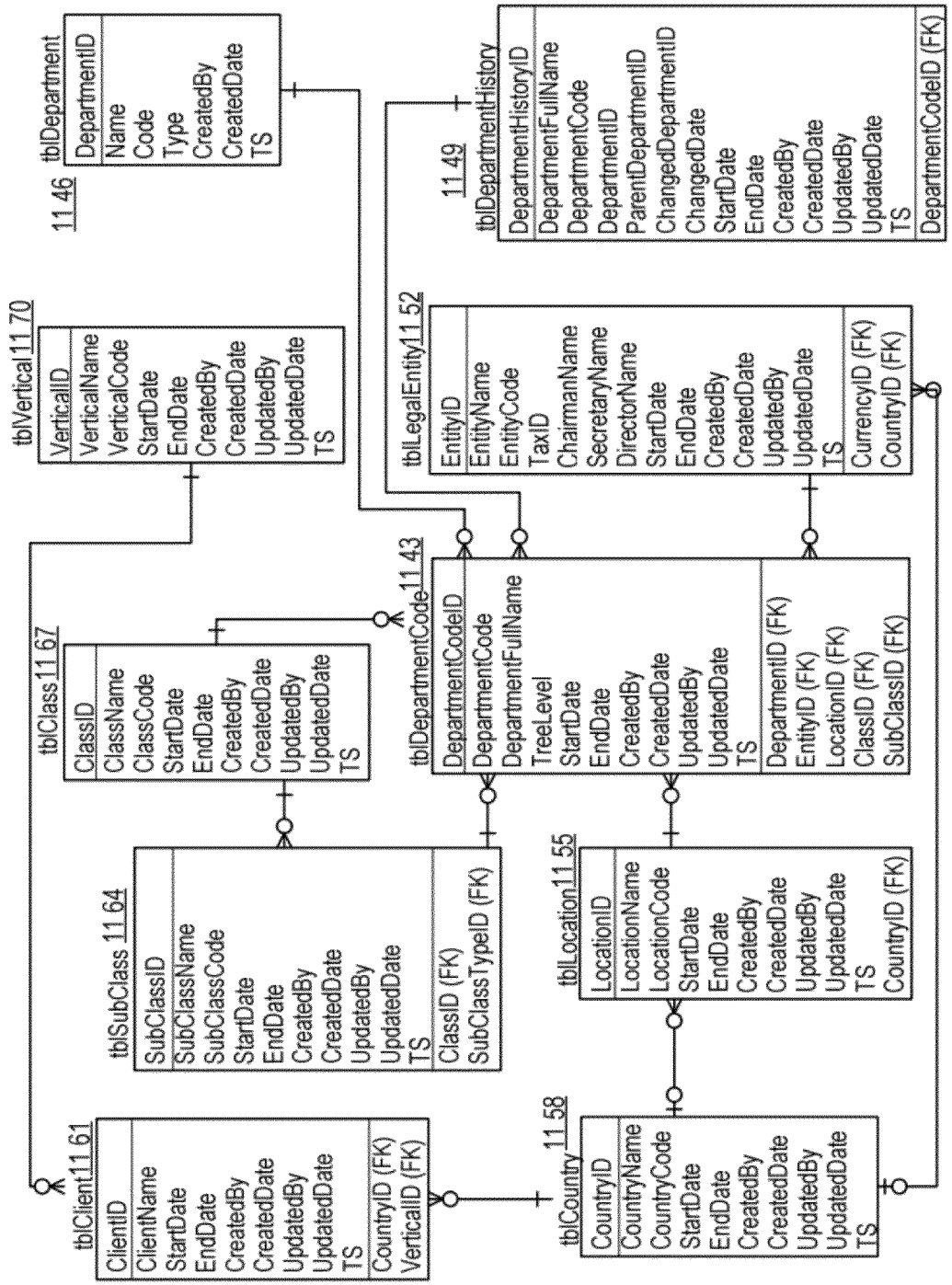
Figure 11C:
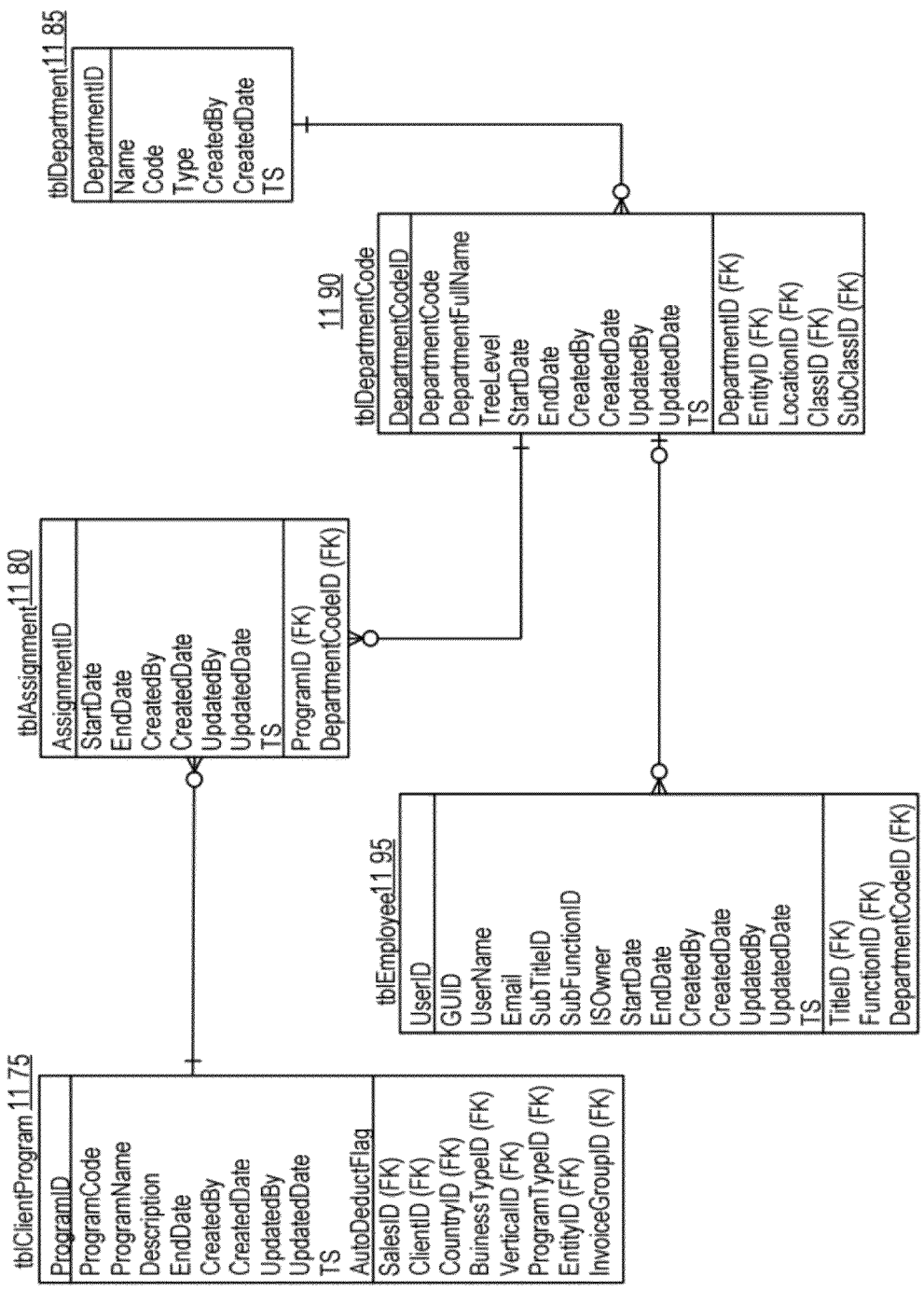

FIGS. 11A-C show aspects of implementations of data models in one embodiment of Data-Translator operation. The tables shown in FIGS. 11A-C may, in one implementation, be stored in a central database such as that shown at 119 in FIG. 1 and accessible to the Data-Translator.

FIG. 11A shows an implementation of a data model illustrating relationships among a group of database tables pertaining to Programs. A ClientProgram table 1101 may include fields allowing specification of records pertaining to the organization of an enterprise's clients, the type(s) of work performed for them, and/or the like. In one implementation, a ClientProgram table 501 may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. The ClientProgram table 1101 may be linked to a variety of other tables, including so-called atomic-level tables, via the foreign keys specified therein. For example, the ClientProgram table 1101 may be linked to a Sales table 505, which may include fields allowing specification of records pertaining to sales in association with a particular client, type of work performed for them, and/or the like. In one implementation, a Sales table 1105 may include fields such as, but not limited to: SalesID, SalesName, SalesCode, StartDate, EndDate, CreatedBy, CreatedDate, UpdatedBy, UpdatedDate, TS, and/or the like. The ClientProgram table 501 may further be linked to a ProgramType table 510, which may include fields allowing specification of records pertaining to the types of work performed for clients. In one implementation, a ProgramType table 510 may include fields such as, but not limited to: ProgramTypeID, ProgramTypeName, StartDate, EndDate, CreatedBy, CreatedDate, UpdatedBy, UpdatedDate, TS, and/or the like. The ClientProgram table 501 may further be linked to a BusinessType table 1115, which may include fields allowing specification of records pertaining to the types of businesses associated with clients, the types of business between an enterprise and a client, and/or the like. In one implementation, a BusinessType table 1115 may include fields such as, but not limited to: BusinessTypeID, BusinessTypeCode, BusinessTypeName, StartDate, EndDate, CreatedBy, CreatedDate, UpdatedBy, UpdatedDate, TS, and/or the like. The ClientProgram table 1101 may further be linked to a ClientProgramHistory table 520, which may include fields allowing specification of records pertaining to historical and/or time-resolved client programs. In one implementation, a ClientProgramHistory table 1120 may include fields such as, but not limited to: ProgramHistoryID, OldProgramCode, ChangeDate, EndDate, CreatedBy, CreatedDate, UpdatedBy, UpdatedDate, TS, ProgramID (FK), and/or the like. The ClientProgram table 1101 may further be linked to a Country table 1125, which may include fields allowing specification of records pertaining to countries. In one implementation, a Country table 1125 may include fields such as, but not limited to: CountryID, CountryName, CountryCode, StartDate, EndDate, CreatedBy, CreatedDate, UpdatedBy, UpdatedDate, TS, and/or the like. The ClientProgram table 1101 may further be linked to a LegalEntity table 1130, which may include fields allowing specification of records pertaining to legal entity status, tax status, personnel and/or the like of enterprises, clients, and/or the like. In one implementation, a LegalEntity table 1130 may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. The ClientProgram table 1101 may further be linked to a Client table 1135, which may include fields allowing specification of records pertaining to clients and/or client information. In one implementation, a Client table 1135 may include fields such as, but not limited to: ClientID, ClientName, StartDate, EndDate, CreatedBy, CreatedDate, UpdatedBy, UpdatedDate, TS, CountryID (FK), VerticalID (FK) and/or the like. The ClientProgram table 501 may further be linked to a Vertical table 1140, which may include fields allowing specification of records pertaining to market and/or industry categories, and/or the like. In one implementation, a Vertical table 1140 may include fields such as, but not limited to: VerticalID, VerticalName, VerticalCode, StartDate, EndDate, CreatedBy, CreatedDate, UpdatedBy, UpdatedDate, TS, and/or the like.

In some implementations, links may exist between lower-level and/or atomic-level tables as well. For example, in the illustrated implementation, the Client table 1135 is linked to the Country table 1125 and to the Vertical table 1140; and the LegalEntity table 1130 is linked to the Country table 1125. Some tables linked by foreign keys to tables shown in FIG. 11A have been omitted from illustration for the sake of clarity.

FIG. 11B shows an implementation of a data model illustrating relationships among a group of database tables pertaining to Departments. A DepartmentCode table 1143 may include fields allowing specification of records pertaining to departments within an enterprise, the organization of the enterprise's departments, and/or the like. In one implementation, a DepartmentCode table 1143 may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. The DepartmentCode table 1143 may be linked to a variety of other tables, including so-called atomic-level tables, via the foreign keys specified therein. For example, the DepartmentCode table 1101 may be linked to a Department table 1146, which may include fields allowing specification of records pertaining to departments within an enterprise, and/or the like. In one implementation, a Department table 1146 may include fields such as, but not limited to: DepartmentID, Name, Code, Type, CreatedBy, CreatedDate, TS, and/or the like. The DepartmentCode table 1143 may further be linked to a DepartmentHistory table 1149, which may include fields allowing specification of records pertaining to the history of department assignments and/or characteristics, and/or the like. In one implementation, a DepartmentHistory table 1149 may include fields such as, but not limited to: DepartmentHistoryID, DepartmentFullName, DepartmentCode, DepartmentID, ParentDepartmentID, ChangedDepartmentID, ChangedDate, StartDate, EndDate, CreatedBy, CreatedDate, UpdatedBy, UpdatedDate, TS, and/or the like. The DepartmentCode table 1143 may further be linked to a LegalEntity table 1152, which may include fields allowing specification of records pertaining to legal entity status, tax status, personnel and/or the like of enterprises, clients, and/or the like. In one implementation, a LegalEntity table 1152 may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. The LegalEntity table 1152 may, in turn, be linked to a Country table 1158, which may include fields allowing specification of records pertaining to countries. In one implementation, a Country table 1158 may include fields such as, but not limited to: CountryID, CountryName, CountryCode, StartDate, EndDate, CreatedBy, CreatedDate, UpdatedBy, UpdatedDate, TS, and/or the like. In the illustrated implementation, the country code may further be linked to a Client table 1161, which may include fields allowing specification of records pertaining to clients and/or client information. In one implementation, a Client table 1161 may include fields such as, but not limited to: ClientID, ClientName, StartDate, EndDate, CreatedBy, CreatedDate, UpdatedBy, UpdatedDate, TS, CountryID (FK), VerticalID (FK) and/or the like. The Client table 1161, in turn, may be linked to a Vertical table 1170, which may include fields allowing specification of records pertaining to market and/or industry categories, and/or the like. In one implementation, a Vertical table 1170 may include fields such as, but not limited to: VerticalID, VerticalName, VerticalCode, StartDate, EndDate, CreatedBy, CreatedDate, UpdatedBy, UpdatedDate, TS, and/or the like. The DepartmentCode table 1143 may further be linked to a Location table 1155, which may include fields allowing specification of enterprise locations, and/or the like. In one implementation, a Location table 555 may include fields such as, but not limited to: LocationID, LocationName, LocationCode, StartDate, EndDate, CreatedBy, CreatedDate, UpdatedBy, UpdatedDate, TS, CountryID (FK), and/or the like. The Location table 1155 may, in turn, be linked to the Country table 1158. The DepartmentCode table 1143 may further be linked to a Class table 1167, which may include fields allowing specification of records pertaining to classes, such as accounting classes, associated with enterprises, departments, and/or the like. In one implementation, a Class table 1167 may include fields such as, but not limited to: ClassID, ClassName, ClassCode, StartDate, EndDate, CreatedBy, CreatedDate, UpdatedBy, UpdatedDate, TS, and/or the like. The DepartmentCode table 1143 may further be linked to a SubClass table 1164, which may include fields allowing specification of records pertaining to subclasses, such as accounting subclasses, associated with enterprises, departments, and/or the like. In one implementation, a SubClass table 1164 may include fields such as, but not limited to: SubClassID, SubClassName, SubClassCode, StartDate, EndDate, CreatedBy, CreatedDate, UpdatedBy, UpdatedDate, TS, ClassID (FK), SubClassTypeID (FK), and/or the like.

In some implementations, links may exist between lower-level and/or atomic-level tables as well. For example, in the illustrated implementation, the Class table 1167 is linked to the SubClass table 1164. Some tables linked by foreign keys to tables shown in FIG. 11B have been omitted from illustration for the sake of clarity.

FIG. 11C shows an implementation of a data model illustrating relationships among a group of database tables pertaining to Assignments and Employees/Users. An Assignment table 1180 may include fields allowing specification of records pertaining to assignments, such as within an enterprise, performed for or on behalf of a client, by a department, and/or the like. In one implementation, an Assignment table 1180 may include fields such as, but not limited to: AssignmentID, StartDate, EndDate, CreatedBy, CreatedDate, UpdatedBy, UpdatedDate, TS, ProgramID (FK), DepartmentCodeID (FK), and/or the like. The Assignment table 1180 may be linked to a variety of other tables, including so-called atomic-level tables, via the foreign keys specified therein. For example, the Assignment table 1180 may be linked to a ClientProgram table 1175, which may include fields allowing specification of records pertaining to the organization of an enterprise's clients, the type(s) of work performed for them, and/or the like. In one implementation, a ClientProgram table 1175 may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. The Assignment Table 1180 may further be linked to a Department Code table 1190, which may include fields allowing specification of records pertaining to departments within an enterprise, the organization of the enterprise's departments, and/or the like. In one implementation, a DepartmentCode table 1190 may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. In the illustrated implementation, the DepartmentCode table 1190 is further linked to a Department table 585, which may include fields allowing specification of records pertaining to departments within an enterprise, and/or the like. In one implementation, a Department table 1185 may include fields such as, but not limited to: DepartmentID, Name, Code, Type, CreatedBy, CreatedDate, TS, and/or the like.

An Employee table 1195 may include fields allowing specification of records pertaining to user and/or employee attributes and/or characteristics, and/or the like. In one implementation, an Employee table 1195 may include fields such as, but not limited to: UserID, GUID, UserName, Email, SubTitleID, SubFunctionID, ISOwner, StartDate, EndDate, CreatedBy, CreatedDate, UpdatedBy, UpdatedDate, TS, TitleID (FK), FunctionID (FK), DepartmentCodeID, and/or the like. Some tables linked by foreign keys to tables shown in FIG. 11C have been omitted from illustration for the sake of clarity.

Figure 12:
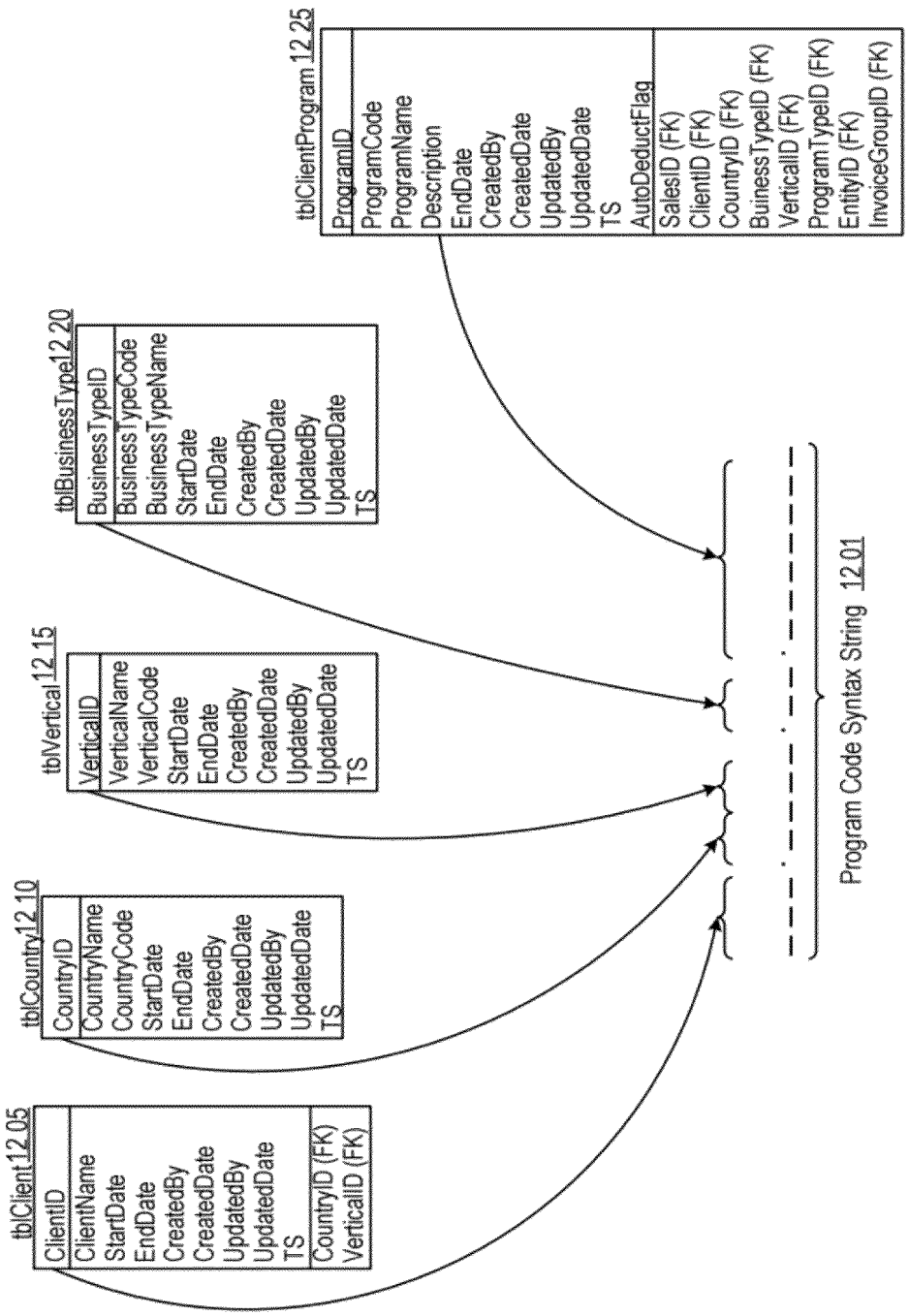
FIG. 12 shows an implementation of a table-tracking string syntax in one embodiment of Data-Translator operation.

FIG. 12 shows an implementation of a table-tracking string syntax in one embodiment of Data-Translator operation. In one embodiment, each token in a business grammar syntax 1201 tracks to an individual table, e.g., FIG. 7A-C, 1205-1225. As such, any token used between grammar eliminators may be parsed and supplied as targets as part of an SQL (e.g., Select) command to a Data-Translator database.

A string is shown at 1201 that is configured in accordance with a table-tracking grammar syntax whereby delimited string tokens correlate with and/or correspond to tables in the database. For example, in the illustrated implementation, the string comprises a series of tokes delimited by periods, wherein each token admits a table identifier value corresponding to one of the indicated tables. The first token of the string at 601 corresponds to a Client table 1205 and may, in one implementation, admit values for the ClientID field. The second token of the string at 1201 corresponds to a Country table 1210 and may, in one implementation, admit values for the CountryID field. The third token of the string at 1201 corresponds to a Vertical table 1215 and may, in one implementation, admit values for the VerticalID field. The fourth token of the string at 1201 corresponds to a BusinessType table 1220 and may, in one implementation, admit values for the BusinessTypeID field. In some implementations, the table-tracking string syntax may also include table fields other than table identifier fields. For example, while the fifth token of the string at 1201 may be said to correspond to or correlate with a ClientProgram table 1225, the token itself admits values for the Description field of that table.

In various implementations of a table-tracking string syntax, various punctuation marks, character, and/or the like (e.g., periods, commas, dashes, blank spaces, hash marks, dollar signs, asterisks, and/or the like and/or any combination or sequence thereof) may be used in different combinations and arrangements to delimit string tokens. For example, in one implementation, periods may be placed between pairs of string tokens (e.g., the period between the client and country tokens in the string at 1201). In one implementation, every pair of string tokens is separated by delimiting punctuation, such as a period. In another implementation, one or more pairs of tokens may have alternative punctuation and/or characters delimiting them than other token pairs, and/or may have no delimiting punctuation and/or characters whatsoever. For example, the country token 610 and vertical token 1215 in the string at 1201 are not delimited by any additional characters or punctuation. In one implementation, a string interpreting component may have a pre-set token length stored for a given table-tracking syntax and may parse the string based, for example, on the number of characters at a certain point in the string, following a particular delimiter, and/or the like.

In some implementations, the table-tracking syntax may comprise a descriptive business grammar having string tokens that correspond to table fields determined and/or expected to have strong descriptive correlation with business properties and/or behaviors. For example, the implementation of a program code string syntax shown in FIG. 12 has string tokens corresponding to a client name, country, vertical (e.g., industry, company position in a supply chain, and/or the like), business type (e.g., nature of services provided to a client), and a client program description. Any of a wide variety of other tables and/or table fields may be correlated with string tokens in other implementations of descriptive business grammars. In one implementation, tables and/or table fields comprising a string syntax in a descriptive business grammar may be selected by a Data-Translator administrator. In an alternative implementation, tables and/or table fields having strong descriptive correlation with business properties and/or behaviors may be determined systematically by selecting one or more business properties and/or behaviors of interest (e.g., size, revenue, common business rules, and/or the like) and performing a discriminant analysis, classification and/or regression tree analysis, and/or the like statistical analysis to select a subset of tables and/or table fields from a larger set, the subset having maximal correlation with the business properties and/or behaviors of interest.

In one implementation, a table-tracking string syntax may take a form that is static and pre-set, such that the number, arrangement, selection, and/or the like of string tokens is fixed and/or substantially the same for each instance of a string formed in accordance with the syntax. In another implementation, a table-tracking string syntax may be formed dynamically, such as based on user inputs, and different strings formed in accordance with the syntax may appear different, have a different number, selection, arrangement, and/or the like of tokens and/or the like. For example, hierarchical properties of a system (e.g., departments of an organization) may be indexed with a dynamic table-tracking string syntax having a selection and/or number of tokens representing a position of a given property within the hierarchy.

Figure 13A:
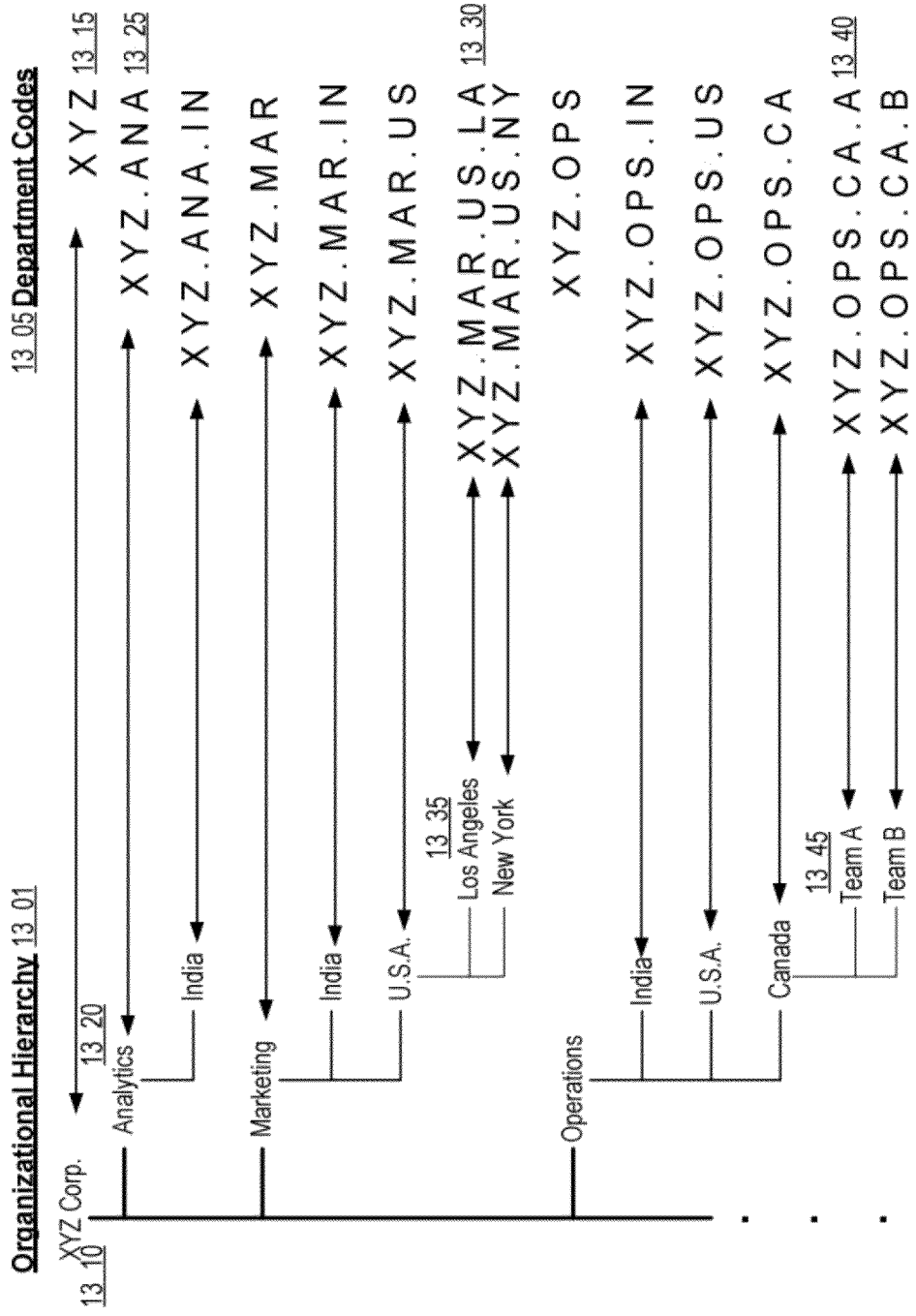
FIGS. 13A-B show schematic illustrations of correlations between positions within an organizational hierarchy and corresponding strings configured with a dynamic, hierarchical table-tracking syntax in one embodiment of Data-Translator operation.

FIG. 13A shows a schematic illustration of correlations between positions within an organizational hierarchy and corresponding strings configured with a dynamic, hierarchical table-tracking syntax in one embodiment of Data-Translator operation. The organizational hierarchy 1301 is configured as a tree depicting departments within an organization, with each node of the tree representing a descriptor or characteristic of a corresponding department, division, and/or the like. In turn, each displayed characteristic may correspond to a table, table identifier, table field, and/or the like in a database. The root node 710 corresponds to the organization depicted (XYZ Corp.) and may represent a table field and/or table identifier for, for example, a EntityID, EntityName, ClientID, ClientName, and/or the like. Also depicted in the figure are a series of so-called Department Codes 1305 comprising dynamic, hierarchical table-tracking syntax configured strings correlated with nodes in the organizational hierarchy 1301, wherein each token in the string corresponds to and/or correlates with one of the descriptors and/or characteristics of the organizational department represented at a given node of the organizational hierarchy tree 1301. In one implementation, a department code configured with a dynamic, hierarchical table-tracking syntax may include any and/or a particular class of logical arrangements of descriptors, including but not limited to: function, sub-function, country, location, vertical, business type, client, team, and/or the like.

For example, the root node depicting the identity of the organization, XYZ Corp. 1310, has a corresponding department code of "XYZ" 1315. A sub-node emanating from the root note, such as the "Analytics" department shown at 1320, may then have a corresponding department code with a root token as in 1315, but with the addition of a new token (ANA) delimited from the root token to yield XYZ.ANA 1325. The addition of further levels of hierarchy may add further tokens to the string syntax. Depending on the hierarchical arrangement of organizational descriptors in the organizational tree 1301, different department codes 1305 may be generated having tokens in similar positions in the strings which, nevertheless, correspond to different types of descriptors, different tables, different table identifiers, and/or the like. For example, in the illustrated implementation, the department code at 1330, XYZ.MAR.US.LA, has a concluding token "LA" indicating a location of the department (i.e., in Los Angeles 735). On the other hand, the department code at 1340, XYZ.OPS.CA.A, has a concluding token "A" that is also in the fourth position of the string but, here, indicates a team affiliation (i.e., Team A 1345). In one implementation, the Data-Translator may parse a dynamic, hierarchical table-tracking syntax configured string in a hierarchical manner, proceeding from a root token which may, in some implementations, always correspond to a particular table, table identifier, table field, and/or the like, and then progressively comparing subsequent string tokens to table fields and/or linked tables until matches are found permitting identification of the tables, table identifiers, table fields, and/or the like to which the string tokens correspond. As such, the number of delimiters may indicate the relative hierarchical position of a value, but the tokens within the delimiters may represent the types of categorization; this has the very powerful advantage allowing for orthogonal constructs of disparate data types within the grammar without excess duplication of descriptors and greater number of descriptive permutations; for example, it allows for the decoupling of business categories of information from accounting categories, while allowing permutations therebetween.

Figure 13B:
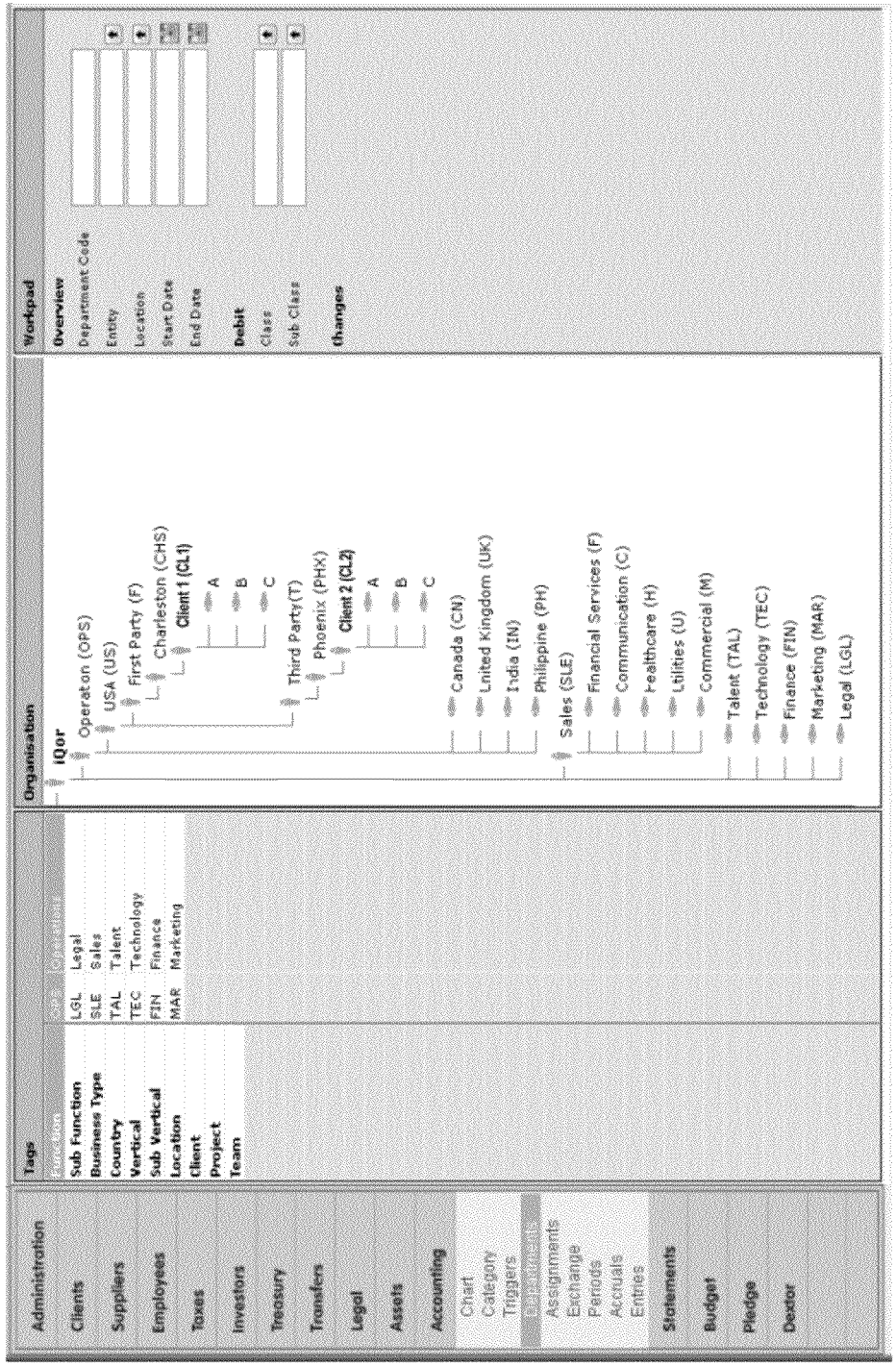

In one embodiment, the Data-Translator may include a user interface facility similar in appearance to the schematic illustration shown in FIG. 13A permitting a graphical generation of a hierarchical organizational chart and corresponding dynamic, hierarchical table-tracking syntax configured strings, such as the department codes shown at 1305 (see FIG. 13B illustrating an example UI screenshot). For example, such a user interface may include a plurality of organizational descriptors, such as function, sub-function, country, location, vertical, business type, client, team, and/or the like, that are configured as selectable interface elements. The organizational chart may then be generated by selecting the descriptors for association with different positions in the chart, causing new nodes to be created from those positions. In one implementation, each descriptor may be dragged and dropped from a bank of descriptors to a position on or near the chart, causing that descriptor to become a new node extending by a branch from the nearest node above it in the hierarchy. The Data-Translator may also automatically generate a new department code corresponding to the new node by appending a token corresponding to the new node to the string corresponding to the next highest node in the chart from the new node.

Figure 14:
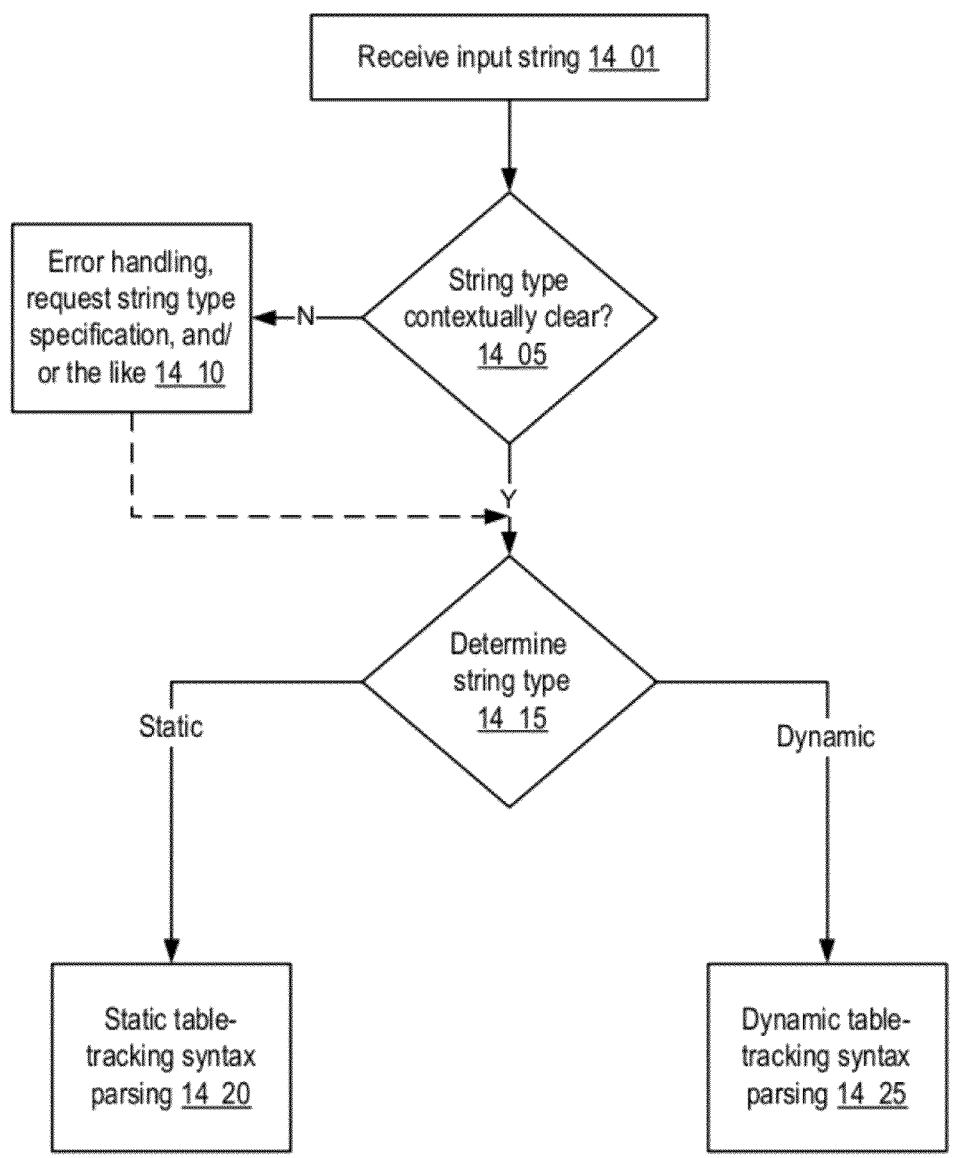
FIG. 14 shows an implementation of logic flow for string type discerning and parsing in one implementation of Data-Translator operation.

FIG. 14 shows an implementation of logic flow for string type discerning and parsing in one implementation of Data-Translator operation. The implementation illustrated in FIG. 14 may be employed, for example, in a circumstance wherein both static and dynamic table-tracking syntaxes are used and strings configured with either syntax may be received as inputs. The Data-Translator may receive an input string 1401, such as via a web interface, a text and/or command line input, data transfer from another Data-Translator application and/or component, selection of input string tokens in a graphical user interface (e.g., from one or more pull-down menus), string tokens spoken into a microphone and analyzed with speech recognition software, a string scanned from a document and/or discerned from a photograph that is analyzed such as with optical character recognition (OCR), and/or the like. A determination may then be made as to whether the string type, associated table-tracking syntax and/or descriptive business grammar, and/or the like is clear from the context in which the string was input, and/or from the content of the string itself 805. For example, in one implementation, a string type may be identified from the application into which the string was input and/or the method of input and/or receipt of the input string. In another example, a string type may be identified from the length, composition, arrangement, content, and/or the like of the string itself. The input string may be compared to elements of a syntax database, which delineate the formal characteristics of a particular table-tracking syntax and allow for determination of whether a particular input string appears to be configured in accordance with the particular syntax. In one implementation, the Data-Translator at 1405 may determine whether sufficient indicia of string type exist to permit a determination of the string type. In one implementation, the Data-Translator at 1405 may only determine whether sufficient indicia exist to distinguish the string type and/or associated syntax between static table-tracking syntax and a dynamic table-tracking syntax.

If sufficient indicia do not exist to distinguish the type of string and/or syntax corresponding to an input string, the Data-Translator may undertake an error handling process, request user specification of the string type, perform additional analysis on the input string to discern the type, and/or the like 1410. If sufficient indicia are present at 1405, the Data-Translator may determine which string type and/or string syntax is associated with the input string, such as based on that indicia 1415. In one implementation, the Data-Translator may distinguish between a string configured in accordance with a static table-tracking index and with a dynamic table-tracking index. In the illustrated implementation, a static table-tracking syntax configured input string may then be subjected to a static table-tracking syntax parsing 1420, and a dynamic table-tracking syntax configured input string may be subjected to a dynamic table-tracking syntax parsing 1425.

Figure 15:
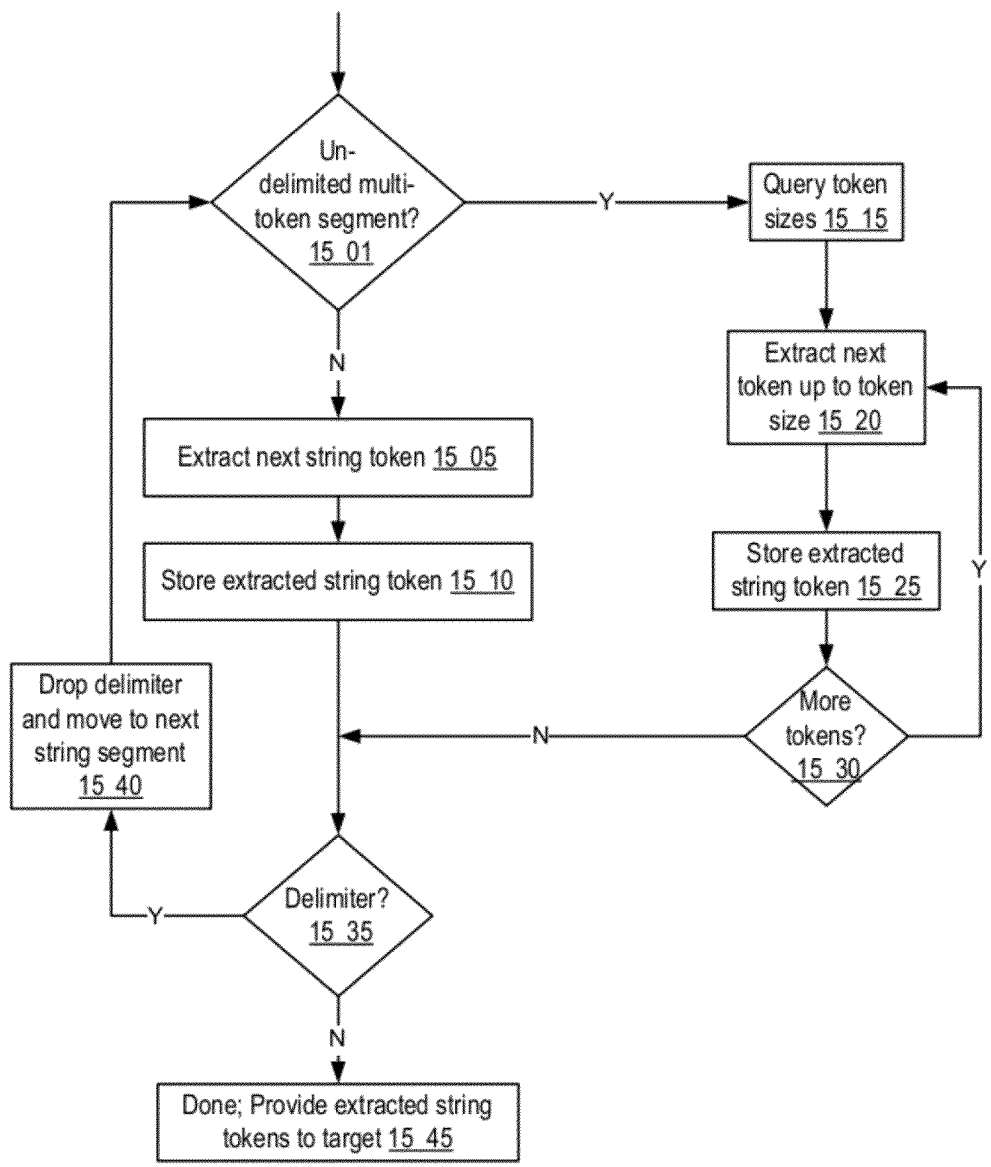
FIG. 15 shows an implementation of logic flow for static table-tracking syntax parsing in one embodiment of Data-Translator operation.

FIG. 15 shows an implementation of logic flow for static table-tracking syntax parsing in one embodiment of Data-Translator operation. A determination may be made as to whether a first segment of the received string and/or corresponding string syntax comprises a single token or an undelimited multi-token segment 1501. In the latter case, the Data-Translator may query a token size 1515, such as from a syntax database that holds a list of table names, token sizes, and/or the like, and extract a next token from the undelimited multi-token segment based on the token size 1520. In one implementation, a token size may be specified as part of the table-tracking syntax and/or descriptive business grammar. In another implementation, such as for a dynamic table-tracking syntax, a token size may be specified as a maximum number of characters for a table name corresponding to that token type. Extracted string tokens may be stored 1525, and a determination Data-Translator as to whether there are additional tokens in the undelimited multi-token segment 1530, such as may be indicated by a syntax record in the syntax database. If so, the Data-Translator may return to 1520 to extract the next token in the segment.

If the Data-Translator determines at 1501 that the next segment in the string is not an undelimited multi-token segment, then the Data-Translator may extract the whole segment as a string token 1505 and store the extracted string token 1510, such as in a database, in random access memory, and/or the like.

A determination may be made as to whether there exists a delimiter past the token or tokens previously extracted 1535. If there is an additional delimiter, the Data-Translator may drop the delimiter from the string and move to evaluate the next string segment 1540. In an implementation where there is no trailing delimiter at the end of a string in a table-tracking syntax, determining that there are no delimiters at 1535 may cause the Data-Translator to conclude parsing the input string and/or to provide extracted string tokens to a target 1545, such as an end user, target application, database table and/or record, display device, report, and/or the like.

Figure 16:
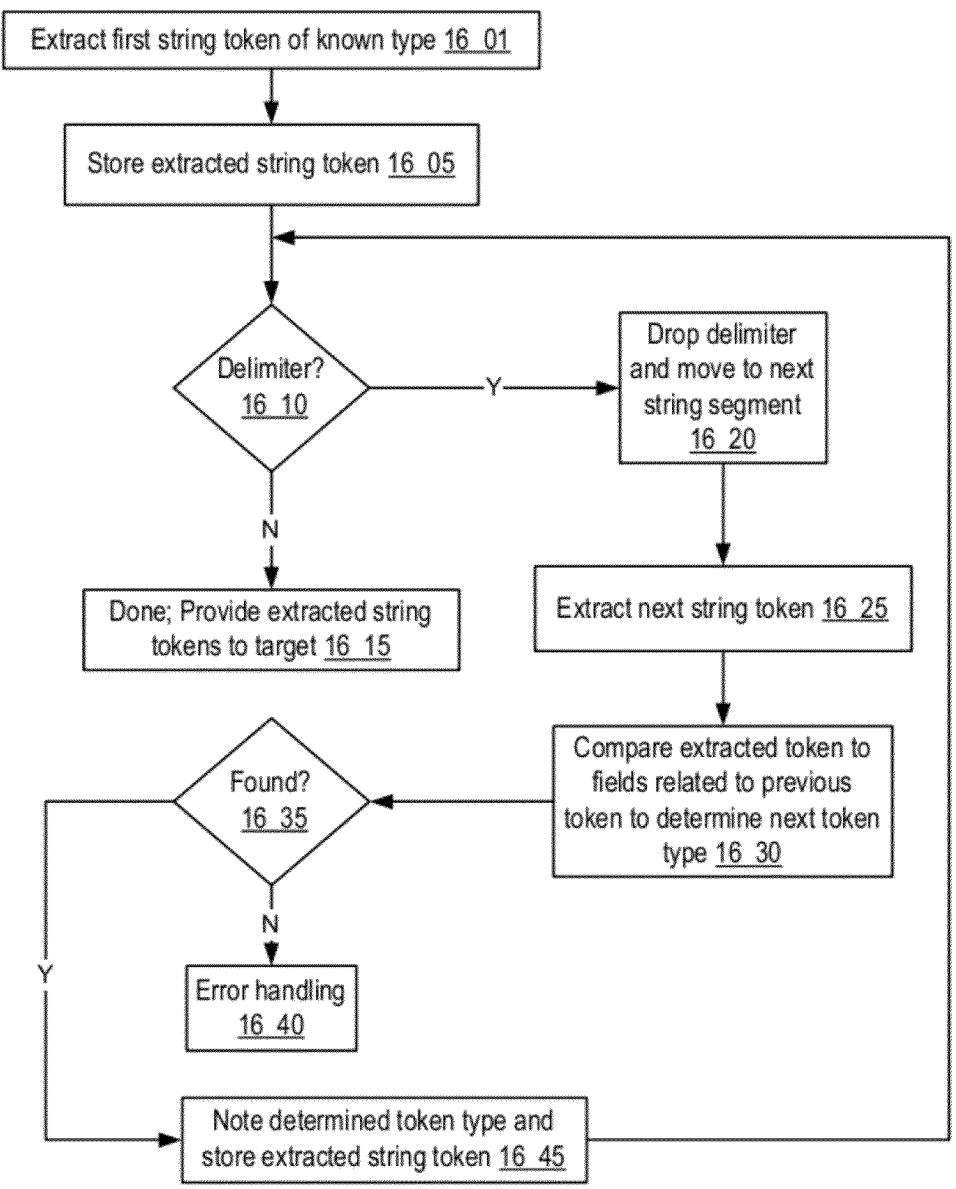
FIG. 16 shows an implementation of logic flow for parsing dynamic table-tracking syntax configured strings in one embodiment of Data-Translator operation.

FIG. 16 shows an implementation of logic flow for parsing dynamic table-tracking syntax configured strings in one embodiment of Data-Translator operation. A first string token of known type may be extracted 1601 and stored 1605. In one implementation, all dynamic table-tracking syntax configured strings may be configured with the same type of leading string token (e.g., an organization name). In another implementation, the token type of the leading string token may be discerned prior to parsing, such as via contextual indicia, such as how the string was submitted to the Data-Translator, simultaneously running applications, other user inputs and/or instructions from other software modules, and/or the like.

A determination may then be Data-Translator as to whether there exists a delimiter after the first extracted token 1610. If not, such as in the case of a single-token string configuration, then the Data-Translator's parsing of the dynamic table-tracking syntax string may be concluded and/or the extracted string token provided to a target 1615. If a delimiter is found at 1610, the Data-Translator may drop the delimiter from the input string and move to the next segment of the string 1620. The next string token may be extracted 1625 and compared with data fields and/or records of a table associated with the previously extracted token to determine a next token type 1630. A determination may be made as to whether a match to the token has been found 1635 and, if not, then an error handling procedure may be undertaken 1640, such as providing an error message to the user, requesting reentry of the input string, checking common typographical or spelling errors, and/or the like. If, on the other hand, a match is found to the next token, the determined token type may be noted and stored in association with the extracted token 1645, before returning to 1610 to check for a next delimiter in the string sequence.

In one embodiment, department codes may be parsed based on token positions relative to delimiting characters, and as such, provide the parsed values for use in SQL commands. For example, a rule may specify that all department codes having a particular token after the nth delimiting character are authorized to access a particular set of application files. A parsing routine may then count n delimiters and compare the immediately following token to the rule token to determine if the rule is applicable (e.g., whether a user associated with the department code is authorized to access the set of application files).

Figure 17:
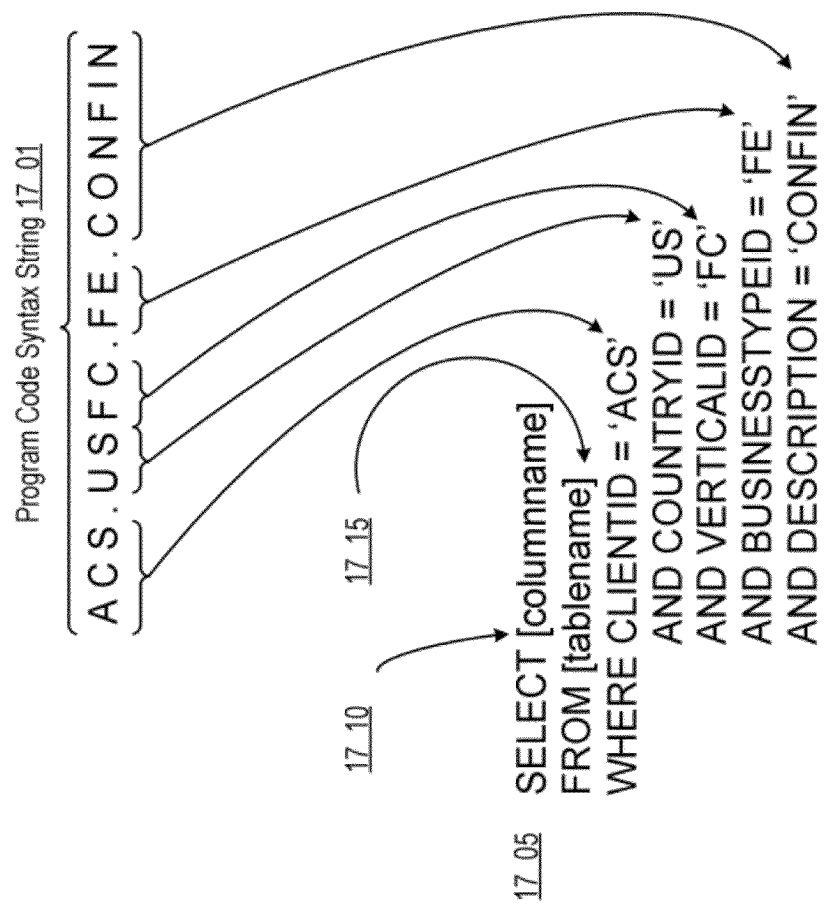
FIG. 17 provides a schematic illustration of an implementation of converting a table-tracking syntax configured string into a database query statement in one embodiment of Data-Translator operation.

FIG. 17 provides a schematic illustration of an implementation of converting a table-tracking syntax configured string into a database query statement in one embodiment of Data-Translator operation. The input string in the illustrated implementation 1701 is configured as a program code, having a first segment reflecting a client token, a second segment comprising an undelimited multi-token segment having a country token and a vertical token, a third segment reflecting a business type token, and a fourth segment reflecting a description token. The content of each token in a particular instance of a program code may be extracted and rearranged to form a SQL Select statement, such as that shown at 1705. In the illustrated implementation, the parsed string tokens are used to specify SQL Where search conditions, limiting the query to records having fields with matching values as those specified in the Where clauses. The Select statement 1705 also admits specification of a column name 1710 and table name 1715 from which the requested data should be selected. Thus, the Select statement at 1705 will select data from a column corresponding to "columnname" 1710 in a table corresponding to "tablename" 1715 for records in that table having a clientID="ACS", countryID="US", verticalID="FC", businesstypeID="FE", and description="CONFIN".

Figure 18:
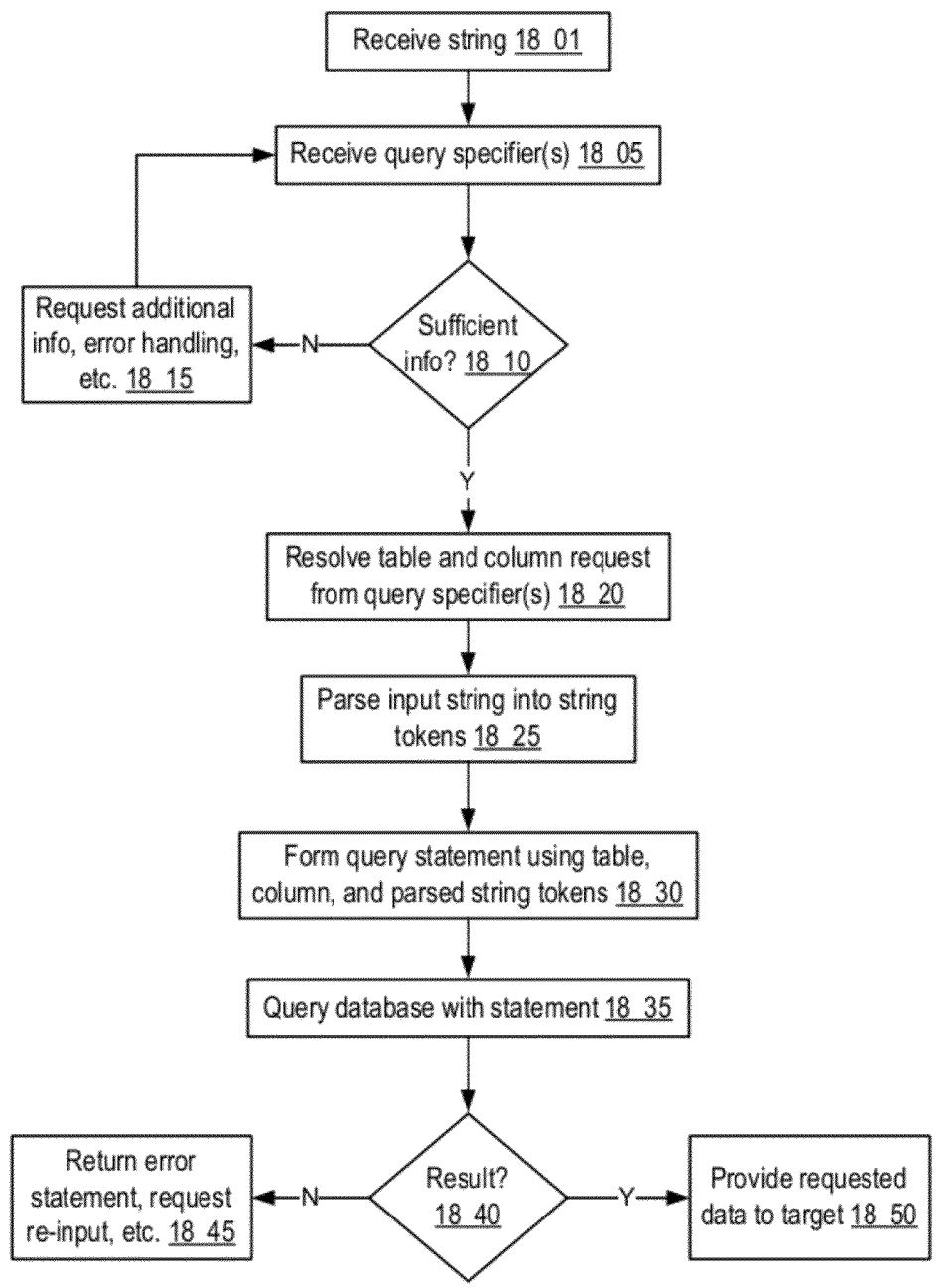
FIG. 18 shows an implementation of logic flow for forming a query statement based on an input string in one embodiment of Data-Translator operation.

FIG. 18 shows an implementation of logic flow for forming a query statement based on an input string in one embodiment of Data-Translator operation. A string is received at 1801, as well as any query specifiers 1805 which may comprise additional inputs that serve to provide further resolution and/or specificity related to a data request. For example, in one implementation, query specifiers 1805 may comprise information sufficient to identify at least one column name and/or table name in which requested data may be found. An example of a query specifier is a PLACEMENTMONTH of August 2008 submitted with a PROGRAMCODE of CL1.USMI.FP.HR to retrieve associated matching data.

A determination may be made as to whether sufficient query specifiers have been supplied to conduct a database query 1810. If not, then an error handling procedure may be undertaken, an error message returned, additional information may be requested from a user, and/or the like 1815. If sufficient query specifiers have been supplied, the Data-Translator may resolve a table name and/or a column name based on the query specifiers 1820. For example, in one implementation, the query specifiers themselves may comprise a table name and/or a column name. The Data-Translator may also parse the input string into one or more string tokens 1825. The query statement may then be formed as a combination of parsed string tokens and resolved table name and/or column name 1830, and said statement used to query the database 1835. A determination may be made as to whether one or more results are returned in response to the query 1840. If not, then an error handling procedure may be undertaken, an error message returned, reentry of query parameters requested, and/or the like 1845. Otherwise, if a result is obtained by the query, the result may be provided to a target 1850, such as to the requesting system, to a third party user, application, system, and/or the like 1850.

Figure 19:
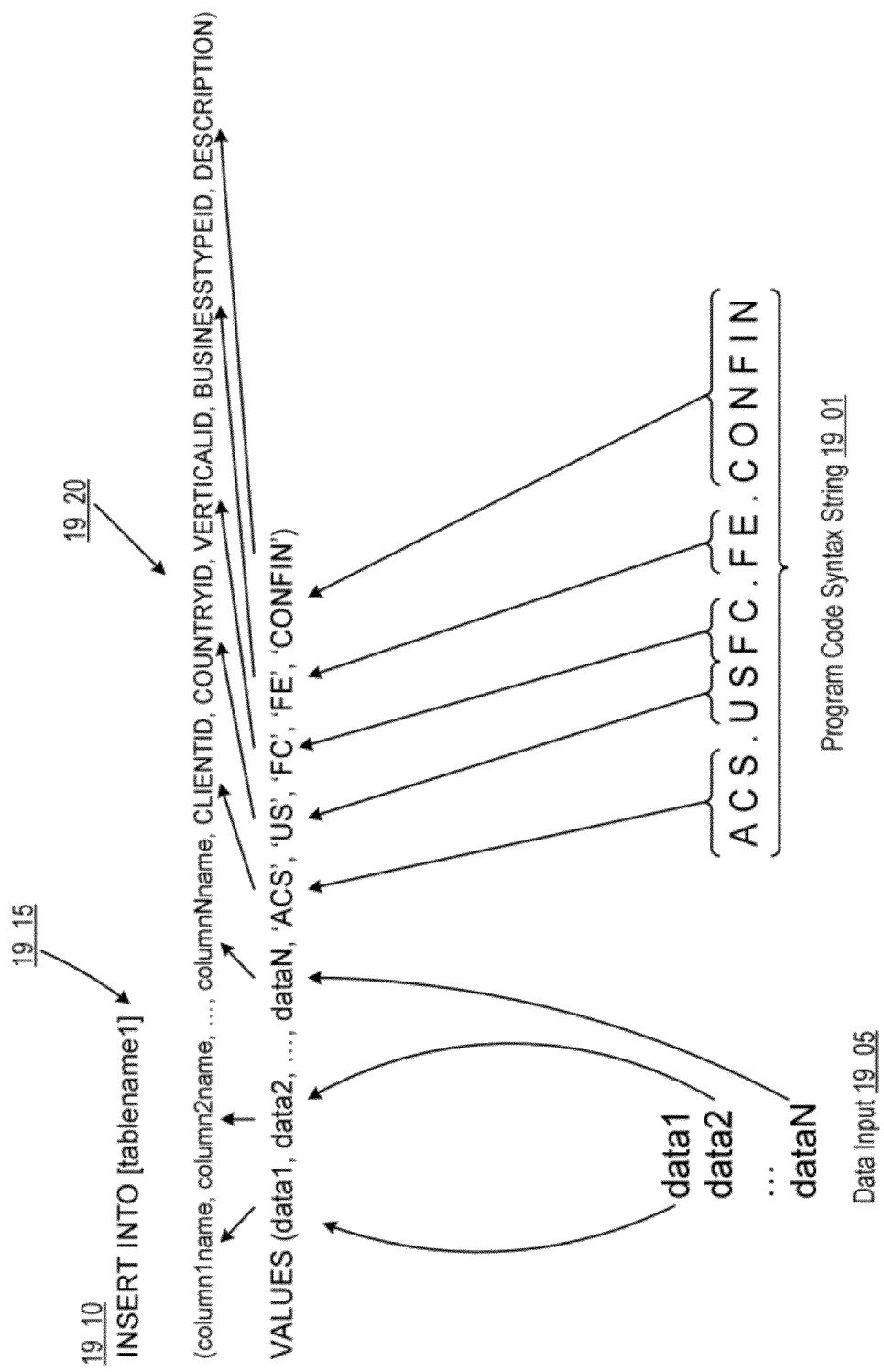
FIG. 19 provides a schematic illustration of an implementation of converting a table-tracking syntax configured string into a database input statement in one embodiment of Data-Translator operation.

FIG. 19 provides a schematic illustration of an implementation of converting a table-tracking syntax configured string into a database input statement in one embodiment of Data-Translator operation. In the illustrated implementation, a program code syntax configured string 1901 is provided to the Data-Translator, along with a series of data inputs 1905. Tokens parsed from the input string, along with the data inputs, may be used to form a SQL Input statement such as that shown at 1910, where the data inputs and string tokens comprise values to populate fields in a database record. The illustrated Input statement may also include specification of one or more table names 1915, one or more column 1920, and/or the like, such as to identify a location in the database where the received data inputs should be entered. Therefore, in the illustrated implementation, data1 is slotted for input to column1name, data2 to column2name, and so forth, and "ACS" is slotted for input to the CLIENTID column, "US" to the COUNTRYID column, and so forth. The illustrated implementation is directed to circumstances where all of the input data is to be entered into a single table having accommodating fields. In some other implementations, the Data-Translator may accommodate data inputs destined for different database tables, such as by discerning linking relationships between tables and generating appropriate JOIN statements for inclusion in a database transaction command statement such as that shown at 1901. In one implementation, a table name, column name, and/or the like to be included in the Input statement may be discernable based on a variety of different information sources, such as but not limited to a received string and/or parsed string tokens, a type and/or content of data inputs, a source of data inputs and/or input string (e.g., based on the identity of a submitting application), a user's data input permissions, and/or the like.

Figure 20:
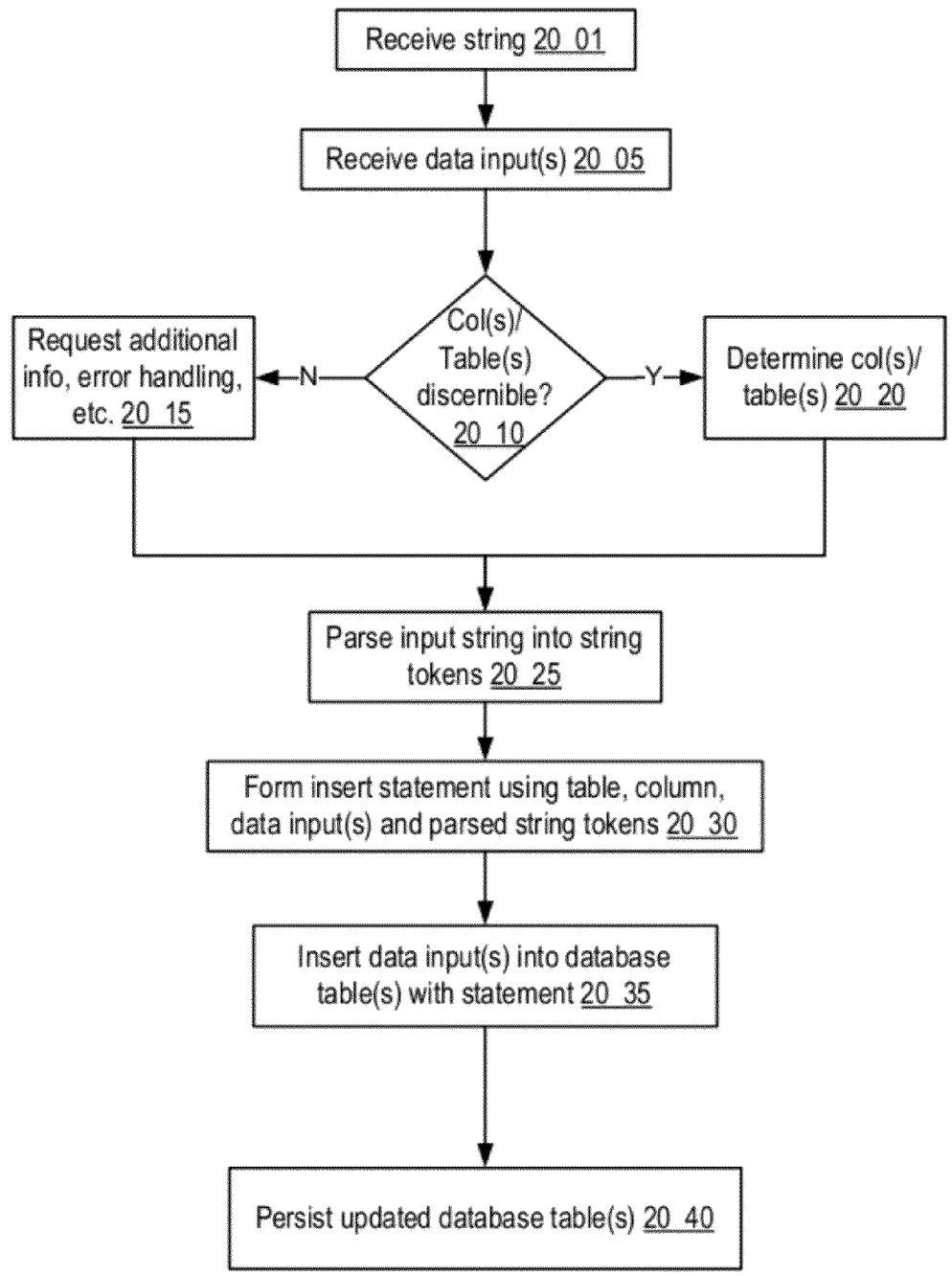
FIG. 20 shows an implementation of logic flow for forming a database input statement based on an input string in one embodiment of Data-Translator operation.

FIG. 20 shows an implementation of logic flow for forming a database input statement based on an input string in one embodiment of Data-Translator operation. An input string is received 2001, along with attendant data inputs 2005, which may represent data sought to be input to the database by a user, and may comprise data values, rules, reports, data collections, and/or the like inputs. A determination may be made as to whether a table name and/or column name are discernible 2010, such as based on the received string and/or data, a source of the received string and/or data (e.g., an application from which the string and data were received), a user profile and/or user permissions, and/or the like and/or any combination thereof. If a table name and/or column name are not discernible, the Data-Translator may undertake an error handling procedure, request additional information from a user or requesting application, and/or the like 2015. Otherwise, the table name and/or column name may be determined from the provided information 2020. The Data-Translator may then parse the input string into one or more string tokens 2025, and form an insert statement based on the parsed string tokens, the data inputs, and the table name and/or column name 2030. The data inputs may then be inserted into the database using the formed insert statement 2035, and the updated database tables may then be persisted 2040 for future use and/or reference.

Data Integration

Figure 21:
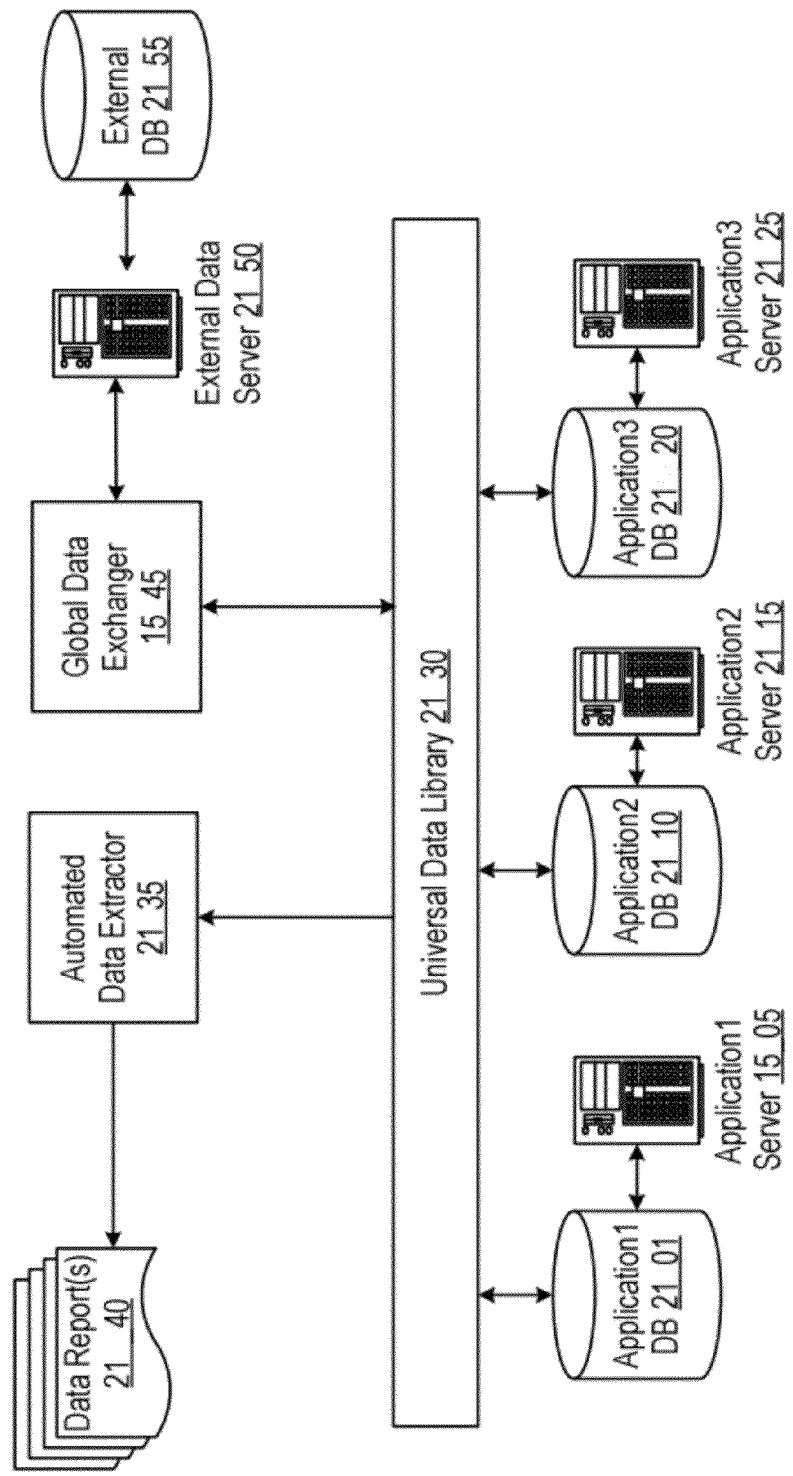
FIGS. 21A-B show an implementation of data flow between and among Data-Translator system components in one embodiment of Data-Translator operation.
Figure 21B:
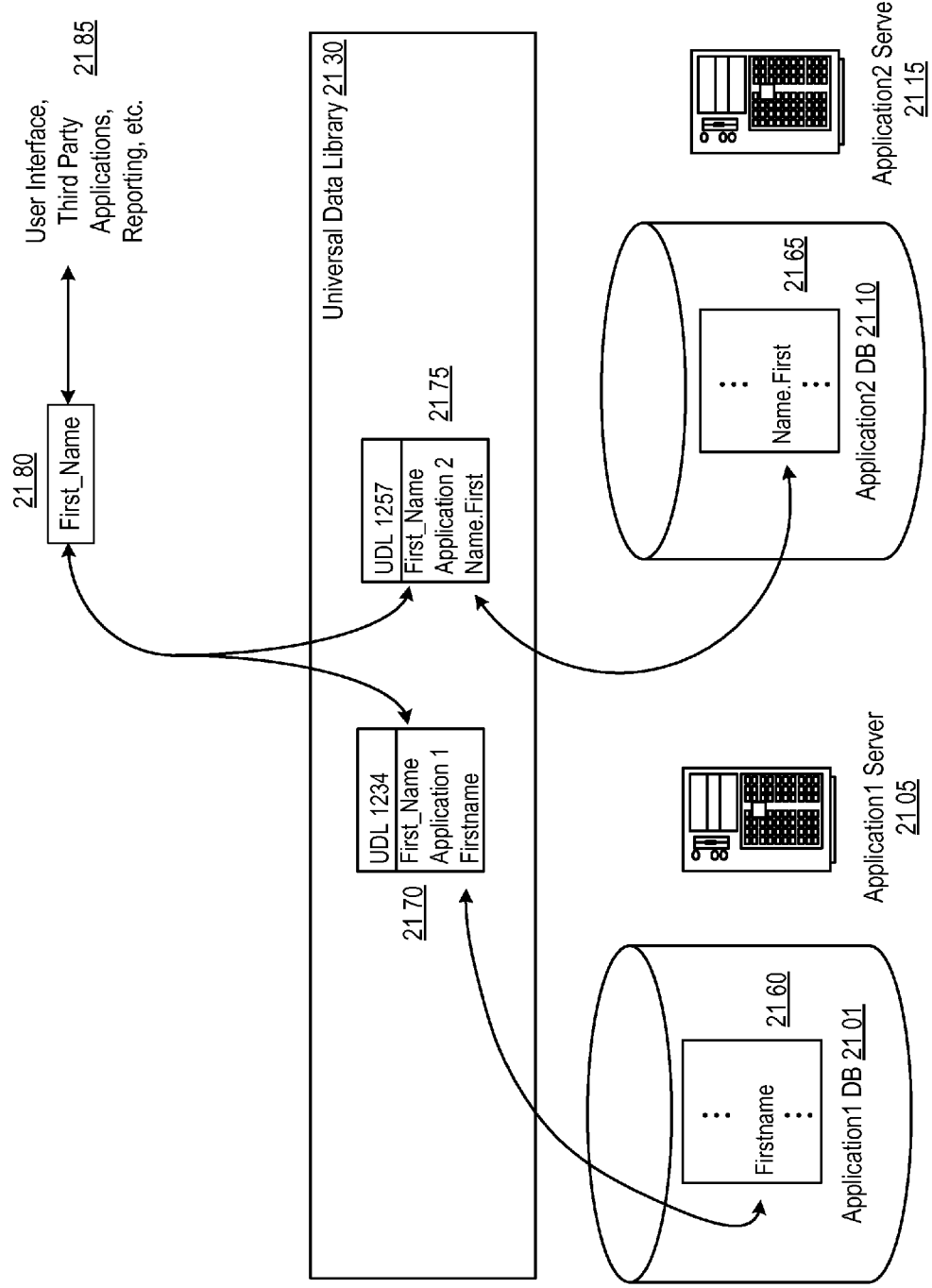

FIGS. 21A-B show an implementation of data flow between and among Data-Translator system components in one embodiment of Data-Translator operation. In FIG. 21A, plurality of application systems may exist, each having a respective application database (2101, 2110, 2120) and application server (2105, 2115, 2125). For example, an enterprise or organization may employ different applications for different enterprise goals or functions, such as a human resources application, a facilities application, a finance application, and/or the like. In some implementations, an enterprise may employ further databases that are independent of a specific application or specialized server system, such as for data storage or warehousing. A universal data library 2130 may be communicatively coupled to databases and/or application servers to provide and/or mediate access to data contained in the databases through the use of intermediate objects acting as universal variables. As described in further detail below, the universal variables contained in and managed by a universal data librarian system may provide object-oriented database access to users while masking the intricacies of database relational structure and the details of database query languages. Furthermore, judicious selection of universal variables allows common data types across otherwise disparate databases, including external data sources in some implementations, to be encapsulated within a relatively small set of universal variables and allows for effective integration of databases without the need for data warehousing practices. In some implementations, universal variables managed by the universal data librarian may be organized in accordance with a hierarchical schema, as described in further detail below.

In some implementations, the universal data library may be communicatively coupled with an automated data extractor 2135 configured to receive specification of report templates and/or to generate reports 2140 of values associated with universal variables. Report generation schedules, triggering conditions, and/or the like may likewise be specified as part of report template definition, and values included in the report may be draw in real-time and/or on a scheduled, periodic, or triggered basis, via the universal data librarian, from multiple otherwise disparate databases and/or data sources.

In some implementations, the universal data library may further be communicatively coupled with a global data exchanger 2145 configured to communicate with one or more internal or external databases and/or data sources to exchange data therewith. For example, the Data-Translator may be coupled to one or more external data servers 2150 and/or external databases 2155 to receive data files therefrom and/or provide data files thereto. In one implementation, the Data-Translator may be configured to retrieve one or more data files from an external data source (2150, 2155), such as on a scheduled, periodic, triggered, and/or the like basis; parse discrete data units from the file contents, wherein the parsing may depend on whether the file is fixed length, delimited, XML format, and/or the like; and associate the parsed data units with universal variables in accordance with a pre-defined specification. In some implementations, the Data-Translator may further be configured to mediate exchanges of data between internal databases. For example, the Data-Translator may be configured to draw data from a source database, such as on a scheduled, periodic, triggered, and/or the like basis, and to associate the drawn data with universal variables in accordance with a pre-defined specification. In both cases, association of sourced data with universal variables may cause the sourced data to be input in one or more internal databases based on associations between database tables and/or fields and universal variables, as defined within the universal data librarian.

In one implementation, the universal data librarian, global data exchanger, and/or Data-Translator may be configured to reformat data, such as to place it in a condition of conformity with like data in a target database. For example, sourced date data may be in a MM/DD/YY format while target date data is stored in a DD/MM/YYYY format. One or more of the described systems may be configured to reformat data as needed or desired, in accordance with a pre-defined specification. In one implementation, the universal data librarian, automated data extractor, and/or Data-Translator may be configured to combine data from one or more sources, such as by appending, arithmetic operation, and/or the like, into a single data value provided to a data target.

A schematic illustration of Data-Translator operation in one example is provided in FIG. 21B. Here, two application databases 2101 and 2110, each attended by a respective application server (2105 and 2115), each have tables (2160 and 2165) containing fields related to a first name (labeled Firstname in table 1560 and Name.First in 2165). Each database is communicatively coupled to a universal data library 2130, which includes records specifying relationships between the fields in application databases and universal variables. In the illustrated example, a record 2210 specifies a relationship between the Firstname field in the application 1 database and the universal variable First_Name. Similarly, a record 2175 specifies a relationship between the Name.First field in the application 2 database and the universal variable First_Name. The universal variable First_Name 2180 and/or values thereof may then be provided to a user interface, third party application, external data target, report generator, and/or the like 2185. Though omitted for clarity, details pertaining to the location of fields in an application database, such as table names, foreign keys, and/or the like may also be included in universal data library records to facilitate location of desired data.

Figure 22:
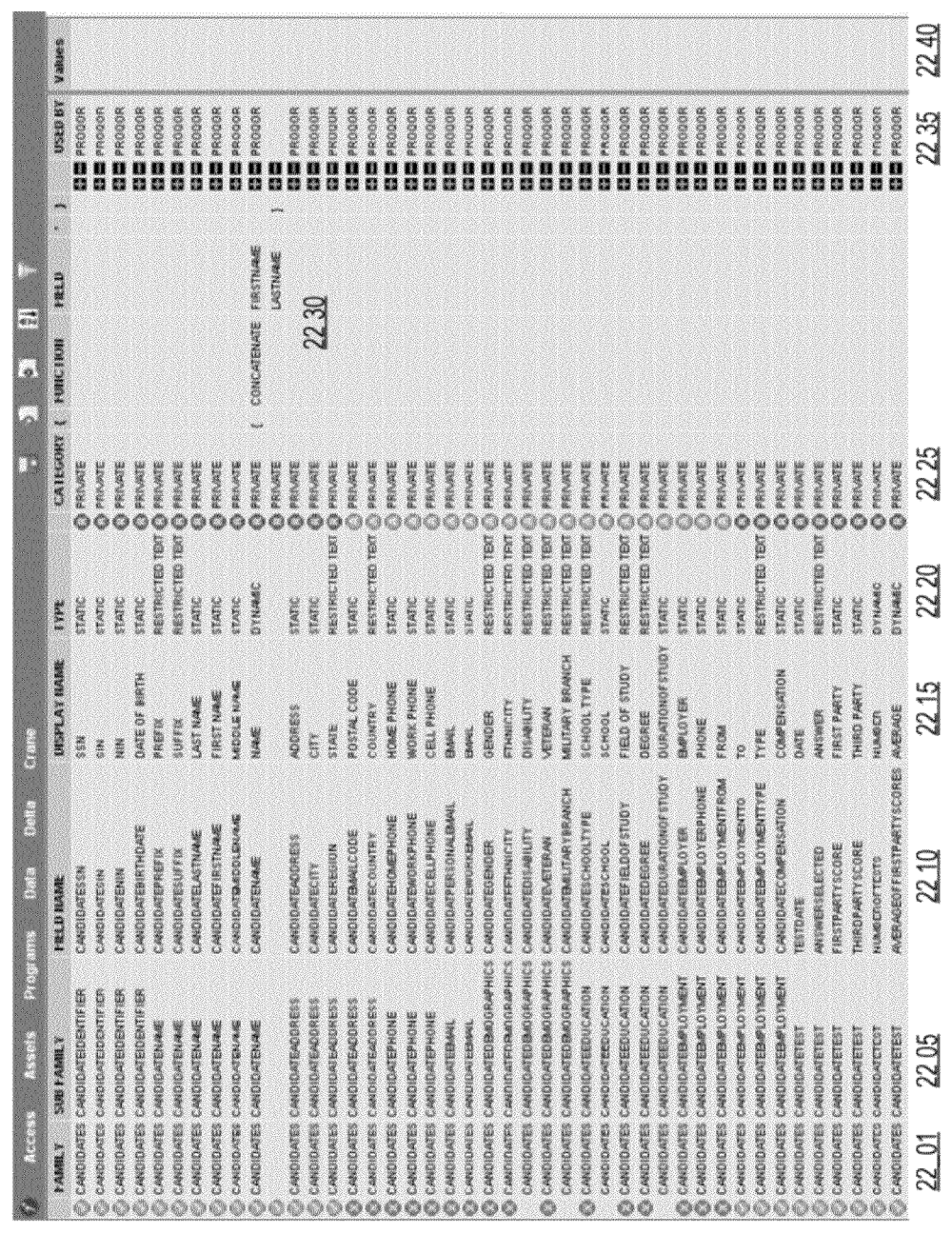

FIG. 22 shows an implementation of a user interface for universal variable allocation in one embodiment of Data-Translator operation. The user interface shown in 16 allows a user to specify associations between universal variables and applications having database fields to which the variables are connected. In the illustrated implementation, universal variables are organized in accordance with a hierarchical structure comprising a family 2201, a subfamily 2205, and a field name 2210. Here, the family shown pertains to a "candidate", such as a candidate for a job opening. Subfamily designations provide further specificity as to the type of data that is being embodied in the universal variable, such as candidateidentifier, candidatename, candidateaddress, and/or the like. The field name then specifies the precise data embodied in the universal variable, such as candidatessn for a social security number, candidatebirthdate, candidatecity, and/or the like. The interface further allows for specification of a display name 2215 associated with the universal variable, such as may be used in display interfaces, used in reports, provided in integrated data manipulation and/or third party applications, and/or the like. The interface further allows for specification of any of a variety of universal variable types 2220. For example, types may include, but are not limited to: static (e.g., data that is likely to not change often or at all, such as a user social security number), dynamic (e.g., data that is expected to change at some time in the future or that is frequently updated, such as a number of tests taken by a user, a user password, and/or the like), restricted text (e.g., data that must conform to a particular format or limited number of input options, such as a state abbreviation, a gender, and/or the like), and/or the like. The interface may further allow for specification of a data category 2225, such as whether the data is private or publicly available.

The interface may further allow for specification of a function, reformatting, and/or the like to be applied to data associated with one or more universal variables 2230. For example, in the illustrated implementation, the CandidateName universal variable field is set as a concatenation of a firstname variable and a lastname variable. The interface may further allow for specification of one or more databases, applications, and/or the like with which a universal variable is to be associated 2235. In one implementation, by specifying an application in connection with a particular universal variable, a facility may be made available for a user to further specify a particular table and/or field within a database associated with that application to which the universal variable should be connected and/or mapped. Such further specification is described in further detail below. The interface may further admit specification of particular values for universal variables, such as a fixed value for particular variables and/or sets of restricted values to which future inputs and/or associations must be matched (e.g., a list of 50 state abbreviations to which any state input to a corresponding universal variable must conform).

Figure 23:
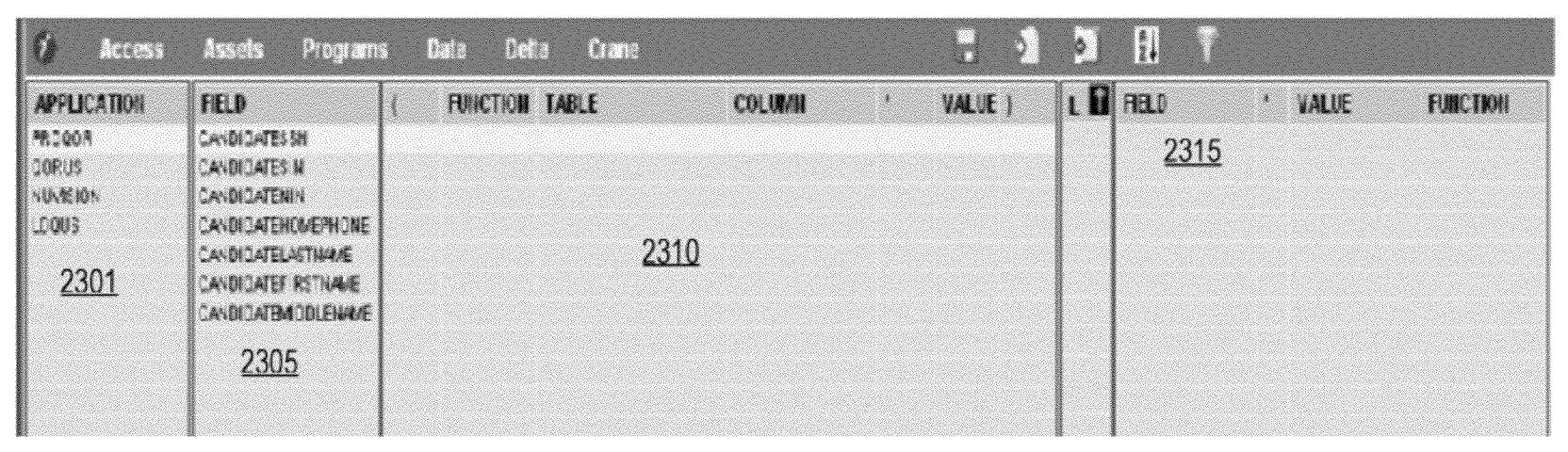

FIG. 23 shows another implementation of a user interface for universal variable allocation in one embodiment of Data-Translator operation. The interface shown in FIG. 23 may, in one implementation, allow for specification of specific tables and/or fields in databases, such as may be associated with particular software applications, to which specified universal variables are to be connected and/or mapped. A list of available, selectable applications and/or databases is provided at 2301. Selection of a particular application and/or database may cause a list of connected universal variables to be provided 2305. In one implementation, the list of universal variables shown 2305 in connection with a selected application or database 2301 is based on specifications made via the interface of FIG. 18. Each listed universal variable name at 2305 may then have one or more fields from tables in a database connected with the application and/or database specified at 2301, such as in the interface area shown at 2315. In one implementation, the interface may further allow for specification of one or more functions, reformatting, and/or the like to be applied to field values as they are associated with universal variables 2310. For example, a particular database may store an account value in US cents instead of US dollars, which may be the typical unit for the corresponding account value universal variable. The interface at 2315 would allow the database account value to be divided by 100 before association with the universal variable for the account.

An example implementation of hierarchically arranged universal variables is provided in Appendix A for one embodiment. Each universal variable includes family and subfamily designation, and is further characterized by a field name. Variable families may specify high-level categories to which particular universal variables belong and/or are associated. In the implementation illustrated in Appendix A, the families include Consumer, Account, Payment, Letter, Call, Product, Consumer Credit, Candidate, Employee, Plans, Forms, Supplier, Program, Employee, Government, Investor, Entity, and/or the like. Subfamilies may provide further detail as to the nature of the particular universal variable, and the field name provides yet further detail to unambiguously designate the type of data to be associated with that universal variables. Universal variables, such as may be organized hierarchically, with families, subfamilies, field names, and/or the like, may be selected, in some implementations, to maximize the extent to which the variables can be mapped to and/or otherwise associated with enterprise and/or third party data and/or database tables and/or table fields. For example, in one implementation, universal variables may comprise business objects, wherein the selection, naming, and organization of the universal variables is designed to facilitate understanding of the variables in a business context and/or by those skilled in business who may otherwise have little or no knowledge of database design or management. By mapping table fields from the underlying databases to such business object universal variables, embodiments may facilitate manipulation of the data relevant to business managers without the need for assistance from database administrators and/or any other database manipulation experts. The selection of universal variables illustrated in Appendix A will hereinafter be referred to as a business descriptive set of universal variables.

In an alternative implementation, a universal variable hierarchy may follow a business grammar construct, where each segment of the hierarchy follows a business grammar segment or token type (e.g., client name, followed by country, followed by vertical, followed by business type, followed by client program, in an implementation wherein the hierarchy follows a program code grammar).

In another embodiment, the hierarchy may itself be stored in the Data-Translator database; e.g., where an object oriented database may be used to establish entity-relationships between a superclass entity and its constituent subclasses, and its eventual field entries. In one embodiment, each of the XML and/or data entries may be read into the user interface table column headings. Thus, when a user creates and/or edits values in the user interface, appropriate records and/or XML entries are pushed into the hierarchy data structure.

Figure 24:
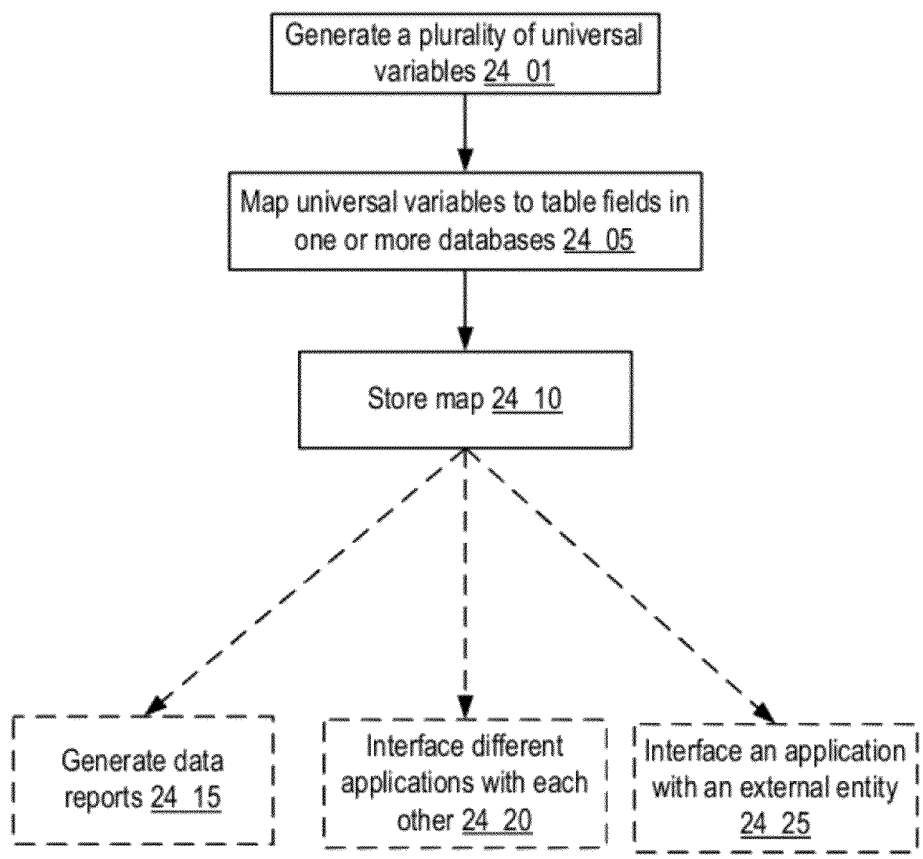
FIG. 24 shows an implementation of overall logic flow for a universal data library in one embodiment of Data-Translator operation.

FIG. 24 shows an implementation of overall logic flow for a universal data library in one embodiment of Data-Translator operation. A plurality of universal variables may be generated at 2401. In one implementation, universal variables may be organized in accordance with a hierarchical schema, such as may include a variable families, subfamilies, and fields. In one implementation, the universal variables may be selected and/or specified to represent business objects and/or with an eye to maximizing applicability of the variables across multiple entities, databases, clients, companies, and/or the like. The generated universal variables may then be mapped and/or otherwise connected to table fields in one or more databases 2410, and the mapping stored 2410, such as in a universal data library database. The universal variables, stored in the universal data library and managed by a universal data librarian, may then be used for a wide variety of different activities. For example, data reports may be generated 2415, whereby a user specifies data to be included in the report using universal variables, as well as a data layout in some implementations, and the data to be included in the reports is automatically extracted from the appropriate sources based on the mapping of universal variables to database tables and fields. In another example, different applications and/or databases having different data, table, and field labeling, database structure, data formatting, and/or the like, may be interfaced and/or integrated with each other 2420, whereby data updates in one database are automatically ported to corresponding fields in the interfaced database. This would allow, for example, data input from one application to update a database associated with a different application. In another example, an application and/or local database may be interfaced with an external entity and/or database 2425, whereby data updates by the local application and/or in the local database may be automatically provided to the external entity and/or database, and/or updates at the external entity and/or database may be automatically provided to the local database. These and other aspects and applications of the universal variables will be described in further detail below.

In one embodiment, the universal data librarian and/or other components described herein may connect to internal and/or external databases by means of one or more database adapters, such as but not limited to ODBC, JDBC, ADO.NET, OLEDB, and/or the like.

Figure 25:
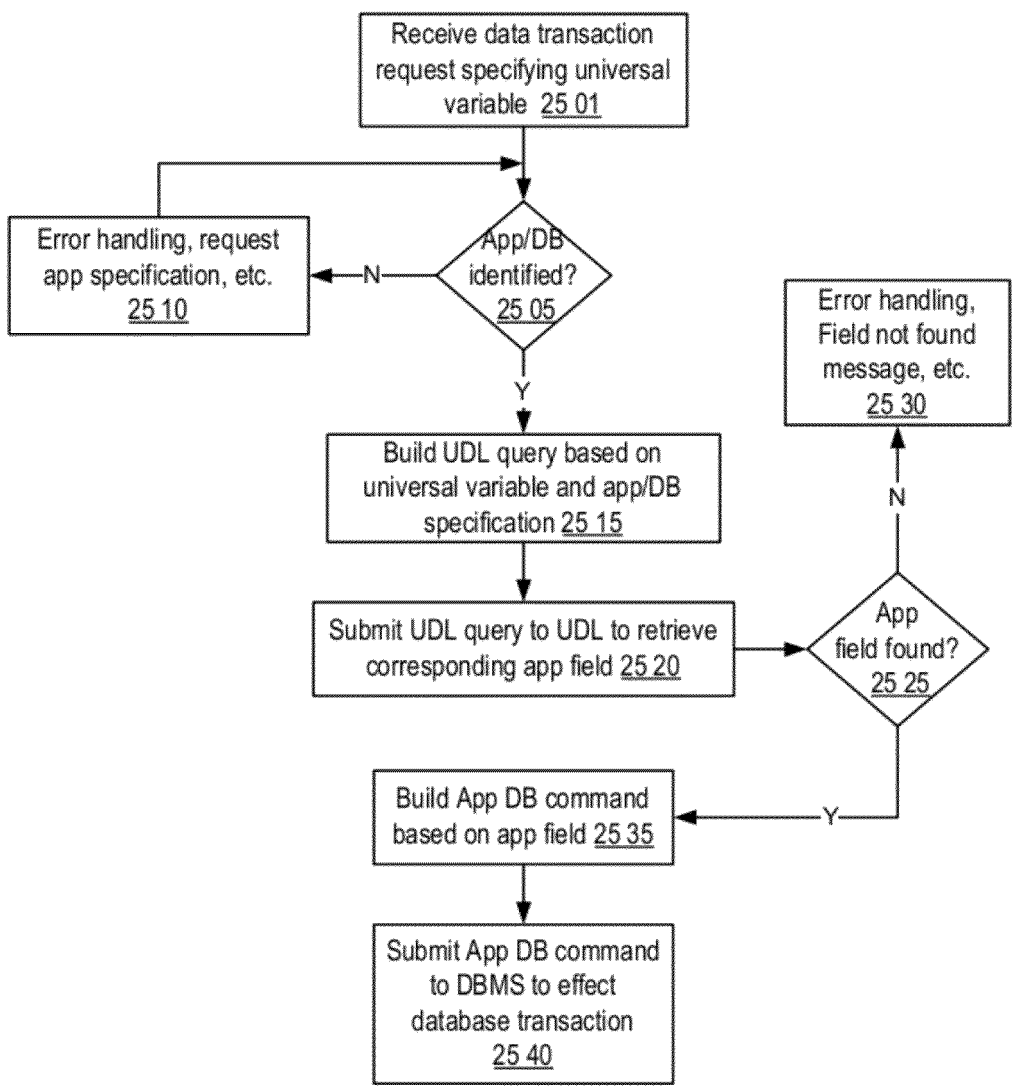
FIG. 25 shows an implementation of logic flow for connecting universal variable commands to application database commands in one embodiment of Data-Translator operation.

FIG. 25 shows an implementation of logic flow for connecting universal variable commands to application database commands in one embodiment of Data-Translator operation. A data transaction request, such as a request to input data, a data query, and/or the like, that specifies at least one universal variable is received 2501, and a determination is made as to whether a particular application, application database, other database, and/or the like has been identified or is identifiable in association with the request 2505. For example, in one implementation, a user may include an application and/or database specification in the request. In another example, an application and/or database may be contextually discerned based on the type of request, type of data queried, type of input, application used to generate the request, user identifier, and/or the like. For example, the Data-Translator may compare a user identifier of a requesting user with a record of application and/or database identifiers associated with that user and/or for which the user is authorized to discern a database from which to query the requested data. In one implementation, a database registration table may be used as a repository for all database tables with which the Data-Translator has come into contact, and the Data-Translator may query such a table to (a) provide a user with a list of targets, (b) use a program specified parameter to match and/or specify a database, (c) use terms in the request to match best to a database entry, and/or the like.

If at least one database for the request cannot be identified, an error handling procedure may be undertaken 2510, such as providing an error message to the user, requesting specificity as to the application and/or database to which the request is directed, and/or the like. Otherwise, a universal data library query may be generated 2515 based on the specified one or more universal variables and the specified and/or discerned application and/or database.

In one implementation, business grammar tokens may be connected to and/or otherwise associated with particular universal variables which, in turn, may be linked to table fields in local and/or remote databases. A query or other database transaction leveraging a business grammar string may, then, be employed to access and/or transact data with table fields in either local or remote databases, using universal variables as intermediaries in construction of, for example, SQL commands. This query may be submitted to the universal data librarian 2520 to determine one or more table fields in the specified database, and/or a database associated with the specified application, to which the specified universal variable corresponds. A determination may be made as to whether the associated field exists in the target database, whether the field has some data values stored in association with it, and/or the like 2525 and, if not, another error handling procedure may be undertaken 2530, such as providing an error message to the user. In one implementation, determination of whether an associated field exists may be accomplished by evaluating a database management system response to a query submission (e.g., whether the desired data is retrieved, or whether an error message is returned from the database management system). Otherwise, a database command may be generated for the target database based on the identified one or more fields and the original user request 2535. The database command may, in various implementations and/or uses, comprise a query, an input, a data transfer, a data reformatting, an update, and/or the like. The generated command may then be submitted to the target database to effect the desired transaction 2540.

Figure 26A:
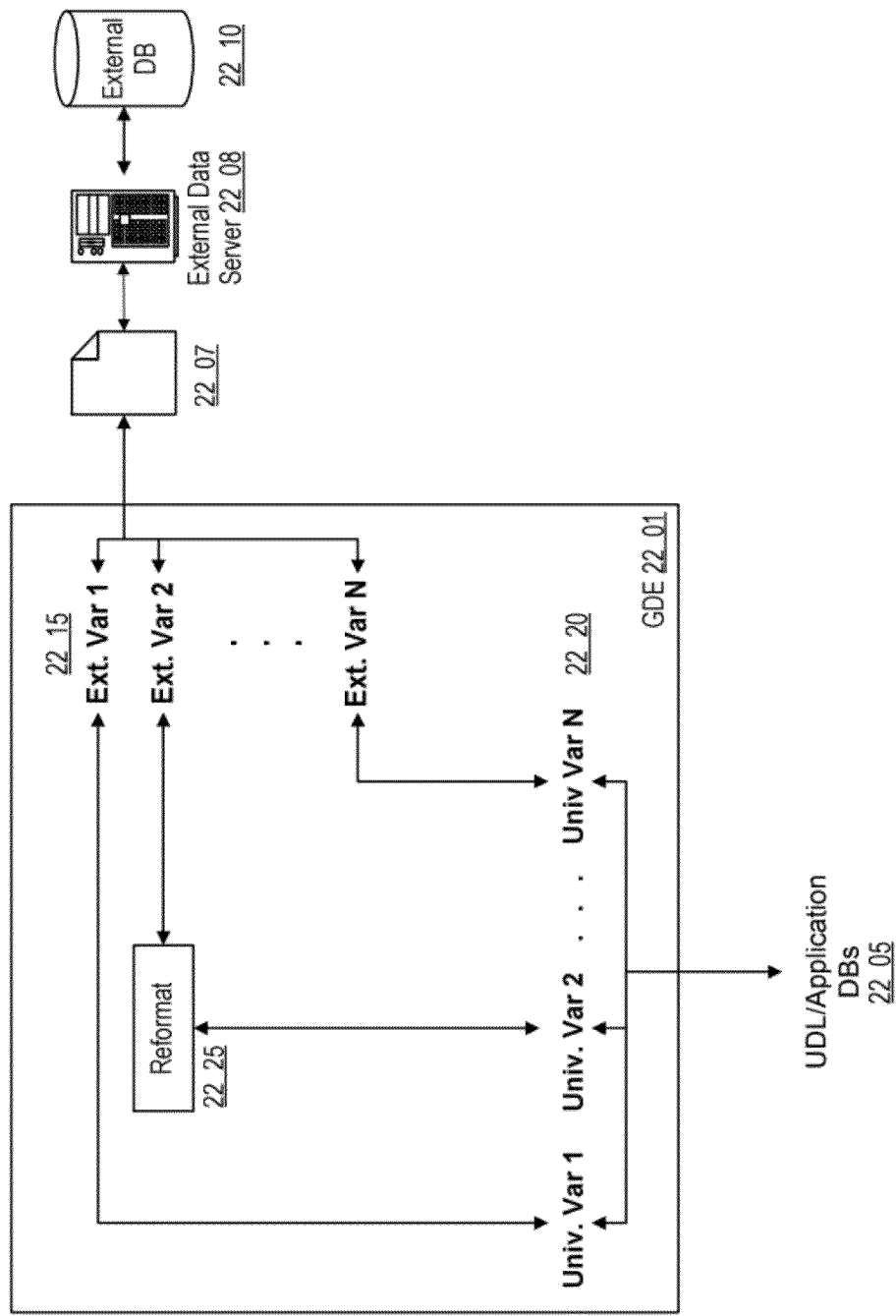
FIGS. 26A-B show implementations of data flow for interfacing universal variables to external database fields in one embodiment of Data-Translator operation.
Figure 26B:
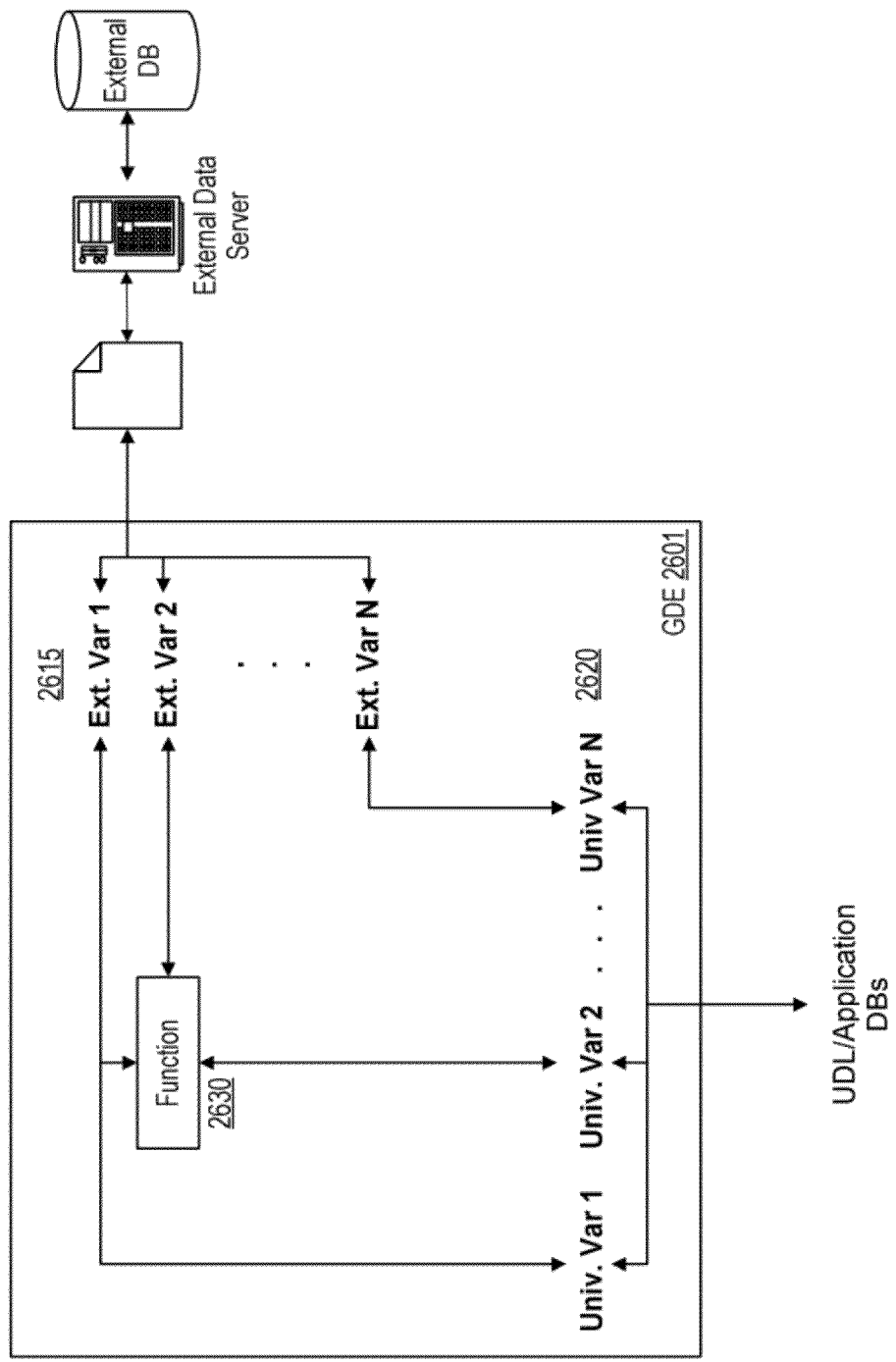

FIGS. 26A-B show implementations of data flow for interfacing universal variables to external database fields in one embodiment of Data-Translator operation. In FIG. 26, the Data-Translator is shown as a connecting interface between a universal data librarian and/or application databases and an external data server 2608, external database 2610, and/or the like. In the illustrated implementation, the external data server 2608 may generate a data file 2607 based on data contained in the external database 2610. The data file 2607 may be configured in accordance with a variety of formats and/or protocols, such as but not limited to fixed-length, delimited, extensible markup language (XML), and/or the like. In one implementation, the file may be stored in a pre-specified location and accessed by the Data-Translator, such as on a scheduled, periodic, triggered, and/or the like basis. In an alternative implementation, the file may be pushed to the Data-Translator as desired by the external data server 2608. The data in the file may be parsed by the Data-Translator into values for a plurality of external data variables 2615. How the data is parsed from the file may depend on the format and/or protocol with which the file is configured and is discussed at greater length below. The Data-Translator may access a mapping to determine which universal variables 2620 correspond to which external variables and/or external variable values 2615 parsed from the input file 2607. In some implementations, the Data-Translator may apply reformatting instructions 2625 to one or more external variable values 2615 prior to storage of those values in association with the corresponding one or more universal variables 2101. Illustrative examples of reformatting instructions include conversion of a Julian formatted date into its Gregorian formatted equivalent; extraction of a first name from any of a variety of different name formats (e.g., First Middle Last, Last First, Last First Middle, etc.); conversion of data present in binary-coded decimal to ordinary decimal representation; and/or the like.

Once the external values are associated with universal variables, the values may be stored in an appropriate database, provided to a local application, and/or the like 2605.

In some implementations, the reverse procedure may also be implemented by the Data-Translator, whereby data values stored in a local database 2605 and associated with universal variables 2601 are provided as values for external variables 2615 and configured as an output file 2607 for provision to an external data server 2608 and/or external database 2610. In some implementations, the output file 2607 may be configured as a report, which may be provided for viewing on a display device, for printing, and/or the like. In some implementations, the formatting instructions 2625 may be reversible and applied to either external variable values or reversibly to universal variable values.

The data exchange illustrated in FIG. 26B is similar to that shown in 26A except that instead of reformatting a single external variable 2615 and/or universal variable 2620 value, the Data-Translator 2601 may apply a function 2630 to combine values associated with more than one of the variables to yield the appropriate associations. For example, the function may specify that Universal Variable 1 is equal to External Variable 1, while Universal Variable 2 is equal to a sum of External Variable 1 and External Variable 2. This example function is reversible, since External Variable 1 and External Variable 2 could be recovered from Universal Variable 1 and Universal Variable 2 (i.e., External Variable 1=Universal Variable 1, and External Variable 2=Universal Variable 2–Universal Variable 1). Any mathematical operation, calculation, computation, data manipulation, reformatting, and/or the like may be applied to data by the Data-Translator, as desired in various implementations or embodiments of Data-Translator operation.

In some implementations, the Data-Translator 2601 in FIGS. 26A-B may be provided at the local side 2605 with a limited subset of universal variable inputs, a file containing universal variable inputs and/or pointers to universal variables, and/or the like. This may allow for isolation of data received from an external source and/or generation of universal variable collections for particular functions or implementations of Data-Translator embodiments. For example, in one implementation, a universal payment file may be generated locally, containing a set of universal variables that are expected to be relevant to any bank payment transaction. The Data-Translator may then have particular mappings set up for particular banks whereby each mapping selects a subset of universal variables from the universal payment file that is relevant to and/or desired by the particular bank Fto which payment information is being provided. For example, a domestic wire transaction in the U.S. may only use a routing number and account number, while an international wire may instead, or in addition, require a Society for Worldwide Interbank Financial Transaction (SWIFT) code, intermediary bank information and account number, and/or the like.

Figure 27A:
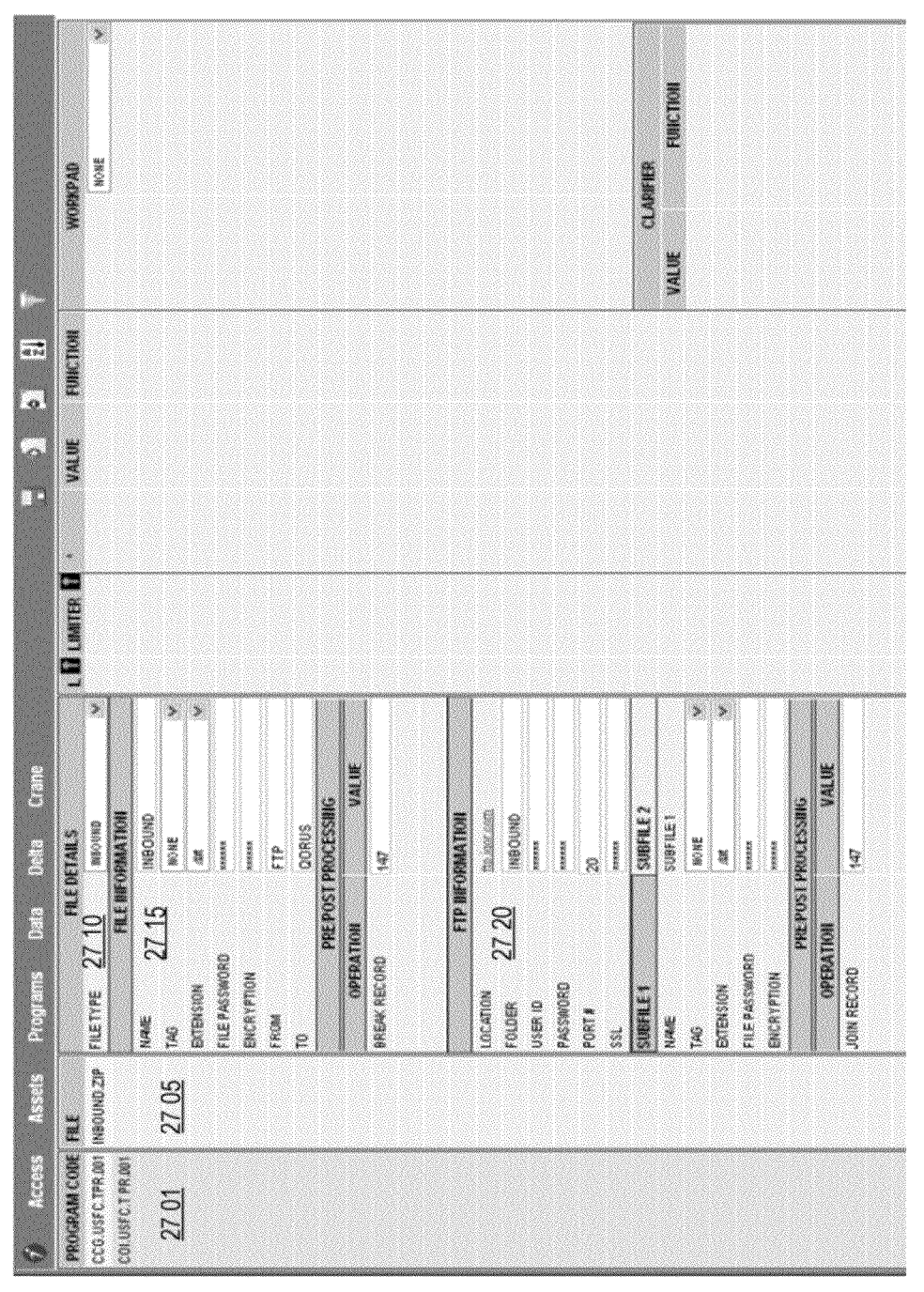
Figure 27B:
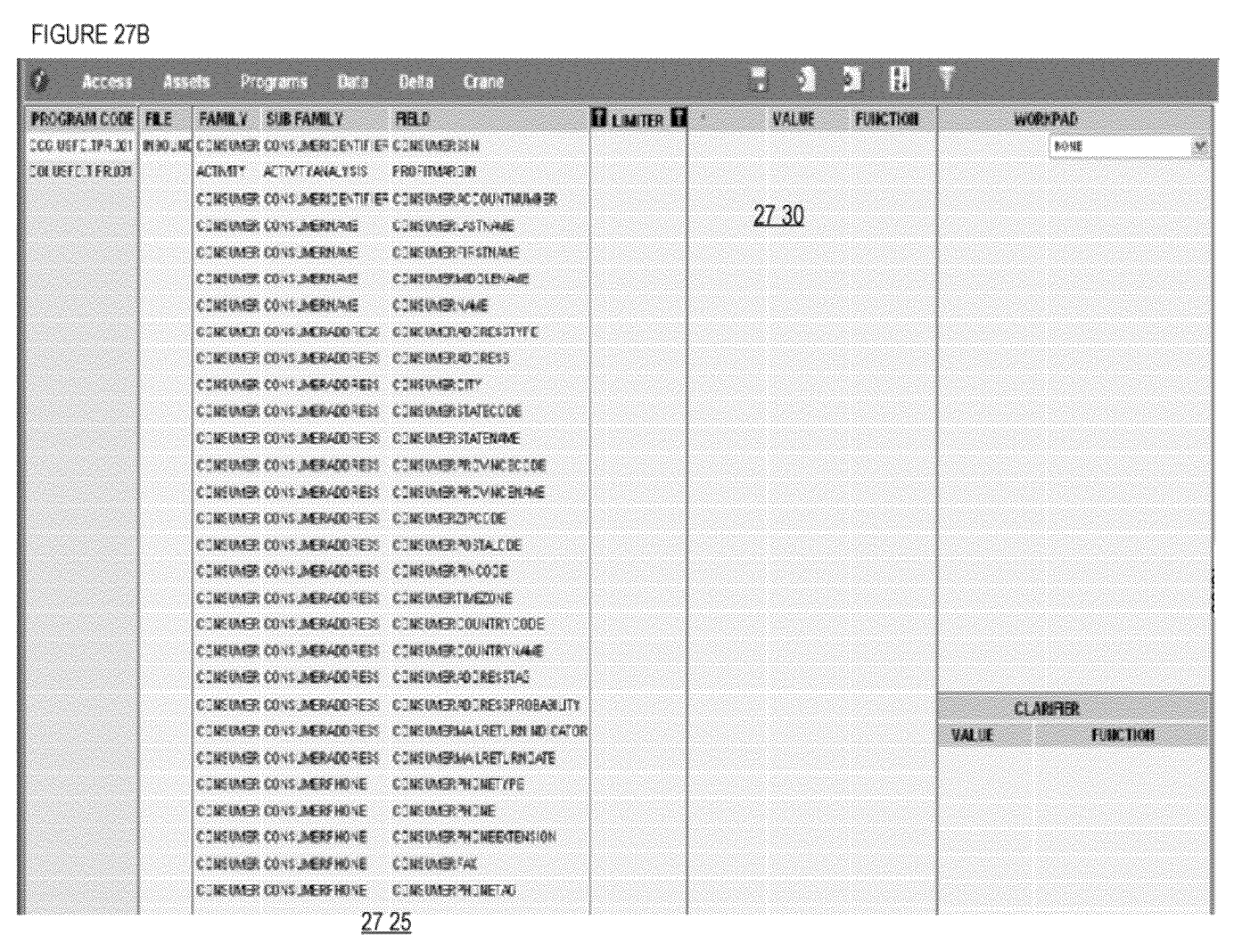
Figure 27C:
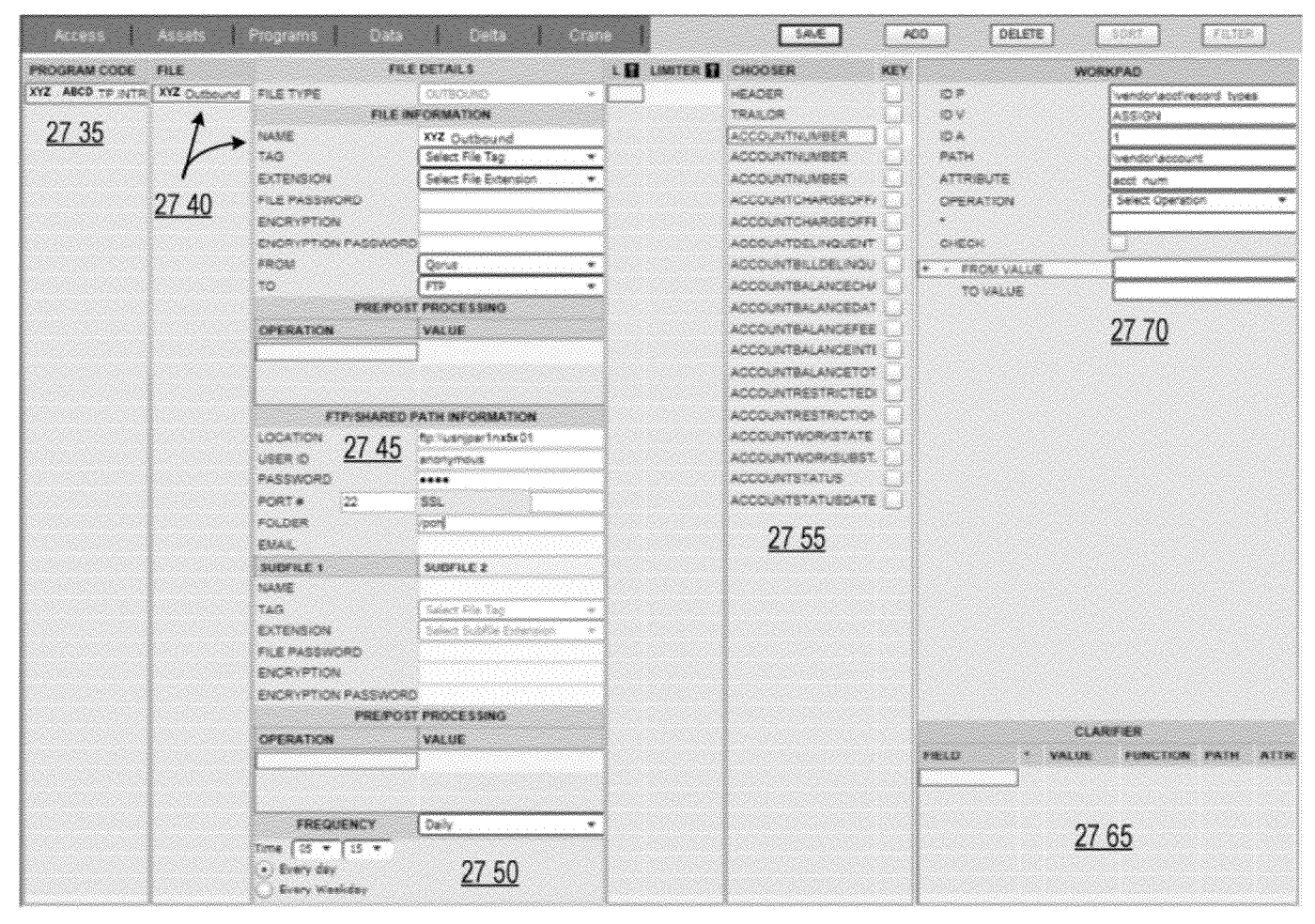

FIGS. 27A-C show implementations of a user interface for data exchange specification in one embodiment of Data-Translator operation. In FIG. 27A, a user may specify parameters associated with a data exchange with one or more external data sources. For example, the interface may admit specification of a program code 2701, such as may specify characteristics of a program, project, work order, and/or the like. Program codes are described in further detail above. Specification of a program code may cause received data to be stored in association with the program code and/or in association with data corresponding to one or more tokens specified in the program code. The interface may further admit specification of a filename 2705, such as may correspond to a file received from or sent to the external data source. In some implementations, the interface may further admit specification of a filename for a local file input. Additional file information may also be specified, such as a file type 2710 (e.g., inbound, outbound, and/or the like), file format, and a variety of other file information 2715, which may include a file extension and/or associated reader application, file passwords, encryption key, decompression tool, file source (e.g., file transfer protocol [FTP]), file target (e.g., database to which the file and/or data contained therein should be provided), file tags, and/or the like. In an example wherein the file source is an FTP source, the interface may further admit specification of a variety of FTP information 2220, such as an FTP server address, a folder therein, a login and/or password, port number, secure sockets layer information, other security information, and/or the like. The interface may further include facilities for specifying one or more schedules, triggering conditions, and/or the like for causing data to be exchanged between the universal variables and the target. For example, these specified values may be exported as comma delimited values which are to be read by a cron job that feeds them as parameters to various programs.

In one implementation, an FTP cron entry may take a form similar to the following example:
Source: ftp.xyz.com 22 Folder: /inbound/placement Frequency: Daily at 5 AM.

In another example, a user may specify a periodic schedule (e.g., a specified time of each day) at which the Data-Translator is to pull a file from (or push a file to) an external data target. In another example, a user may specify a triggering condition (e.g., a data update, a user request or other user action, occurrence of an automated part of a process, and/or the like), the occurrence of which triggers a Data-Translator mediated data exchange between the universal variables and the target. The scheduled and/or triggered data exchange may also apply to data exchanges between local databases mapped to universal variables. For example, a user may specify that, at a specified time every day, particular fields in local database 1 corresponding to the universal variables should be updated with data in fields in local database 2 associated with those same universal variables. In some implementations, a user may specify a time-variable and/or trigger-variable frequency of effectuating transactions. For example, if a new external source has just been added and the data from that source is expected to be updated frequently in an initial period, the transaction schedule for that source may be set to a twice-daily frequency for the first week, followed by a once-daily update for the following two weeks, and a weekly update thereafter. Transaction frequencies may also be automatically varied based on the detected occurrence of specified triggers. For example, the Data-Translator may monitor a stock market index, such as the Dow Jones Industrial Average, and may be configured to increase transaction frequencies related to market data when a slope of the monitored index exceeds a specified threshold and to decrease the transaction frequency when the slope of the monitored index drops back below the specified threshold.

The interface may further provide a listing of selectable universal variables for association, such as via a drag-and-drop interface mechanism, with parsed components of an external data file (such as may be received from an external source or may be destined for transmission to an external target). An example of such a listing of selectable universal variables is shown at 2725 in FIG. 27B. In one implementation, a universal variable may be dragged and dropped to an association area of the interface, wherein the universal variable may be mapped to and/or otherwise associated with a specified portion of the external file. For example, in one implementation, the external file may be configured as a fixed-length file and one or more universal variables may be associated with one or more portions of the fixed-length file as specified by the position of the data within that file. In another implementation, the external file may be configured as a delimited file and one or more universal variables may be associated with one or more portions of the delimited file as specified by how the data is delimited within the file. In another implementation, the external file may be configured as an XML file and one or more universal variables may be associated with one or more portions of the XML file as specified by the XML tags setting off data within the file.

FIG. 27C shows another implementation of a user interface for specifying parameters associated with a data exchange with one or more external data sources. The interface may include a variety of different parameter specification fields and/or field areas, such as but not limited to: a program code area 2735 for entering one or more strings structured in accordance with a table tracking syntax and/or a descriptive business grammar; filename and detail information area 2740; data exchange counterparty address and detail information area 2745; scheduling information area 2750; universal variable selection listing area 2755, such as may, in one implementation, be configured with a drag-and-drop facility (e.g., employing Silverlight code and language libraries); clarifier specification area 2765 for refining data retrieval results; workpad area 2770 for entering data processing and/or analytical instructions; and/or the like.

An implementation of an XML data exchange specification resulting from inputs to interfaces such as those shown in examples of FIGS. 27A-C may take a form similar to the following example:

```
<vendor vendor_id='irmcocap' >
<account acct_num="1001221235" bid="1" sid="2" action_dt=
"2009-10-07">
   <record_types>
      <record_type>ASSIGN</record_type>
   </record_types>
   <vendor_assignment_detail>
      <screen_name>JOE SHREE</screen_name>
      <day_phone_quality_score>10</day_phone_quality_score>
      <night_phone_quality_score>01</night_phone_quality_score>
      <pi_code>3916</pi_code>
      <pi_title>AOL</pi_title>
      <usage1>0</usage1>
      <usage2>0</usage2>
      <usage3>0</usage3>
      <usage4>0</usage4>
      <usage5>0</usage5>
      <usage6>0</usage6>
      <usage7>0</usage7>
      <usage8>0</usage8>
      <last_4_mon_fee>0</last_4_mon_fee>
      <last_4_mon_roaming>0</last_4_mon_roaming>
      <last_4_mon_commsurch>0</last_4_mon_commsurch>
   </vendor_assignment_detail>
   <contact_name>
      <first_name>JOE</first_name>
      <last_name>SHREE</last_name>
   </contact_name>
   <address>
      <street1>100 XYZ ST</street1>
      <street2> </street2>
      <city>XYZ CITY</city>
      <state>NJ</state>
      <zip>00000-0000</zip>
   </address>
   <phone>
      <day_phone>2222222222</day_phone>
      <evening_phone>2222222222</evening_phone>
   </phone>
   <acct_osb_amount>10360</acct_osb_amount>
   <member_misc_details>
      <current_pm_id>4</current_pm_id>
      <cancel_dt>2009-06-22</cancel_dt>
      <registration_dt>1999-11-26</registration_dt>
      <special_instr> </special_instr>
      <member_status_indicator> </member_status_indicator>
```

-continued

```
   </member_misc_details>
   <letter_details>
      <letter_id> </letter_id>
      <letter_due_days>0</letter_due_days>
   </letter_details>
   <payment_chargeback_details>
      <last_payment_dt> </last_payment_dt>
      <last_payment_amount>0</last_payment_amount>
      <last_chargeback_code> </last_chargeback_code>
      <last_chargeback_amount>0</last_chargeback_amount>
      <last_chargeback_dt> </last_chargeback_dt>
      <old_delinquent_charge_dt>2009-02-
27</old_delinquent_charge_dt>
   </payment_chargeback_details>
   <special_codes/>
   <line_item_transactions>
      <transaction>
         <charge_id>0000000000000</charge_id>
         <line_item>1</line_item>
         <line_item_desc>TWX*AOL SERVICE</line_item_desc>
         <pm_id>4</pm_id>
         <osb_amount>10360</osb_amount>
         <placement_dt>2009-10-07</placement_dt>
      </transaction>
   </line_item_transactions>
</account>
<account acct_num="000000000" bid="1" sid="2" action_dt=
"2009-10-07">
</vendor>
```

Other file configurations and parsing specifiers may be employed within various implementations of Data-Translator embodiments.

Figure 28:
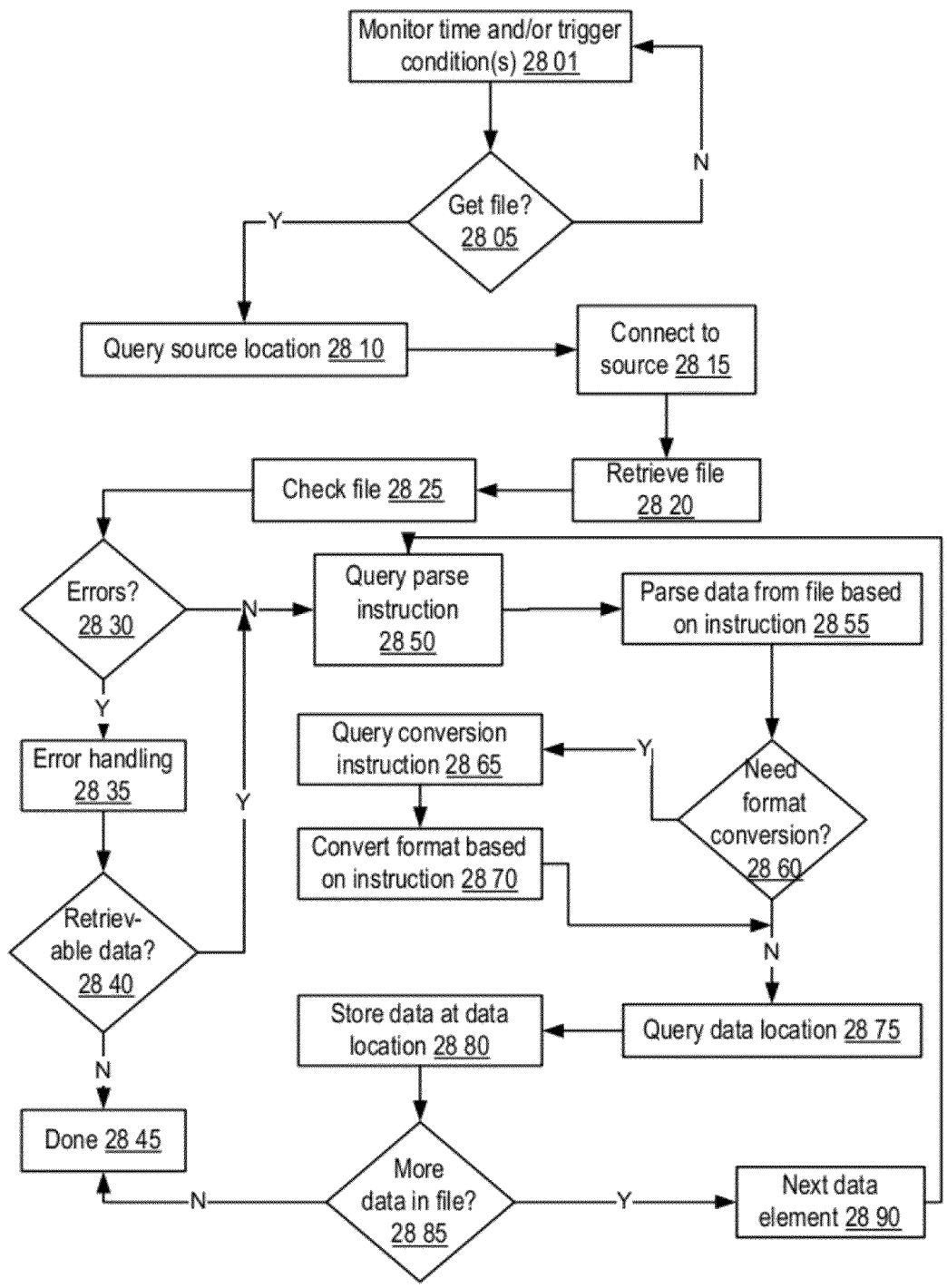
FIG. 28 shows an implementation of logic flow for data exchange in one embodiment of Data-Translator operation.

FIG. 28 shows an implementation of logic flow for data exchange in one embodiment of Data-Translator operation. The example illustrated in FIG. 28 is directed to receipt of a file from a data source and provision of data therein to fields associated with the universal variables. It is to be understood that the Data-Translator may also be configured for the reverse process, generation of a file, report, and/or the like and provision to a target based on data contained in fields mapped to the universal variables (see, e.g., FIGS. 27 and 28). The Data-Translator may further be configured, in some implementations, for exchange of data from fields in one database that are associated with the universal variables to fields in another database that are also associated with the universal variables (see, e.g., FIG. 26). In the implementation illustrated in FIG. 28, the Data-Translator may monitor time in relation to a specified schedule and/or one or more specified triggering conditions 2801 to determine whether or not to effectuate a specified data exchange 2805. If not, the Data-Translator may continue to monitor until the specified time and/or conditions indicate that an exchange is to occur. Once the exchange is triggered, the Data-Translator may query the location of a data source 2810 (e.g., the address of an FTP server, such as specified at 2220 in FIG. 22A), such as from a mapping record in a database. The Data-Translator may then connect to the source using the queried address 2815 and retrieve a file 2820 contained therein. In one implementation, the Data-Translator may retrieve every file contained in a specified target location (e.g., any file stored on the server, any file contained in a specified subfolder, and/or the like). In another implementation, the Data-Translator may retrieve only a file having a filename matching a name specified in a mapping record associated with the data exchange.

In one implementation, the Data-Translator may perform an initial check of the file to ensure that it does not have any clear problems or errors. For example, the Data-Translator may check that the file has at least a minimum file size (e.g., not a null file), is configured in accordance with an expected format, does not exhibit any characteristics of a virus or other undesired file, and/or the like. If errors or other problems are detected 2830, an error handling procedure may be undertaken 2835, such as providing an error message to a specified recipient (e.g., an administrator of the data source), attempting to repair the file, attempting to extract any salvageable data from the file, and/or the like. A determination may be made as to whether there is any retrievable data in the file 2840, such as following an attempted repair at 2835, and, if not, then the process may conclude 2845. Otherwise, if data can be retrieved from the file, the Data-Translator may query a parse instruction from a mapping record associated with the transaction 2850. The parsing instruction may, for example, specify a position of data in the file for a fixed-length file, a number of delimiters setting off data in the file for a delimited file, an XML tag setting off the data in an XML file, and/or the like. Based on the parsing instruction, the Data-Translator may parse data from the file 2855. A determination may then be made as to whether any reformatting of the data is needed or desired 2860, such as may be specified in the mapping record. For example, the convention for formatting of dates may be different in the file than for the universal variable to which the date is to be connected, so a conversion of format may be desired before associating the file data with the universal variable and/or table fields connected thereto in local databases. If conversion is desired, then a conversion instruction may be queried from the mapping record 2865, and the particular data converted and/or reformatted in accordance with that instruction 2870. The Data-Translator may then query a data location associated with the mapping to which the data from the file is to be provided 2875, such as may be directed by a universal variable specified in the mapping record. For example, the data location may be a field in a table in a database mapped to the universal variable to which the data from the file is connected. The data parsed from the file may then be stored at the data location 2880, and a determination made as to whether there is any further data in the file to be extracted 2885. If so, information associated with the next data element may be queried from the mapping record associated with the transaction 2890, and the Data-Translator may return to 2850 to parse that next data from the file. Otherwise, the transaction may be concluded 2845.

Figure 29:
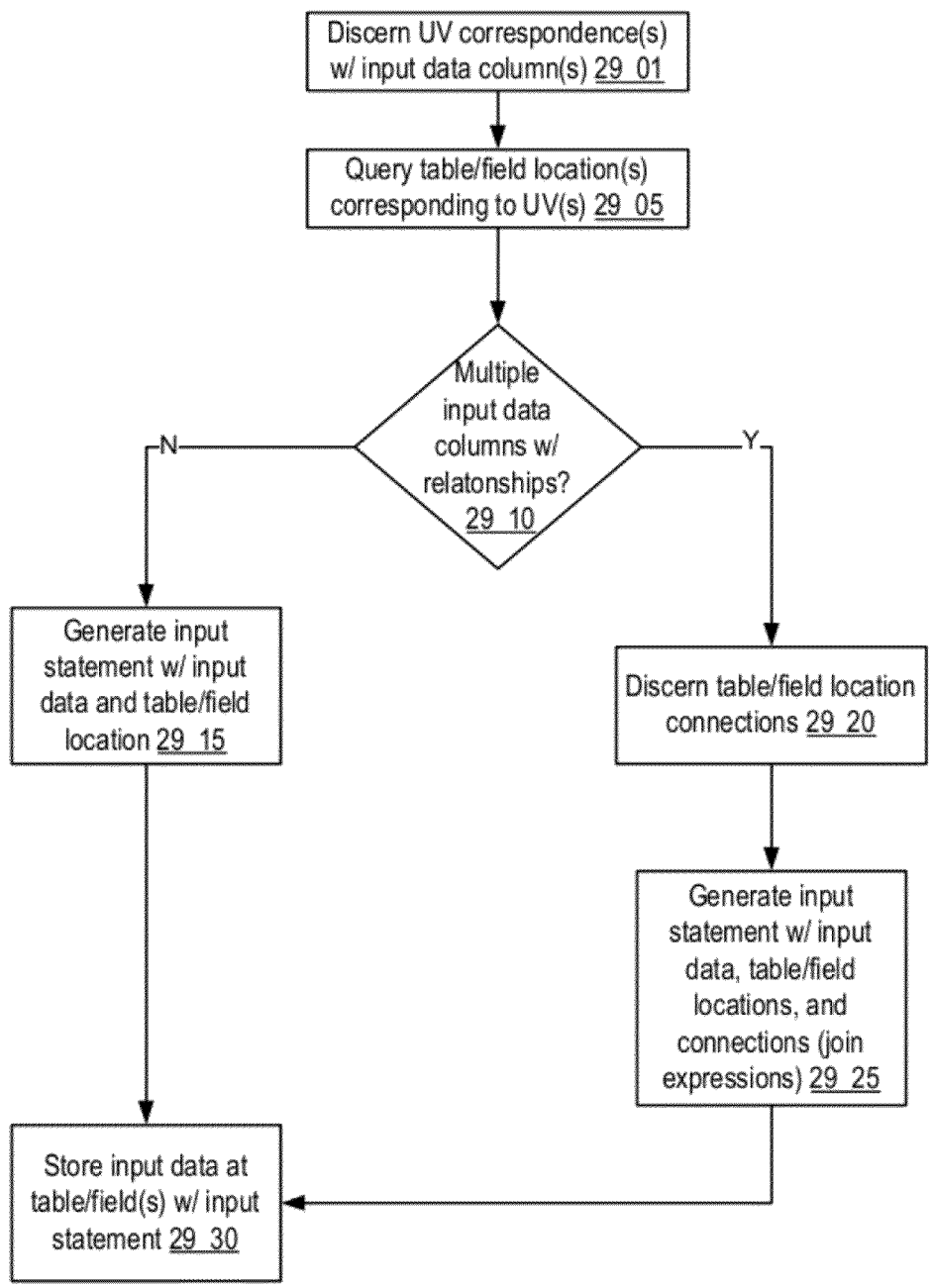
FIG. 29 shows an implementation of logic flow for database input statement generation in one embodiment of Data-Translator operation.

FIG. 29 shows an implementation of logic flow for database input statement generation in one embodiment of Data-Translator operation. The logic flow shown in 29 may, in some implementations, be provided as a further detail of the storage of data at 2375 and 2380 in FIG. 23. In some circumstances, data provided in an external file may be provided as a single column of data or may be provided as multiple columns that are independent of each other (i.e., wherein the data in a given row of one column has no relationship to data in a corresponding row of any other column). On the other hand, in some circumstances, data provided in an external file may comprise multiple columns having fixed relationships to each other. An example of this latter circumstance may be a file containing a column of customer names and a second column of customer accounts, wherein exactly one account corresponds to each customer name. The flow in FIG. 29 serves to distinguish between these two circumstances and to handle each appropriately. The Data-Translator may discern universal variable correspondences to input data columns 2901 and to query the databases and/or table/field locations associated thereto 2905, such as via a mapping record and/or records for universal variables stored in a universal data library. A determination may then be made as to whether there are multiple data columns having fixed relationships to each other in the input data file 290. In one implementation, this determination may be made by querying a specification of a multi-column file with fixed relationships in a mapping record. In another implementation, the Data-Translator may automatically determine whether columns have a fixed relationship to each other, such as by comparing column headers to values in a table indicating columns that are likely to be related (e.g., "name" and "account" may be associated in such a record, so columns having these words their headers may be automatically determined to have a fixed relationship).

If there are not multiple columns, or if there are multiple columns but no fixed relationship therebetween, the Data-Translator may generate input statements, such as SQL Input statements, with the input data (which may, in some implementations, be arranged in multiple independent columns) and the corresponding table/field locations 2915 to save the data from the file at those locations 2930. In some implementations, a SQL statement generated as described above may take a form similar to the following example:

insert into tblAccountHdr
(ClientAccountNumber, ProgramID, CreatedDate, TS, CreatedBy)
select
tblAccountHdr_ClientAccountNumber, ProgramID, getdate( ), '633976851390226187', '311'
from
(select t1.tblAccountHdr_ClientAccountNumber__1__0 as tblAccountHdr_ClientAccountNumber, t2.ProgramID
From ##iQorFileMapping_ fdfde5fb3c8c03411f3be8a3cd7c6953edcf2 t1
inner join tblProgram t2 on t2.ProgramCode=t1.tblProgramProgramCode__1__1
WHERE t1.tblAccountHdr_ClientAccountNumber__1__0 is not null
Except
Select ClientAccountNumber, ProgramID
from tblAccountHdr) b
|Q|Parent
insert into tblPhoneNumber
(PhoneTypeCode, PhoneNumber, PhoneSource, PhoneSubSource, AccountID, Effective Date, CreatedDate, TS, CreatedBy)
select
tblPhoneNumber_PhoneTypeCode, tblPhoneNumber_ PhoneNumber, tblPhoneNumber_PhoneSource, tblPhoneNumber_PhoneSubSource, AccountID, getdate( ), getdate( ), '633976851390538675', '311'
from
(select t1.tblPhoneNumber_PhoneTypeCode__5__0 as tblPhoneNumber_PhoneTypeCode,
case
when len(ltrim(rtrim(t1.tblPhoneNumber_PhoneNumber__ 6__0)))>0 and isnumeric(ltrim(rtrim (t1.tblPhoneNumber_PhoneNumber__6__0)))=1
then convert(decimal(20,0),ltrim(rtrim (t1.tblPhoneNumber_PhoneNumber__6__0)))
when len(ltrim(rtrim(t1.tblPhoneNumber_PhoneNumber__ 6__0)))=0 and isnumeric(ltrim(rtrim (t1.tblPhoneNumber_PhoneNumber__6__0)))=0
then 0
else ltrim(rtrim(t1.tblPhoneNumber_PhoneNumber__6__0))
end as tblPhoneNumber_PhoneNumber,
t1.tblPhoneNumber_PhoneSource__9__0 as tblPhoneNumber_PhoneSource, t1.tblPhoneNumber_PhoneSubSource__ 10__0 as tblPhoneNumber_PhoneSubSource, t3.AccountID

```
from                                    ##iQorFileMapping_
fdfde5fb3c8c03411f3be8a3cd7c6953edcf2 t1
inner join tblProgram t2
on t2.ProgramCode=t1.tblProgramProgramCode__1__1
inner join tblAccountHdr t3
on          t3.ClientAccountNumber=t1.tblAccountHdr_
ClientAccountNumber__1__0                        and
t3.ProgramID=t2.ProgramID                     WHERE
t1.tblPhoneNumber_PhoneTypeCode__5__0 is not null AND
t1.tblPhoneNumber_PhoneNumber__6__0 is not null AND
t1.tblPhoneNumber_PhoneSource__9__0 is not null AND
t1.tblPhoneNumber_PhoneSubSource__10__0 is not null)b
```

If, on the other hand, the Data-Translator determines that there are multiple columns with a fixed relationship between them at 2910, then it may seek to discern relationships between table/field locations to which the columns in the file correspond 2920. For example, the file may include a column for customer_name, which is connected to a universal variable CustomerName, and a column for customer_account, which is connected to a universal variable CustomerAccount. Each universal variable is, in turn, mapped to table fields within one or more databases, such as a customer name field and a customer account field. In order to build a command to port the file data to those fields, the Data-Translator may seek to determine the relationship between the customer name field and the customer account field. If these fields are in the same table in the same database, a direct Input statement may be employed. However if, for example, the fields exist in different tables within a database, the Input statement may be supplemented with a Join clause, such as a SQL Join clause, to reflect the connection between the tables and the data provided thereto. By inputting the data with the Join clause, the connection between the customer name information and the customer account information will be preserved for future access. Further detail as to how the relationship between table fields is determined is provided below. Once the relationship is established, the Data-Translator may generate an Input statement with the file data, the table/field locations, and any necessary or desired Join clauses 2925, and may store the data with the generated statement 2930.

Figure 30:
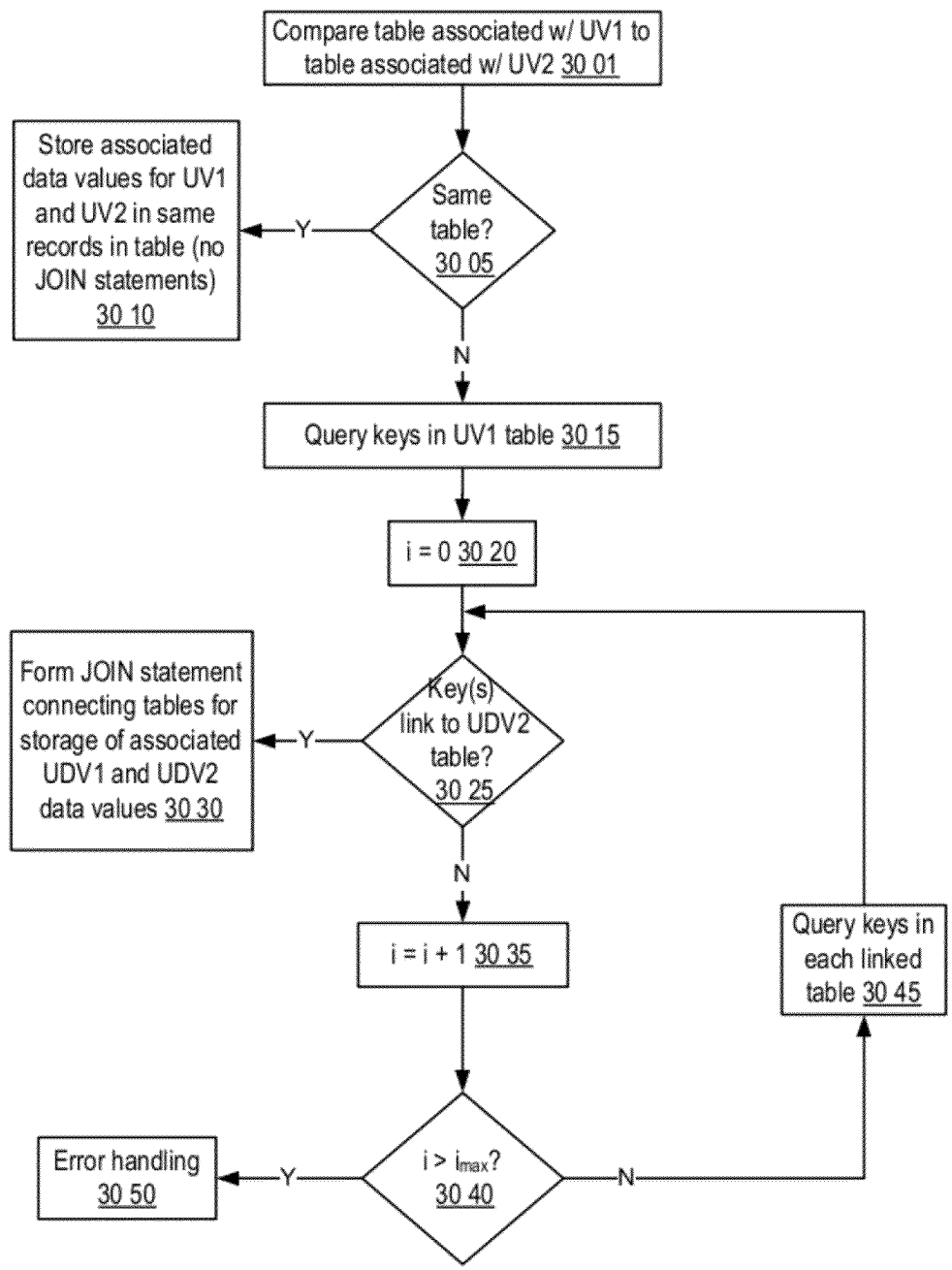
FIG. 30 shows an implementation of logic flow for determining data relationships in one embodiment of Data-Translator operation.

FIG. 30 shows an implementation of logic flow for determining data relationships in one embodiment of Data-Translator operation. The example illustrated in FIG. 30 is directed primarily to an implementation discerning a relationship between two related data columns. It should be understood, however, that the flow can be generalized to discern relationships between any desired number of data columns, such as to assist in generation of Join clauses for database transaction commands. The Data-Translator may compare a first table field associated with a first universal variable (which, in turn, may be associated with a first column of an input file) and a second table field associated with a second universal variable (which, in turn, may be associated with a second column of an input file) 3001. A determination may be made as to whether the first table field and second table field are fields within a single table 3005. For example, the Data-Translator may check whether the fields are in tables having the same name and in existing in the same database. If the fields are in the same table, the Data-Translator may generate a database command to store the values in the same table, wherein the command may not include any Join clauses 3010. If the fields are not in the same table, the Data-Translator may query keys contained in the table associated with the first universal variable 3015 and a counter may be initialized 3020. The Data-Translator may then determine whether at least one of the keys in the table corresponding to the first universal variable connects to a table associated with the second universal variable 3025. If so, the Data-Translator may form a Join clause for inclusion in a database command for storing the data values in association with the first and second universal variables, wherein the Join clause explicitly connects the tables associated with each universal variable. Otherwise, if no direct connection can be discerned between the tables associated with the first and second universal variables, then the counter may be incremented 3035, and a determination made as to whether the counter exceeds a pre-set maximum value 3040. If not, then the Data-Translator may query keys contained in each table directly connected to the table corresponding to the first universal data variable, or to whatever the last round of tables checked at 3025 were, and repeat the determination of whether any of those keys link to the table corresponding to the second universal variable (3025-3040). When the counter exceeds the maximum, the flow may be exited and/or an error handling procedure may be undertaken 3050, such as providing an error message to a user and/or administrator indicating that the distance between the tables corresponding to the first and second universal variables is too great to be established, and/or the like.

Figure 31:
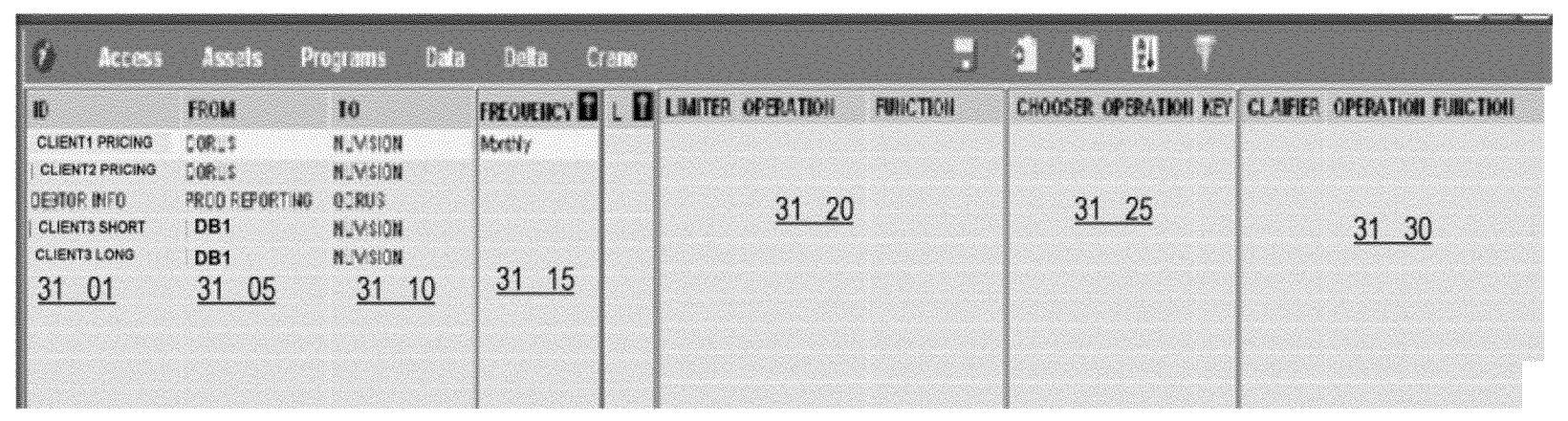

FIG. 31 shows an implementation of a user interface for database integration in one embodiment of Data-Translator operation. The interface shown in FIG. 31 may, in one implementation, be employed to specify connections between table fields in different databases, such as local databases and/or separate databases connected to different enterprise software applications. The interface may, in one implementation, admit specification of one or more universal variables 3101, as well as an identifier of a source database 3105 and of a target database 3110. The interface may further admit specification of a frequency, schedule, triggering condition, and/or the like 3115, which may set how often the data in a field in the source database that is associated with the universal variable is provided to corresponding field in the target database. In one implementation, a default schedule may be implemented when no other scheduling and/or triggering specification is provided, such as one time only, once per day, once per week, and/or the like. The interface areas at 3120, 3125 and 3130 may further admit additional limitations, specifications, operations, and/or the like for the data transactions specified in the interface. In one implementation, a user may specify information to limit the data associated with a universal variable that is passed from the source database to the target database. For example, a user may specify values for a second table field and/or universal variable to limit data for the first universal variable to only those values associated with the specified values for the second universal variable and/or table field (e.g., only provide account information or male customers). The interface may further admit specification of reformatting instructions and/or one or more functions and/or operations (e.g., mathematical calculations) to be performed on one or more data values extracted from the source before providing the processed data to the target.

Figure 32A:
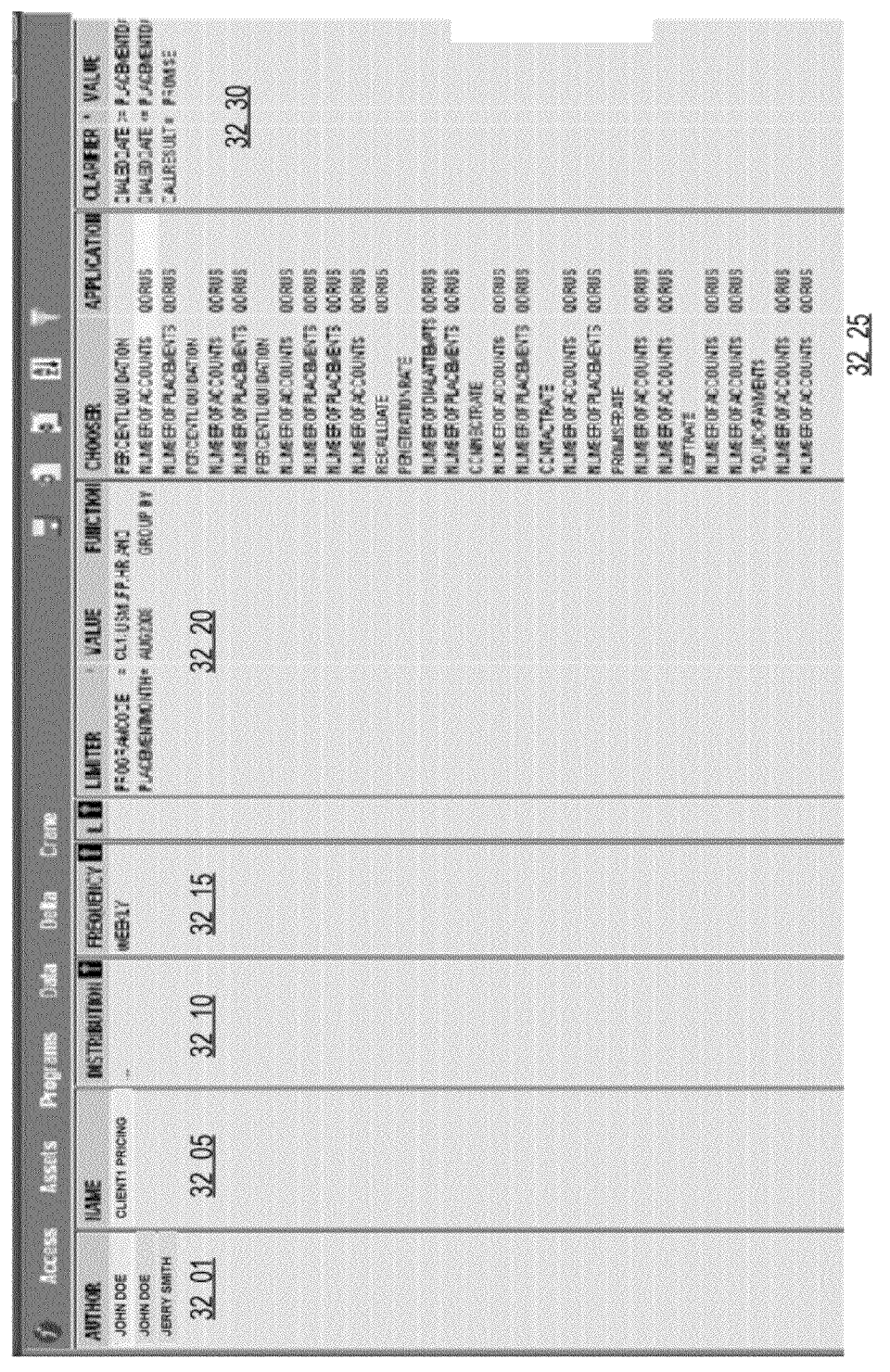
Figure 32B:
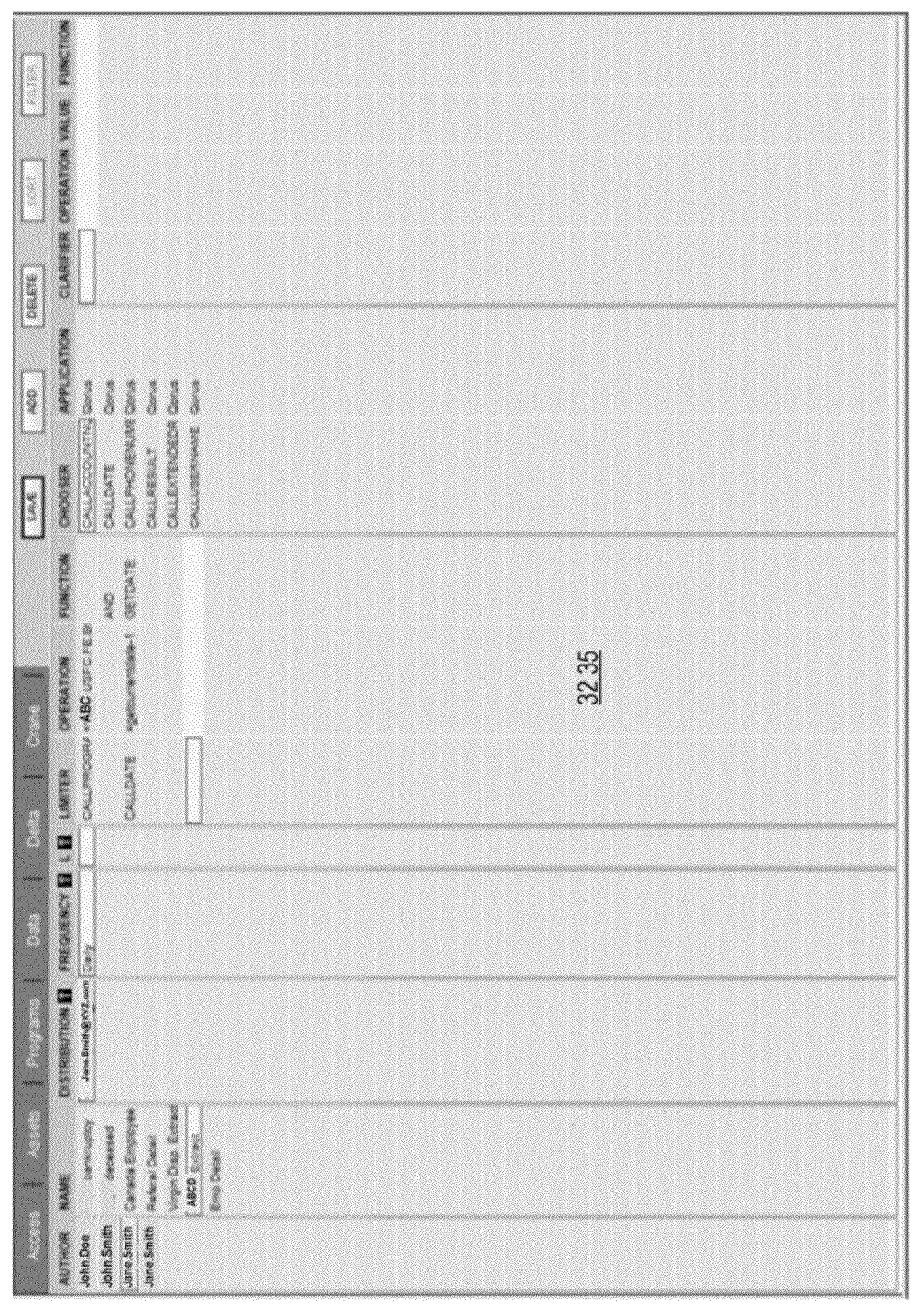

FIGS. 32A-C show implementations of a user interface for report generation and generated reports in one embodiment of Data-Translator operation. The interface in FIG. 32A may, in various implementations, admit input of report specifications, including a selection of data to be included (such as may be specified in terms of universal variables), data layout, desired or required manipulations of data, scheduling and/or triggering of report generation and/or output, and/or the like. In one implementation, the interface may admit specification of an author of a particular report generation template 3201, as well as a name identifying the template 3205, a distribution list and/or other target information for the report 3210 (e.g., a list of e-mail addresses, an FTP server address, a location on a file system, and/or the like), a report generation frequency (and/or, in various implementations, a schedule, triggering condition or event, and/or the like), and/or the like. The interface may further admit selection of any of the full set or some subset of universal variables, such as via a drag-and-drop mechanism. Selected universal variables, shown at 3225 in the figure, may be limited as to the particular database from which their associated data is to be drawn, and may further be limited in a variety of other ways. For example, the illustrated implementation admits entry of so-called Limiters 3220, specifying desired values for particular universal variables, program codes and/or code tokens, department codes and/or code tokens, and/or the like. Here, the data retrieved for a report is limited to those data associated with a PROGRAM-CODE of CL1.USMI.FP.HR and a PLACEMENTMONTH of August 2008. The interface may further admit additional limitations on the data included in the report, such as by the so-called Clarifiers shown at 3230. Clarifiers may, in one implementation, limit the data based on specified relationships between universal variables (e.g., "DIALEDDATE>=PLACEMENTDATE", "CALLRESULT=PROMISE", and/or the like).

Another implementation of a report parameter specification interface is shown at 3235 in FIG. 32B, with report parameter fields filled. FIG. 32C displays an example of a report generated by the inputs shown in FIG. 32B. The report is configured as a spreadsheet file and includes columns corresponding to extracted data such as call account number 3240, call user name 3245, call phone number 3250, call result 3255, extended result 3260 (which may, in one implementation, include additional information to refine the call result information), call date and/or time 3265, and/or the like.

In one implementation, Silverlight code, general Silverlight language libraries, and/or the like may be used to generate the tables and column presentation in HTML format. The tables may be comprised of text fields, and appropriate calls to the libraries may be made to pass information via drag and drop.

In various implementations, a report may be generated for output as a physical document (e.g., a printout), an electronic document, a structured data file (e.g., fixed length, delimited, XML, and/or the like), one or more database records, a user interface display, and/or the like.

Figure 33:
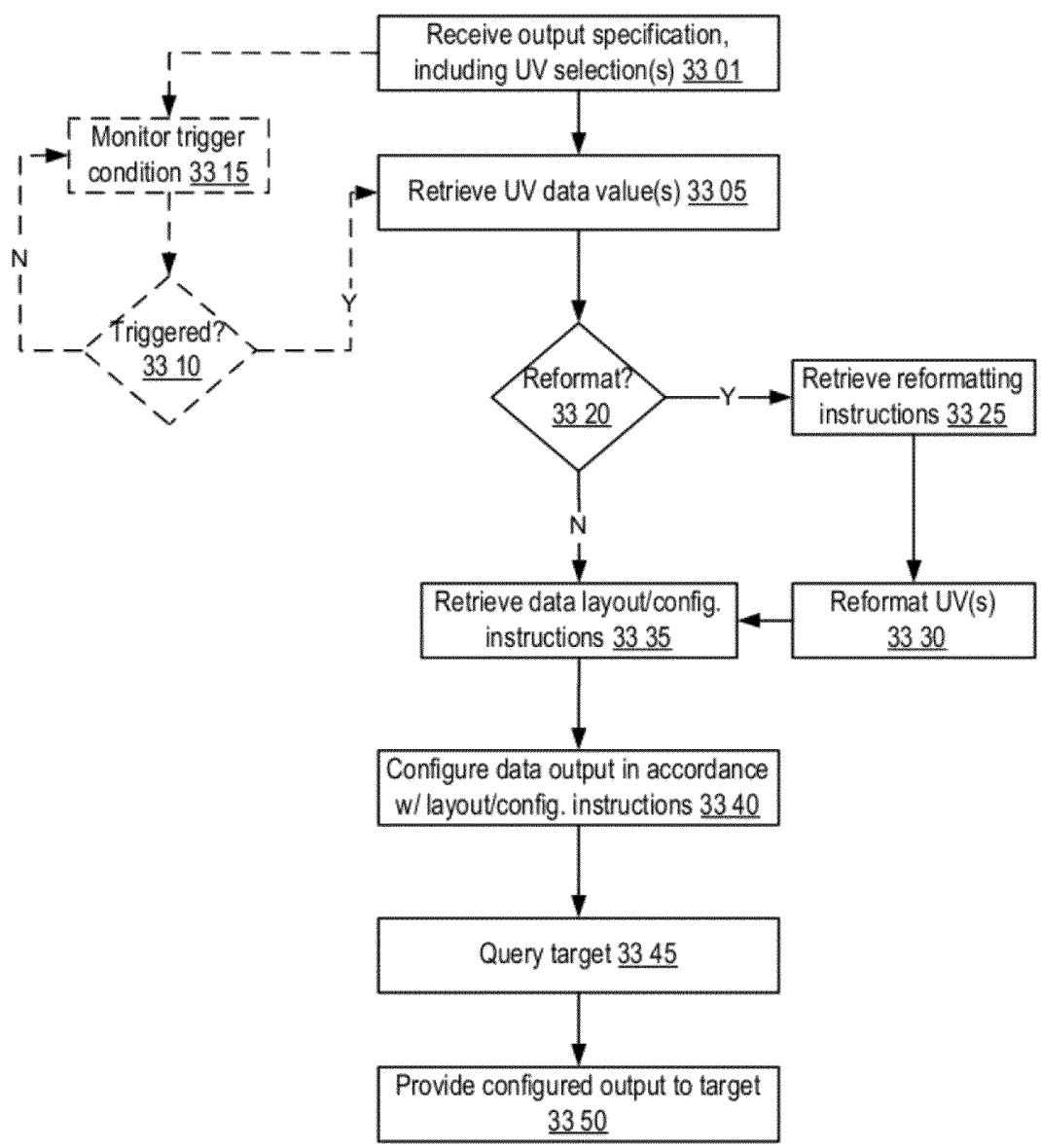
FIG. 33 shows an implementation of logic flow for report generation in one embodiment of Data-Translator operation.

FIG. 33 shows an implementation of logic flow for report generation in one embodiment of Data-Translator operation. A report output specification, such as may define a report template and may include a selection of universal variables, may be received 3301, such as via a report generation user interface. Based on the universal variables specified in the report output specification, data values associated with selected universal variables may then be retrieved from the sources containing those values 3305. In one implementation, data values in contained in table fields in remote databases that are associated with universal variables may first be pulled into one or more cache and/or local databases, and/or used to update table fields in local databases, before being retrieved for report generation. In an alternative implementation, no intermediate pulling of data values occurs, and the data is read directly from the remote database prior to inclusion in the report. In one implementation, such as when a report specification includes scheduling information, periodicity, triggering conditions, and/or the like, those triggering conditions, a clock, and/or the like may be monitored 3315 to determine when a report is to be generated, when the data for the report is to be sampled, and/or the like. A determination may be made as to whether or not report generation, data sampling, and/or the like has been triggered 3310 before proceeding to retrieve the requisite data for the report 3305.

A determination may be made as to whether any of the retrieved data is to be reformatted, modified, functionally combined with one or more other data values, and/or the like prior to inclusion in the report 3320. If so, the reformatting instructions may be retrieved 3325, such as by querying them from a report generation template record, and those instructions may then be applied to one or more selected universal variables and/or universal variable values 3330. In one implementation, a set of data layout and/or configuration instructions may also be retrieved 3335, such as from a report specification template record. Data layout and/or configuration instructions may, for example. include specifications of the arrangement and/or order of data; font, text size, text color, and/or other typographical characteristics of the data; titles, headers, borders, margins, table formats, charts, graphics, and/or the like for inclusion with the data; and/or the like. The retrieved data may then be configured in accordance with the retrieved layout and/or configuration instructions 3340.

A report target may then be queried 3345, such as from a report generation template record. A report target may, in various implementations, be selected from any of a wide variety of different possibilities, such as a display interface, a printer, a local or remote database and/or data server, an electronic file and/or document format (e.g., portable document format, spreadsheet, word processing document, and/or the like), and/or the like. The configured report may then be provided to the target 3350. In some implementations, a schedule, triggering condition, and/or the like may monitored to determine when the report should be provided to the target. In one implementation, the schedule, triggering condition and/or the like for provision of a report to a target may be separate and distinct from a schedule, triggering condition, and/or the like for report generation and/or data querying for inclusion in a report.

In some implementations, the Data-Translator may be integrated as part of the system architecture illustrated in FIG. 7 and may interact with any or all of the other system components described with reference thereto. For example, in one implementation, the Data-Translator may be provided at the authentication/control server 735 and/or at the data server 740 to mediate interactions with data stored in one or more central databases 745. For example, in one implementation, the data projection server 740 may correspond to the Data-Translator server 120, and the central database(s) 745 may corresponds to the Datab-Translator database 119. respectively, as illustrated in FIG. 1. Mediated interactions may include interactions with external and/or third party data sources or targets, projection servers 715, thin clients 705 and/or other network terminal devices, and/or the like.

Figure 34A:
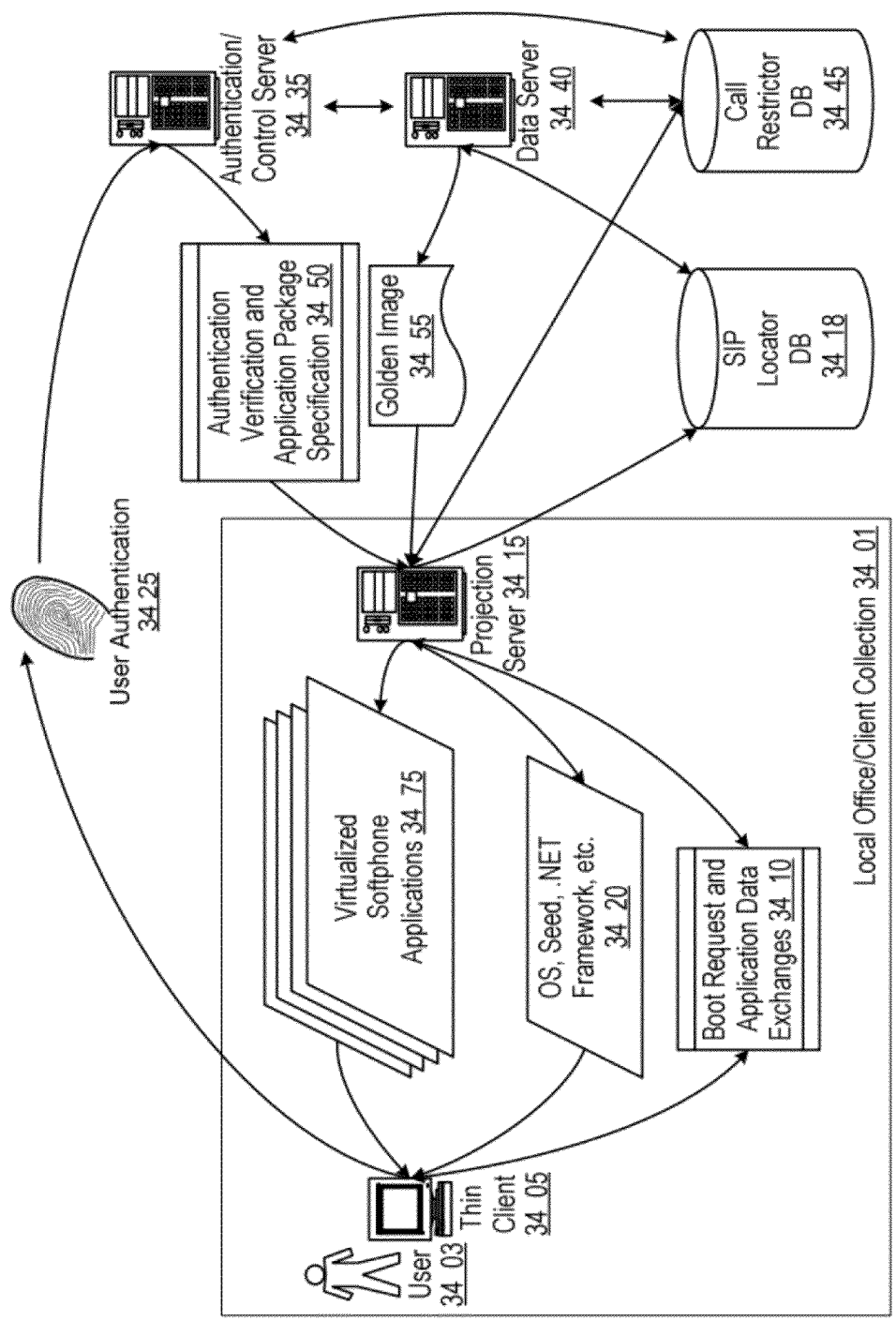
FIGS. 34A-B illustrate an implementation of data and logic flow among and between Data-Translator components and/or affiliated entities for setting up a client terminal to operate softphone applications in one embodiment of Data-Translator operation.
Figure 34B:
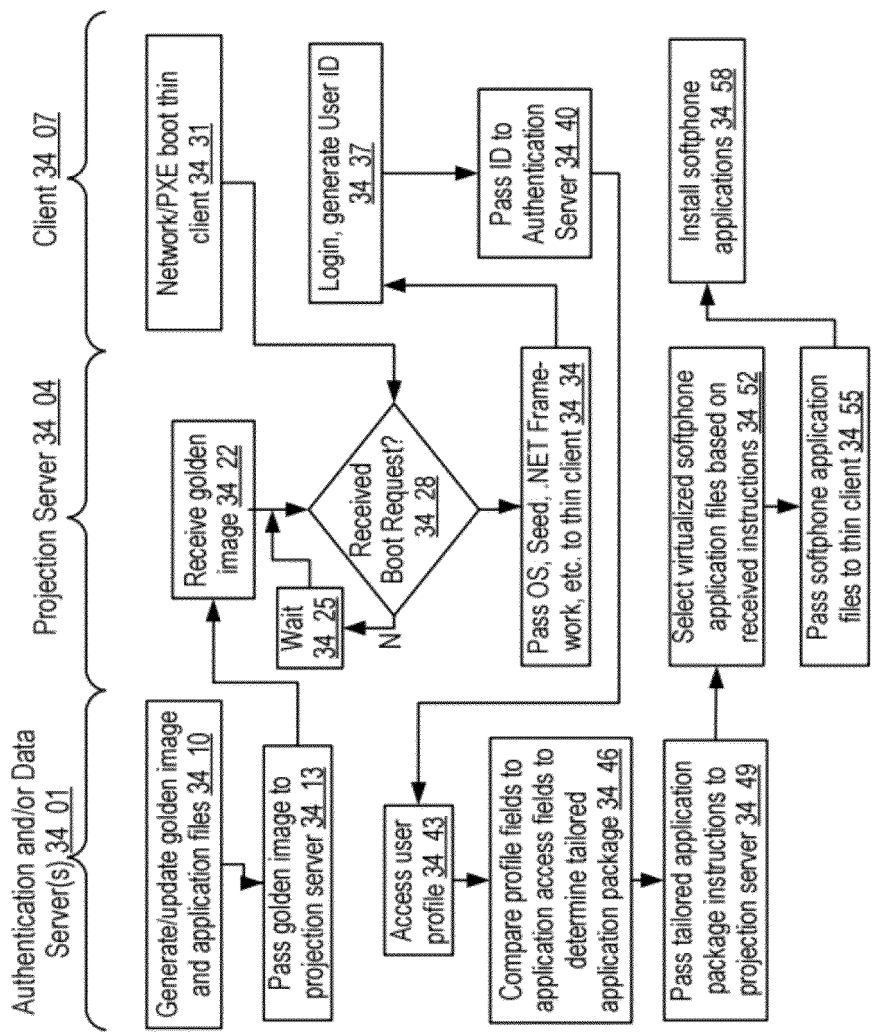
Figure 35A:
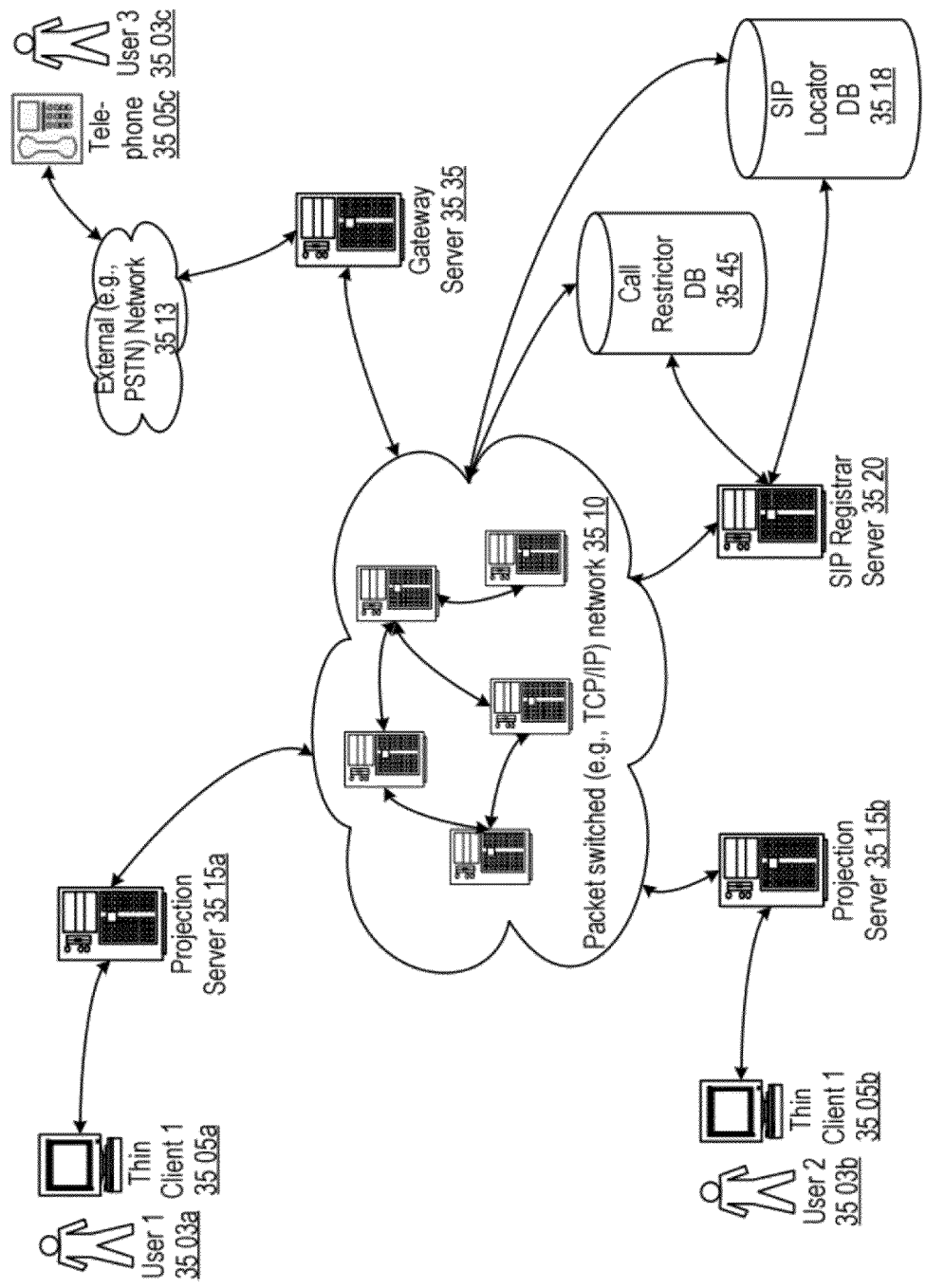
Figure 35B:
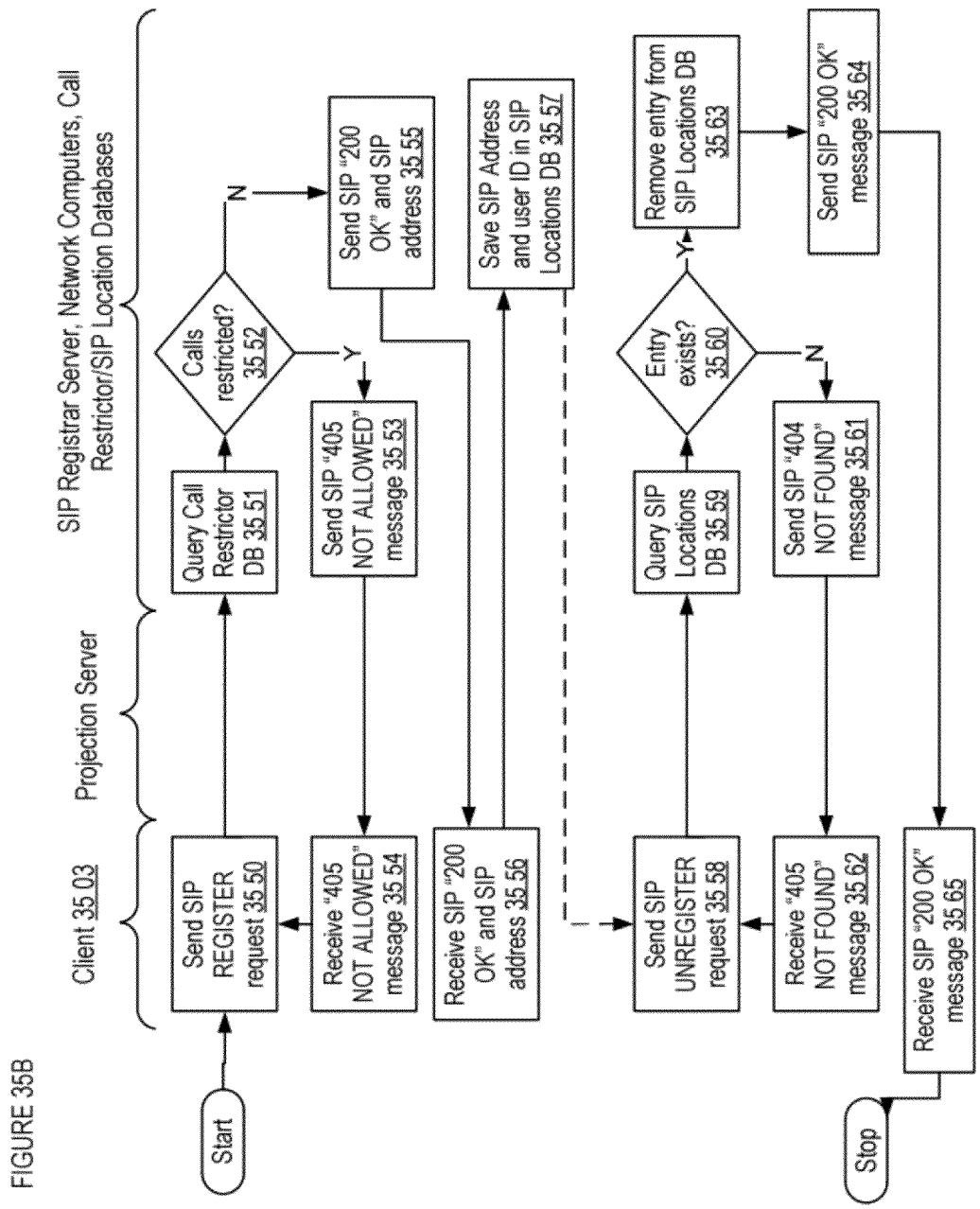
Figure 35D:
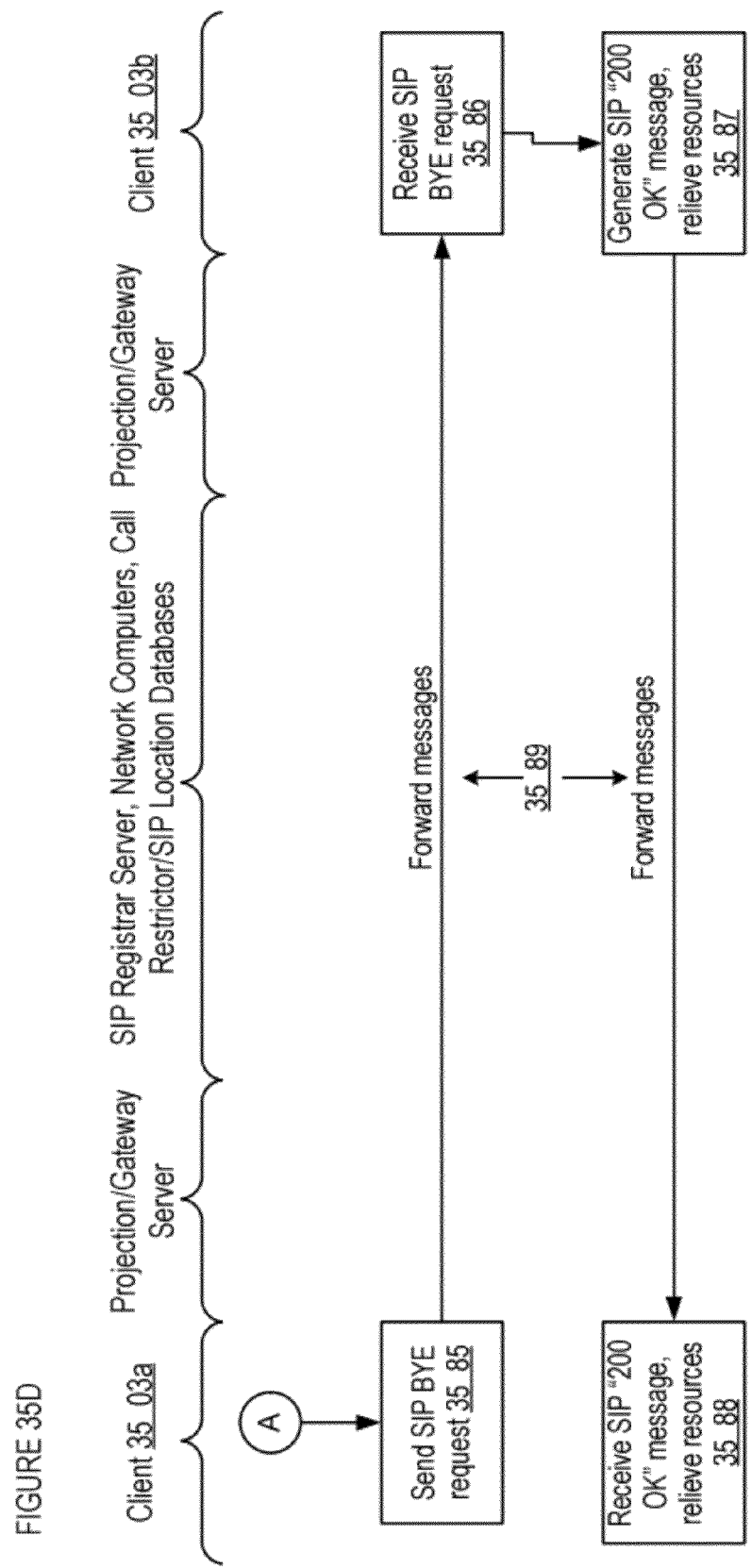
Figure 35E:
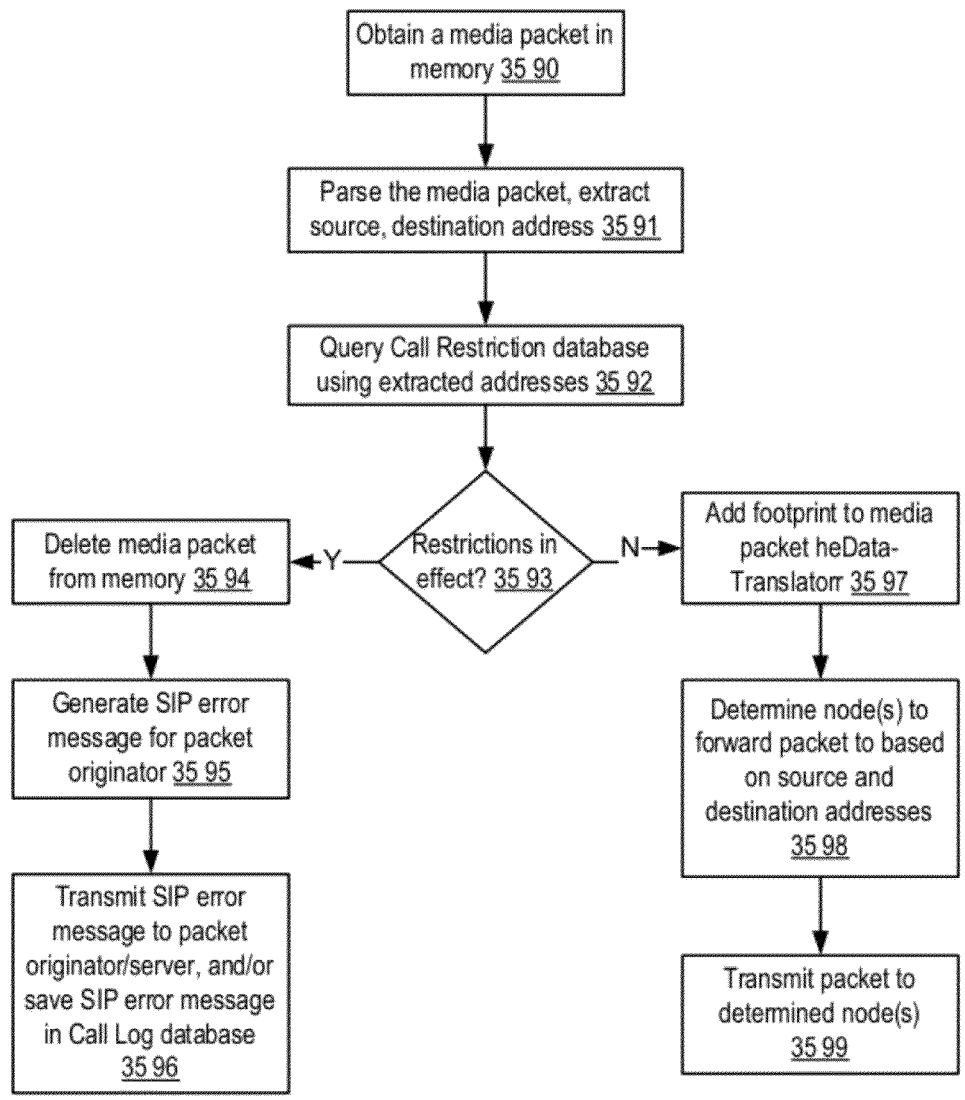
Figure 36E:
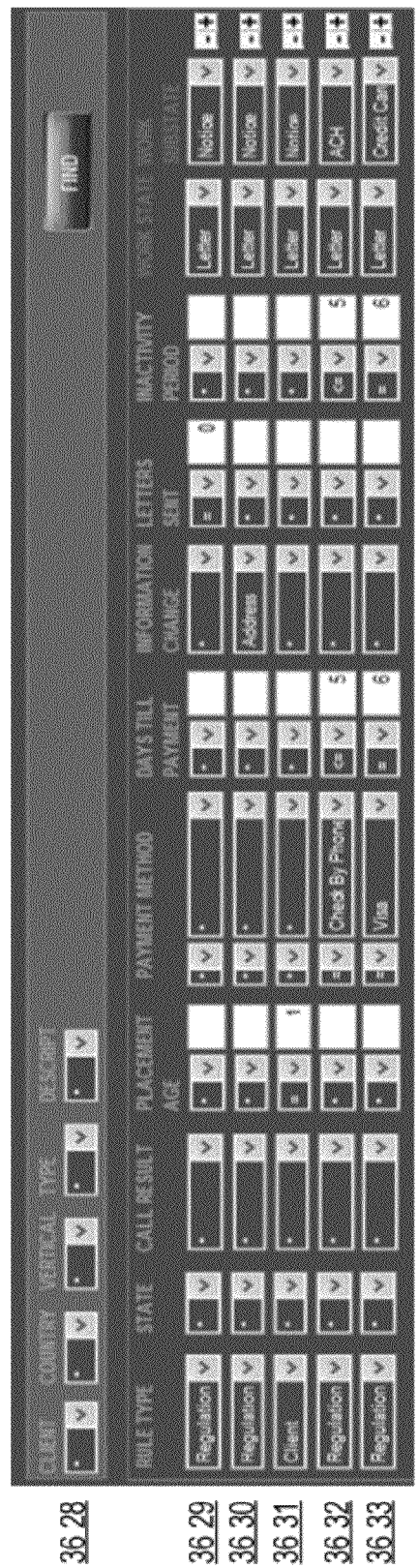

FIGS. 34A-B illustrate an implementation of data and logic flow among and between Data-Translator components and/or affiliated entities for setting up a client terminal to operate softphone applications in one embodiment of Data-Translator operation. In one implementation, the projection server 3415, the authentication control server 3445 and the data server 3440 may be housed in the call center 115 of FIG. 1. In an alternative implementation, the servers may be distributed network servers. In some implementations, the Golden Image 3455 supplied by the data servers 3440 may include one or more softphone applications for execution on the projection server 3415 and/or client terminals 3401 and/or data servers. In some implementations, a user 3403 of the client terminal 3405 may relay a network boot request 3410 to the projection server, which may, in response, provide elements 3420 of the Golden Image to facilitate booting the client and authenticating the user of the client terminal. Subsequent to user authentication 3425 via the projection server and/or authentication server 3435, the authentication server may query a database (e.g., the Call Restrictor database 3445) for records matching the user's profile to determine whether softphone applications should be provided to the user. In some implementations, the Data-Translator may determine that one or more softphone applications may be installed for execution on the client terminal, projection server and/or data server. Accordingly, the authentication server may provide an instruction 3450 to the projection server to provide the authorized softphone application files to the client terminal and/or install/execute one or more authorized softphone application files on the projection server and/or data server. In turn the projection server may provide virtualized executable softphone application files 3475, including one or more softphone applications, to the client terminal at which the user is logged in. In some implementations, installation procedures on the client terminal may be required prior to the user being able to operate the softphone applications.

In some implementations, the authentication and/or data server(s) 3401 may generate and/or update a golden image, application files, data tables and/or records, and/or the like 3410 and may pass the golden image and/or other updates to the projection server 3413, which receives them at 3422. A client terminal may be booted, such as on machine startup, to initiate a network (e.g., PXE) boot 3431, passing a boot request over the network, such as to the projection server 3404. The projection server 3404, in turn, may monitor and/or determine whether a boot request has been received 3428. If not, the projection server may wait for a period of time before checking again for a boot request 3425. Once the request is received, the projection server may pass files and/or data to the client terminal 3434. The client may start the boot process and begin to copy and unpack the materials provided from the projection server. Using the received files from the projection server that have now been executed/instantiated, a user at the client terminal may login and/or otherwise generate a user ID 3437. The generated user ID may then be passed to the authentication and/or data server(s) 3440, which may access user information and/or a user profile associated with the user ID 3443. Accessed user information may then be used to determine which applications to include in a tailored application package for that user 3446. In some implementations, the user-appropriate applications may include one or more softphone applications facilitating the placement and reception of telephone calls via the user's client terminal.

Once the appropriate package of applications is determined for the user, the authentication and/or data server(s) may pass an instruction message to the projection server 3449, the message comprising, in one implementation, specification of applications to be provided to the user. The projection server may receive the instruction and select a package of tailored application files to provide to the client terminal 3452. In one implementation, the projection server may select and provide to the client terminal 3455 a plurality of virtualized application executable files corresponding to selected applications, including the softphone applications. The client terminal may, in some implementations, perform any installation procedures 3458 necessary prior to execution of the softphone applications.

FIGS. 35A-E illustrate implementations of data and logic flow among and between Data-Translator components and/or affiliated entities for managing a telecommunications session between client terminal users and/or telephone users in an exemplary embodiment of Data-Translator operation. In some implementations, softphone/browser/network applications and hardware at the client terminal may operate via a communication network in conjunction with the facilities at the projection servers and the authentication and/or data servers to provide telecommunications services for the client. In some implementations, the various softphone facilities operatively connected to the communication network may, to ensure interoperability, operate in accordance with one or more communication protocols (e.g., Real-time Transport Protocol (RTP), Session Initiation Protocol (SIP), H.323 protocol suite, proprietary protocols such as Skype's peer-to-peer Internet telephony protocol and/or the like) to provide telephony services to the user logged in a client terminal. For purposes of illustration only, and not limitation, the various facilities providing telephony services to the user at the client terminal may be discussed in the implementations below as operating in a client-server model utilizing, among other protocols, the Session Initiation Protocol (SIP) for call signaling, and the Real-time Transport Protocol (RTP) for data packet formatting, over a Transmission Control Protocol/Internet Protocol (TCP/IP) computer network, and utilizing Transport Layer Security (TLS) cryptographic protocol, to provide secure Voice over IP (VoIP) services. However, it is to be understood that numerous other combinations of a variety of other operating models (peer-to-peer, ad-hoc and/or the like), utilizing a variety of other hardware resources and/or other communication protocols, to provide a variety of other communication services (e.g., internet connectivity, video, interactivity, teleconference, multi-cast, chat, etc.), are contemplated.

In some implementations, a user 1 (e.g., 3503a) logged in at a client terminal (e.g., 3505a) may be authorized to place/receive telephone calls, and may wish to place a call to a user 2 (e.g., 3503b, 3503c) logged into a second client terminal (e.g., 35005b) or a user 3 (e.g., 3503c) operating a standard telephone (e.g., 3505c) operatively connected to an external network (e.g., a circuit-switching public switched telephone network (PSTN) such as 3513). In such implementations, the client terminal 3505a may be provided, along with the virtualized softphone application files, an IP address of at least one SIP Registrar server in the network 3510 to which requests for telephony services may be placed. For example, the SIP Registrar servers 3520 may be a projection server and/or the data servers. The SIP Registrar servers may be operatively connected to a Call Restrictor database 3545 and a SIP Locator database 3518. In some implementations, after the softphone applications are installed on the client terminals, the client terminals may send requests to be registered for telephony services. For example, the client terminals may send a SIP REGISTER request 3550 with authentication credentials over the network to the server 3520 operating as one of the SIP Registrar servers within the context of providing telephony services. A non-limiting exemplary message format illustrating substantive aspects of providing a register request, written substantially in a form adapted to SIP is provided below:

REGISTER sips:server.softphone.com SIP/2.0
Via: SIP/2.0/TLS client.softphone.com:5061; branch=fv4i7pfw74gfz5
Max-Forwards: 70
From: Bob <sips:bob@client.softphone.com>; tag=kbew59fe3
To: Bob <sips: bob@client.softphone.com>
Call-ID:s3h8g7fynw9inm2b@softphone.com
CSeq: 1 REGISTER
Contact: <sips: bob@client.softphone.com>
Authorization: Digest username="bob", realm="secure.softphone.com",
nonce="89fcece786ab5632efd89210e7672f2a",
opaque=" ", uri=sips:ss2.softphone.com,
response="cbe5a259aa9c8elae688df84f1cec424"
Content-Length: 0

In some implementations, the SIP Registrar may check the authentication credentials of the user and acknowledge registration after authenticating the user. A non-limiting exemplary message format illustrating substantive aspects of the SIP Registrar acknowledging authentication of the user, written substantially in a form adapted to SIP is provided below:
SIP/2.0 200 OK
Via: SIP/2.0/TLS client.softphone.com:5061; branch=fv4i7pfw74gfz5; received=192.1.2.100
From: Bob <sips:bob@client.softphone.com>; tag=kbew59fe3
To: Bob <sips: bob@client.softphone.com>; tag=1738203819
Call-ID:s3h8g7fynw9inm2b@softphone.com
CSeq: 1 REGISTER
Contact: <sips: bob@client.softphone.com>
Content-Length: 0

In some implementations, once the users at the client terminals are authorized to receive softphone application files for installation, the projection and/or authentication/data servers providing the installation files may automatically send the REGISTER request to the SIP Registrar on behalf of the client terminals. The REGISTER request messages may comprise additional information, including, but not limited to, an indication of where the requests originated from (e.g., IP address of the client terminal or projection server, etc.), an IP address of the client terminal for which registration is requested, any Uniform Resource Locators (URLs) to associate with the client terminal (e.g., for click-to-talk applications), an e-mail address to associate with the client terminal, types of services requested (e.g., ability to only place calls, only receive calls, both place and receive calls, voicemail capability, direct-to-voicemail, call forwarding etc.), and an expiration time for the telephony service. For example, such information may be transmitted as an XML data in a body of a message. A non-limiting exemplary message illustrating substantive aspects of transmitting data between a client and/or server within the SIP messaging framework, written substantially in a form adapted to SIP/XML, is provided below:
PUBLISH sips:bob@client.softphone.com SIP/2.0
Via: SIP/2.0/TCP client.softphone.com:5061; branch=fv4i7pfw74gfz5
Max-Forwards: 70
From: Bob <sips:bob@client.softphone.com>; tag=kbew59fe3
To: Bob <sips: bob@client.softphone.com>
Call-ID:s3h8g7fynw9inm2b@softphone.com
CSeq: 1 PUBLISH
Expires: 36000
Content-Type: application/pidf+xml
Content-Length: 547
Message Body
   "<?xml version='1.0' encoding='UTF-8'?>\n"
   "<plain text domain>\n"
   "<client>\n"
     "<name>Bob Public</name>\n"
     "<userid>bob</userid>\n"
     "<ip>192.168.34.67</ip>\n"
     "<email>bob@client.softphone.com</email>\n"
     "<url>http://client.softphone.com/users/bob<url>\n"
   "<client>\n"
   "<services>\n"
     "<service_expiry>36000</service_expiry>\n"
     "<place_calls>TRUE</place_calls>\n"
     "<receive_calls>FALSE</receive_calls>\n"
     "<voicemail>TRUE_DIRECT</voicemail>\n"
     "<call_forwarding>\n"
     "<enabled>TRUE</enabled>\n"
     "<forwarding_address>547-823-1272<\forwarding address>\n"
     "</call_forwarding>\n"
   "</services>\n"

Numerous other methods specified in the SIP protocol may utilize a message structure similar to the examples described above for transferring instructions, acknowledgments, data and/or the like between one or more computing systems operatively connected via the communications network. In some implementations, a projection server sending the REGISTER request on behalf of the client terminal may query the SIP Location database (e.g., for client terminal IP address, URLs to associate with the client terminal) and the Call Restrictor database (e.g., for types of service allowed, expiration time) to determine appropriate values for the attributes of the REGISTER request. The SIP Registrar may receive the REGISTER request, and determine if it needs to perform a user permissions check. If, for example, based on the REGISTER request contents (e.g., whether the originating IP address is a projection server or a client terminal), the SIP Registrar determines that user permissions need to be checked for a given request, the SIP Registrar may query the Call Restrictor database 3551 to verify that the user is permitted to place/receive telephone calls. A non-limiting exemplary program listing illustrating substantive aspects of querying a Call Restrictor database, written substantially in the form of SQL commands, is provided below:
function UserPermissions($DBserver, $password, $userid) {mysql_connect("201.408.185.132",$DBserver,$password); //access database server mysql_select_db("CallRestrictor.rdb"); //select database to search
$query="SELECT place_calls receive_calls voicemail call_forwarding forwarding_address FROM RestrictionsTable WHERE userid LIKE '%' $userid; //create query for permissions of a user in the UserPermissions table with 'userid' as the search term
$result=mysql_query($query); //perform the search query
mysql_close("CallRestrictor.rdb"); //close database access
return $result; //return search result)
}

If the user is not permitted to use any telephony services (3552, option Y), the SIP Registrar may deny the request and may respond 3553 with a "405 (Not Allowed)" message 3554 to the originating IP address and/or client terminal. If the user is permitted to have at least one type of telephony service (3552, Option N)), the SIP Registrar may accept the REGISTER request (and e.g., provide a "200 OK" message 3555) for the client terminal, at 3556. The SIP Registrar may save/update 3557 the SIP Location database with the registration details (e.g., hardware type (client terminal/projection server/authentication server), IP address, SIP address, URLs, services permitted, time of request, time of registration, expiration etc.) for the client terminal. A non-limiting exemplary program listing illustrating substantive aspects of updating the a database with details for the client terminal, written substantially in the form of SQL commands, is provided below:
function UpdateUserDetails($DBserver, $password, $userid) {mysql_connect("201.408.185.132",$DBserver,$password); //access database server mysql_select_db("SIPLocation.rdb"); //select database to update UPDATE ClientsTable SET ip="192.168.34.67", email="bob@client.softphone.com", url="http://client.softphone.com/users/bob", service_expiry=36000, place_calls="TRUE", receive_calls="FALSE", voicemail=""TRUE_DIRECT", forwarding="TRUE", forwarding_address="547-823-1272"

WHERE userid=$userid; //update the required values for the specified user mysql_close("SIPLocation.rdb"); //close connection to database
return;
}

The SIP Registrar may also send 3555 a "200 (OK)" message to the originating IP address and/or client terminal to indicate that registration of the client terminal has been successfully performed, and may also list the terms of registration (e.g., SIP address, URLs, services permitted, time of request, time of registration, expiration etc.) in one or more header fields and/or message body in the "200 (OK)" message.

In some implementations, if the user wishes to unregister from the telephony services, the user may send a SIP UNREGISTER request 3558 to the SIP Registrar. The SIP Registrar may use the user details parsed from the SIP UNREGISTER request, and query the SIP Locations database 3559 using the user details. If a user entry corresponding to the user details is not found in the SIP Locations database 3560, the SIR Registrar may send a SIP "404 NOT FOUND" message 3561 to the user, as in 3562. If a user entry corresponding to the user details is found in the SIP Locations database 3560, the SIR Registrar may delete the entry 3563 from the SIP Locations database, and generate and send an acknowledgment SIP "200 OK" message 3564 to the user, as in 3565. In some implementations, if a user 1 (e.g., client 3503*a*) wishes to initiate a communication (e.g., place a telephone call to user 2 3503*b* or user 3 3503*c*) from the client terminal 3505*a*, the user 1 may operate the softphone application via the hardware resources at the client terminal 1 to send a SIP INVITE message request 3570 via a nearest projection server (e.g., 3515*a*) acting as a SIP Proxy server within the context of telephony services. The INVITE request may include the user 1 ID and/or display name, the SIP and/or IP address of the client terminal 3505*a*, a name of the user being invited to a telephone call (e.g., user 2 or user 3), the user 2/3's ID, a URL associated with the user 2/3, a standard telephone number of the user 2/3 being invited to a telephone call, and/or a format for transfer of audio data packets once the invitation has been accepted and a telephone session has been established (e.g., RTP protocol). A non-limited exemplary INVITE message illustrating exemplary aspects of providing an invitation to initiate communications, written substantially in a form adapted to SIP, is provided below:
INVITE sips:bob@client.softphone.com SIP/2.0
Via: SIP/2.0/TCP client.softphone.com:5061; branch=fv4i7pfw74gfz5
Max-Forwards: 70
From: Bob <sips:bob@client.softphone.com>; tag=kbew59fe3
To: Alice <sips:alice@client.softphone.com>
Call-ID:s3h8g7fynw9inm2b@softphone.com
CSeq: 1 INVITE
Contact: <sips:alice@client.softphone.com; transport=tcp>
Content-Type: application/sdp
Content-Length: 151
Message Body
v=0
o=alice 2856844739 2856844739 IN IP4 client.softphone.com
s=-
C=IN IP4 192.1.2.201
t=0 0
m=audio 49172 RTP/AVP 0
a=rtpmap:0 PCMU/8000

The SIP Proxy server (e.g., 3515*a*) may, on receiving the INVITE request, forward the request on to other SIP Proxy servers (e.g., servers within network 3510), which may in turn continue the forwarding process until the INVITE request is received at the SIP Registrar. The SIP Registrar, upon receiving the INVITE request, may parse the INVITE request to determine the particulars of the request being made. For example, the SIP Registrar may utilize XML parser methods built in to the PHP scripting language and/or most modern web browsers. The SIP Registrar may also query the Call Restrictor database 3571 to determine whether any restrictions are applicable to the INVITE request made by the user 1 at client terminal 1. The restrictions may relate to the permitted services for either user 1 and/or user 2/3. Upon receiving the results of the query to the Call Restrictor database, the SIP Registrar may compare the attributes 3572 of the INVITE request to the results of the query to the Call Restrictor database. For example, in some implementations, the SIP Registrar may execute a server-side hypertext preprocessor (PHP) script interfacing with a database using SQL commands to compare the attributes of the INVITE request to the results of the query to the Call Restrictor database. A non-limiting exemplary program listing illustrating substantive aspects of implementing such functionality, written substantially in the form of PHP/SQL commands, is provided below:
//User1 INVITES user2 to a telecommunication; Parse XML file including INVITE request message body
$file="invite_message_body.xml";
$xml_parser=xml_parser_create( )
xml_set_element_handler($xml_parser,"startTag","endTag");
xml_set_character_data_handler($xml_parser,"contents");
$fp=fopen($file,"r");
$data=fread($fp, 80000);
xml_parser_free($xml_parser);
fclose($fp);
//Assign parsed values to variables
$user1=data(1);
$user2=data(2);
receive_calls=data(2);
voicemail=data(3);
call_forwarding=data(4);
forwarding_address=data(5);
//Determine if INVITE is permissible (e.g., whether call may be placed) by querying the Call Restrictor database
mysql_connect("201.408.185.132",$DBserver,$password);
//access database server mysql_select_db("CallRestrictor.rdb"); //select database to search
//Check if user1 is allowed to request such a call
$query="SELECT place_calls FROM RestrictionsTable WHERE user1_id LIKE '%' $user1 AND user2_id LIKE '%' $user2; //create query for whether user1 can call user2
$result1=mysql_query($query); //perform the search query
mysql_close("CallRestrictor.rdb"); //close database access
//Check if user2 is allowed to receive such a call
$query="SELECT receive_calls FROM RestrictionsTable WHERE user1_id LIKE '%' $user2 AND user2_id LIKE '%' $user1; //create query for whether user2 can receive a call from user2
$result2=mysql_query($query); //perform the search query
mysql_close("CallRestrictor.rdb"); //close database access
$permit=$result1*$result2; //determine if both permissions are TRUE
return $permit; //return permission value If the SIP Registrar determines 3573 that either of user 1 and/or user 2/3 is not authorized for the services requested in the INVITE request, the SIP Registrar may return 3574 to the client terminal a "405 Method Not Allowed" message 3575, and, in some implementations, along with a list of allowed actions for user 1 and/or user 2/3 included in an <allowed_actions> tag in the message body. The SIP Registrar may also save the details of the received INVITE request to a Call Log database. The "405 Method Not Allowed" message may be routed back to user 1's client terminal via the SIP proxy servers in the network. If, however, the SIP Registrar determines that the INVITE request is within the bounds of permitted services for the client terminal, the SIP Registrar may continue processing by querying the SIP Locator database 3576 to determine the SIP address to route the INVITE request to. Upon receiving the INVITE request, the SIP Registrar may query the SIP Locator database for an IP or SIP address of the user 2/3 based on the information provided in the INVITE request. The SIP Registrar may, barring call restrictions, forward 3577 the INVITE request to the appropriate destination (e.g., IP and/or SIP address) according to the results of the query to the SIP Locator database. If the destination lies within the TCP/IP network (e.g., such as when calling user 2), the INVITE request may be routed via the projection servers, authentication/data servers, routers, and/or other hardware elements (acting as SIP Proxy servers) operatively connected to the TCP/IP network until the INVITE request is received at a user 2 client terminal (e.g., 2 3503*b*). The user 2 client terminal may, in response to the received INVITE request 3578, send back to client terminal a SIP "180 (Ringing)" message 3579, and initiate an action to attract the other user 3503*b*'s attention via the hardware resources available at the other user's client terminal (e.g., on-screen incoming call display via a monitor installed at the other user's client terminal, and/or ringing tone via music speakers and/or headphones installed at the other user's client terminal). However, if the destination lies outside the TCP/IP network (e.g., such as user 3 using a standard telephone 3505*c* operatively connected to an external public switched telephone network (PSTN) 3513), the INVITE request may be routed to a computer and/or other device in the network acting as a Gateway server 3535 (e.g., Cisco high-speed serial interface (HSSI)). In such an example, the Gateway server may present a packet-switched interface towards the TCP/IP network 3510 and a circuit switched interface to the PSTN network 3513. The INVITE request may be converted into the appropriate dial tones according to the operating protocols of the external network 3513, and an appropriate ring tone may be initiated at the standard telephone 3505*c* of the other user. For example, if invited user 2 accepts the INVITE request, the terminal client 3503*b* may send back a SIP "180 (RINGING)" message via the packet-switched network 3510 to user 1 indicate to acceptance of the invitation request. If, for example, invited user 3 picks up the standard telephone 3503*c*, a circuit path may be established via PSTN network 3513 between the telephone 3505*c* and the circuit switched interface of the gateway server 3535. The Gateway server then may generate a SIP "180 (RINGING)" message on behalf of the telephone 3503*c*, and transmit this message via the Gateway server's packet-switched interface and the packet-switched network 3510 back to client terminal 3503*a*. Accordingly, a telephone media transfer session may be established between the two parties of the telephone call across multiple networks of various types, regardless of the locations of the two parties. Upon receiving the SIP "180 (RINGING)" message, the servers in the system may forward 358*o* the message until it is received at the client originating the INVITE request, establishing the communications media transfer session. Once the media transfer session has been established between the participants in the session (e.g., telephone call between user 1 and user 2 3503*b*), the participants may generate media (e.g., audio only, video only, audio-video, dynamic content and/or the like) packets 3581 using the hardware resources operatively connected to the respective thin client terminals and the installed softphone applications. The media packets may be exchanged between the participants. In some implementations, the media packets may be transferred from one client terminal to the other in an asynchronous fashion (e.g., using UDP, RTP communication protocols). For example, each media packet may traverse a different route from source to destination client terminal within the packet switched network, and the media packets may be received at the receiver of the media packets in an order which may not match the order in which the media packets were generated and/or transmitted. Further, the media packets may traverse a route different from the SIP signaling messages controlling the telephone session. The media packets may be formatted in accordance with a protocol agreed upon based on the protocol specified in the initial INVITE request. For example, the exemplary INVITE message provided above illustrating exemplary aspects of providing an invitation to initiate communications specifies that audio packets may be transmitted in accordance with the RTP protocol. In some implementations, the media packets may be formatted in accordance with the Real-time Transport Protocol (RTP). Each RTP media packet may include one or more header fields and a payload. The media packet header fields may include information including a payload type (e.g., audio only, video only, audio-video, dynamic payload etc.), a sequence number providing guidance to a receiver of the media packets as to an order in which the media packets may be arranged (e.g., 3583*a-b*) in order to recreate the original transmitted signal (e.g., 3584*a-b*) and/or identify missing media packets at the receiver, a timestamp indicating a time at which the media packet was generated, which may, in conjunction with the timestamps of other media packets and the sequence, indicate to the receiver of the media packets a sampling rate of the media stream, and jitter and/or delay in transmission, a source identifier identifying an IP and/or SIP address of the source of the media packet, and a destination identifier identifying an IP and/or SIP address of the intended final destination of the media packet. In some implementations, a participant (e.g., user 1 3503*a*) in a telephony session with user 2/3 may wish to terminate the session. The user 1's client terminal 3505*a* may send a SIP "BYE" request 3585 to the client terminal 3505*b* and/or the Gateway server 3535. If the client terminal 3505*b* encounters 3586 the "BYE" message, the client terminal 3505*b* considers the session with client terminal 3503*a* terminated, and may generate and send 3587 a SIP "200 (OK)", "481 Call/Transaction Does Not Exist," a "408 (Request Timeout)" message, or provide no response. If the client terminal 3503*a* initiates a "BYE" message directed at the telephone 3505*c*, the "BYE" message may be sent to the Gateway server 3535. The Gateway server may convert the message into an appropriate set of tones for the circuit switched network, and may transmit the tones via the PSTN network to the telephone 3505*c* indicating that user 3503*c* has terminated the communication session. Upon receiving acknowledgment from the other client that the session has terminated, the clients may delete any data structures stored in memory related to the session and relieve any other hardware and/or software resources previously being utilized in the communication session for use in other applications.

In an exemplary embodiment, user 1 may be transmitting media packets for delivery to user 2. The media packets may be routed via multiple paths (e.g., 3582*a-d*) within the packet switched network 3510. In some implementations, each node (e.g., a projection server, data server, router system client terminal, etc.) in a route traversed by a media packet may process the media packet for routing and/or call restriction and/or other purposes. For example, a media packet may be routed via projection server 3515*a*. Projection server 3515*a* may receive the media packet, and extract information from the header of the media packet. In some implementations, the projection server may extract information regarding destination identifier identifying an IP and/or SIP address of the intended final destination of the media packet. Based on the destination identifier information, the projection server may determine the most appropriate next node to transmit the media packet to (e.g., based on a Domain Name System service), and initiate transfer of the media packet.

In some implementations, each node in a route may perform similar operations to determine the best next node to transmit the media packet to. In some implementations, each node in a transmission route, including the client terminals, may extract 3591 from a media packet generated by/transmitted to it 3590, header information, including but not limited to, a source identifier identifying an IP and/or SIP address of the source of the media packet, and a destination identifier identifying an IP and/or SIP address of the intended final destination of the media packet. For example, a node may utilize the freeware open-source FFmpeg cross-platform solution, to parse RTP packets and extract, for example, file header information and media data included in the RTP packets being transmitted as part of a telecommunications session. Upon obtaining the source and destination addresses for the media packet, the node may query the Call Restrictor database 3592 using the information extracted from the packet. The node may analyze 3593 the results of the query to the Call Restrictor database to determine if any call restriction rules are present which may restrict transmission of the media packet from the source identified by the source identifier to the destination identified by the destination identifier.

If the node determines that one or more rules may require prevention of transmission of packets from the source to the destination (e.g., 3593, option Y), the node may discard 3594 the media packet from memory, generate 3595 and send 3596 a SIP "403 Forbidden" message to the previous node in the route and/or the originating IP/SIP address of the media packet to indicate that the transmission may not take place according to one or more rules present in the Call Restrictor database.

If the node determines that no restrictions are in effect preventing transmission of packets from the source to the destination (e.g., 3593, option N), the node may add information to the header of the media packet 3597 to indicate the route taken by the packet, decrement the maximum number of allowable hops required to reach the intended destination, include a timestamp for retransmission, include the results of the analysis the node performed on the packet in taking the decision to transmit the packet forward towards its destination, and/or the like. The node may use the source and destination addresses, Domain Name System addressing, and transmission models such as unicasting, broadcasting and/or multicasting to determine the next node(s) to transmit the updated media packet to 3598. Upon determining the nodes to transmit the media packet to, the node may generate the necessary transmissions 3599.

In some implementations, each node of a packet switched network may perform such processing to quickly extinguish any media packets in circulation occupying transmission bandwidth within the network 3510 which may not be authorized for transmission to their respective final destinations. In some implementations, the Call Restrictor database may be updated such that one or more ongoing transmissions and/or sessions may become unauthorized, while still in progress, on the basis of the update to the rules in the Call Restrictor database. In such implementations, each node processing media packets for compliance with call restriction rules may receive results to querying the Call Restrictor database that reflect the latest updates to the rules present in the Call Restrictor database in real-time. Accordingly, in some implementations, updates to call restriction rules present in the Call Restrictor database may be implemented dynamically within the entire packet switched network 3510 in real-time, and may be advantageously applied not only to new communications invitations, but also to existing on-going conversations and/or other media/data exchanges.

In some implementations, call restriction processing may advantageously be concentrated at specific nodes where collection and reordering of all media packets related to a telephone session are implemented. For example, in some implementations, media packets transmitted by client terminal 3505*a* intended for delivery to client terminal 3505*b* may first be aggregated at a projection server nearest the destination terminal client 3505*b* (e.g., projection server 3515*b*) and/or the source/destination client terminals themselves. The processing node may aggregate the media packets related to such transmission and process the media packets to reorder them according to the sequence numbers provided in the header fields of each of the media packets prior to transmission to the client terminal 3505*b*. For example, in some implementations, a node may utilize the freeware open-source FFmpeg cross-platform multimedia handling solution to reorder packets according to a decoding time stamp (DTS) and/or a presentation time stamp (PTS) associated with each of the packets. For example, the node may aggregate a number of media packets being transmitted in one direction as part of a telecommunications session. The node may assign a temporary identifier for each packet. The node may then extract the DTS and PTS associated with each of the packets, e.g., using the FFmpeg application. The node may associate each extracted DTS and/or PTS with the temporary identifier for the packets. The node may arrange the temporary identifiers of the packets, e.g. according to an increasing order of PTS, in order to arrange the media packets according to the order of presentation required by the generator of the media packets. The processing node may extract information from the media packets as a batch identifying, for example, an IP and/or SIP address of the source of the media packet, and the destination identifier identifying an IP and/or SIP address of the intended final destination of the media packet.

The processing node may query the Call Restrictor database using the information extracted from the aggregated media packets. The node may analyze the results of the query to the Call Restrictor database to determine if any call restriction rules are present which may restrict transmission of the media packets from the source identified by the source identifier to the destination identified by the destination identifier. If the projection server determines that one or more rules may require prevention of transmission of packets from the source to the destination, the node may discard the entire set of aggregated media packets and send a SIP "403 Forbidden" message lieu of all the aggregated packets to the previous node in the route and/or the originating IP/SIP address of the media packets to indicate that the transmission may not take place according to one or more rules present in the Call Restrictor database.

Accordingly, in some implementations, call restrictions rules present in the Call Restriction database may be implemented throughout the entire packet switched network with a minimal number of high-performance server systems, and a minimal number of servers requiring access to the Call Restrictor database. Also, in some implementations utilizing concentrated processing of call restriction rules, updates to call restriction rules present in the Call Restrictor database may be implemented within the entire packet switched network 3510 within a time period approaching an average packet transmission time between the most distant terminal clients within the packet switched network, and may be advantageously applied not only to new telephone conversation invitations, but also to existing on-going conversations and/or other media/data exchanges.

The attributes of the Call Restrictor database and a user interface system for entry of call restriction rules into the Call Restrictor database in one embodiment of Data-Translator operation are described hereinafter in greater detail with reference to FIGS. 36A-D. In some implementations, the Call Restrictor database stored a number of rules according to which restriction of calls is implemented. The rules may embed within themselves legal, regulatory, corporate etc. rule compliance, and provide technological solutions to management compliance problems. The rules may regulate various softphone functionalities, including telemarketing, collections, reminders, robocalling etc. The rules in the Call Restrictor database may be structured to affect a limited subset of softphone terminals, applications and/or users, or may be structured to affect a broad spectrum of entities, via a single effective syntax and operating structure. For example, with reference to FIG. 36A, the rule prescribed in 3601 may apply to any client operating within the United States of America, who has a Business Type beginning with the letter 'F'. In another example, using a rule structure that is substantially similar to the previous example, the rule prescribed in 3602 may narrowly only affect a specific subset of entities within a client (e.g., "DTV"), wherein those entities operate in only one country (e.g., "US"), wherein the entities have a "FE" Business Type and a "FC" vertical business integration parameter, and a description "XX." Accordingly, the descriptive business grammar of the present invention may provide a flexible and powerful rules defining and implementation platform for call restriction.

With further reference to FIG. 36B, an exemplary rule 3603 may include a number of fields. In some implementations, the fields may be varied mutually exclusive to each other; in alternate implementations, these selections of values for one field may affect the values that may be chosen for other fields in the rule. In some implementations, the fields may provide a method to specify a rule level (e.g., a priority level, a classification type, etc.) of the rule, a plurality of conditions that are required to be satisfied in order for the rule to be in effect, and a plurality of results that may be the outcome of implementation of the specified rule. For example, the exemplary rule 3603 may be interpreted, in some implementations, as: "For the regulatory rule 3603, if any account holder residing in the state of MA has been called greater than two times in a period spanning the last 7 days on his/her home phone, regardless of the call result, and/or when the last letter was sent to him/her, and/or the result of sending any letter, calls may not be made to that account." A non-limiting exemplary data structure illustrating substantive aspects of specifying rules as described above, written substantially in the form of XML, is provided below:

```
<?xml version="1.0" encoding="UTF-8"?>
<rule_type>regulation</rule_type>
<conditions>
  <state>MA</state>
  <phone_type>home</phone_type>
  <period_unit>day</period_unit>
  <period_amount>7</period_amount>
  <operator>GREATER</operator>
  <number>2</number>
  <call_result>NIL</call_result>
  <last_letter_sent>FALSE</last_letter_sent>
  <last_letter_days>NIL</last_letter_days>
</conditions>

<type>account</type>
  <restriction>No Call</restriction>

```

In some implementations, a server side PHP script may be implemented on a Data-Translator server to read in an XML data file including such a rule, parse the XML data file to determine the rule fields and associated values, and generate SQL commands to insert the rule from the XML data file into a rules database such as, for example, a Call Restrictor database. The rule 3603 may be designated, in the exemplary implementation, as a regulatory rule. In some implementations, a plurality of business rules of varying scope and effect may pertain to a specific account. The rules, in such implementations, may be prioritized according to, for example, the rule level. In some exemplary implementations, the regulatory rules may take precedence over rules created to reflect client instructions, which in turn may take precedence over rules created in order to reflect best internal business practices. In alternate implementations, the rule level may determine which rules are implemented and/or the order in which such rules are implemented.

Rules may be implemented that depend on other numerous factors than the originator of the rule, and properties of the account affected by the rule. For example, rules may be implemented that are time sensitive. For example, FIG. 36C specifies five exemplary illustrative rules that are applicable to all clients, countries, vertical/non-vertical businesses, types and descriptions (e.g., per 3607) based on the time at which the rules are evaluated for enforcement. For example, rule 3608 may be interpreted in some implementations as: "A regulatory rule that states that accounts in the state of PA may not be messaged prior to 1:30 pm on Sundays." As another example, rule 3609 may be interpreted in some implementations as: "A regulatory rule that states that accounts in the state of TX may not be messaged prior to 9:00 am on Saturdays." As another example, rule 3610 may be interpreted in some implementations as: "A client instruction to restrict messaging of accounts in the state of TX prior to 12:00 pm on all Sundays." As another example, rule 3611 may be interpreted in some implementations as: "A regulatory rule that states that accounts in any message may not be called at any time on Sundays." As another example, rule 3612 may be interpreted in some implementations as: "A regulatory rule that states that accounts in the state of OK may not be messaged prior to 9:00 am on any day."

Rules may be advantageously developed that depend further on frequency/intensity of prior activities. For example, FIG. 36D may illustrate exemplary rules 3614-3627 as being applicable to all accounts (e.g., per 3613). As one example, rule 3614 may be interpreted in one implementation as: "A regulatory rule that states that no action need be taken for accounts in the state of NH where a work phone has been called more than once within the last 30 days, regardless of the call result, date the last letter was sent, or the result of sending the letter." As another example, rule 3615 may be interpreted in one implementation as: "A regulatory rule that states that no calls may be placed to accounts in the area of NYC where any phone has been called more than 2 times within the last 7 days, regardless of the call result(s), date the last letter was sent, or the result of sending the letter." As another example, rule 3616 may be interpreted in one implementation as: "A regulatory rule that states that no calls may be placed to accounts in the area of OR where a work phone has been called more than 1 time within the last 7 days, regardless of the call result(s), date the last letter was sent, or the result of sending the letter." Further, rule 3617, for example, may be interpreted in some implementations as: "A regulatory rule that prohibits calling accounts in WA state if the work phone has been called more than once over the past seven days." As another example, rule 3618 may be interpreted in one implementation as: "A regulatory rule that states that no calls may be placed to accounts in the area of ME where any phone has been called more than 1 time within the last 1 day, regardless of the call result(s), date the last letter was sent, or the result of sending the letter." As another example, rule 3619 may be interpreted in one implementation as: "A regulatory rule that states that no calls may be placed to accounts in the area of WA where any phone has been called more than 3 times within the last 7 days, regardless of the call result(s), date the last letter was sent, or the result of sending the letter." As another example, rule 3620 may be interpreted in one implementation as: "An internal rule that states that no calls may be placed to accounts in any area where a cell phone has been called any number of times within any prior period, regardless of the call result(s), date the last letter was sent, or the result of sending the letter." As another example, rule 3621 may be interpreted in one implementation as: "An internal rule that states that no calls may be placed to accounts in any area where any phone has been called more than or equal to 3 times within the last 7 days, regardless of the call result(s), date the last letter was sent, or the result of sending the letter." As another example, rule 3622 may be interpreted in one implementation as: "A regulatory rule that states that no work may be performed for accounts in the area of AZ where a home phone has been called less than or equal to 3 times during any prior period, regardless of the call result(s), date the last letter was sent, or the result of sending the letter." As another example, rule 3623 may be interpreted in one implementation as: "A regulatory rule that states that no work may be performed for accounts in the area of AZ where a home phone has been called greater than 3 times during any prior period, resulting in an RPC call result(s), regardless of the date the last letter was sent, or the result of sending the letter." As another example, rule 3624 may be interpreted in one implementation as: "A regulatory rule that states that no work may be performed for accounts in the area of AZ where a home phone has been called greater than 3 times during any prior period, resulting in an Message call result(s), regardless of the date the last letter was sent, or the result of sending the letter." As another example, rule 3625 may be interpreted in one implementation as: "A regulatory rule that states that no work may be performed for accounts in the area of AZ where a home phone has been called greater than 3 times during any prior period, resulting in an Third Party call result(s), regardless of the date the last letter was sent, or the result of sending the letter." As another example, rule 3626 may be interpreted in one implementation as: "A regulatory rule that states that no work may be performed for accounts in the area of NH where a home phone has been called any number of times during any prior period, resulting in an RPC call result(s), regardless of the date the last letter was sent, or the result of sending the letter." As another example, rule 3627 may be interpreted in one implementation as: "A regulatory rule that states that no work may be performed for accounts in the area of NH where a home phone has been called any number of times during any prior period, resulting in a Message call result(s), regardless of the date the last letter was sent, or the result of sending the letter."

Further rules may be advantageously developed that result in the performance of additional activities. For example, FIG. 36D may illustrate exemplary rules 3629-3633 as being applicable to all accounts (e.g., per 3628) and resulting in electronic/postal letters being sent. As one example, rule 3629 may be interpreted in one implementation as: "A regulatory rule that states that a notice letter be sent for accounts in any area where no letters have been sent." Another example, rule 3630 may be interpreted in one implementation as: "A regulatory rule that states that a notice letter be sent for accounts in any area where address information has been changed." Another example, rule 3631 may be interpreted in one implementation as: "A client rule that states that a notice letter be sent for accounts in any area where the placement age equals 1." Another example, rule 3632 may be interpreted in one implementation as: "A regulatory rule that states that a ACH letter be sent for accounts in any area where payment by check by phone is required in less than or equal to 5 days and the inactivity period is less than or equal to 5 days." Another example, rule 3633 may be interpreted in one implementation as: "A regulatory rule that states that a Credit Card letter be sent for accounts in any area where payment by visa is required in 6 days and the inactivity period is 6 days."

Numerous other variations of rules depending from a variety of legal, regulatory, client-driven, internal best practices, business, time, and/or other factors, modifying the permissions for transmission of media packets between the various entities involved in the Data-Translator are contemplated.

In some implementations, media packets may be exchanged bi-directionally between two client terminals via nodes in the communications network simultaneously in real-time. In such implementations, the direction of transmission of media packets may be determined by extracting from the media packet header fields information regarding the source identified by the source identifier and the destination identified by the destination identifier. Accordingly, in some implementations, media packets traveling in each direction may be analyzed independently of the media packets traveling in the opposite direction. In some implementations, media packets traveling in one direction may be aggregated at a concentrating node server and/or client terminal, and reordered according to the sequence numbers provided in the header fields of each of the media packets. Call analytics may be performed on the media contents of the aggregated and reordered media packets. Accordingly, in some implementations, call analytics on media transmitted from one client terminal to another may be advantageously performed independent of any transmission in the opposite direction, and/or any other transmission between any other nodes and/or terminals occurring simultaneously within a packet switched network.

Data-Translator Controller

Figure 37:
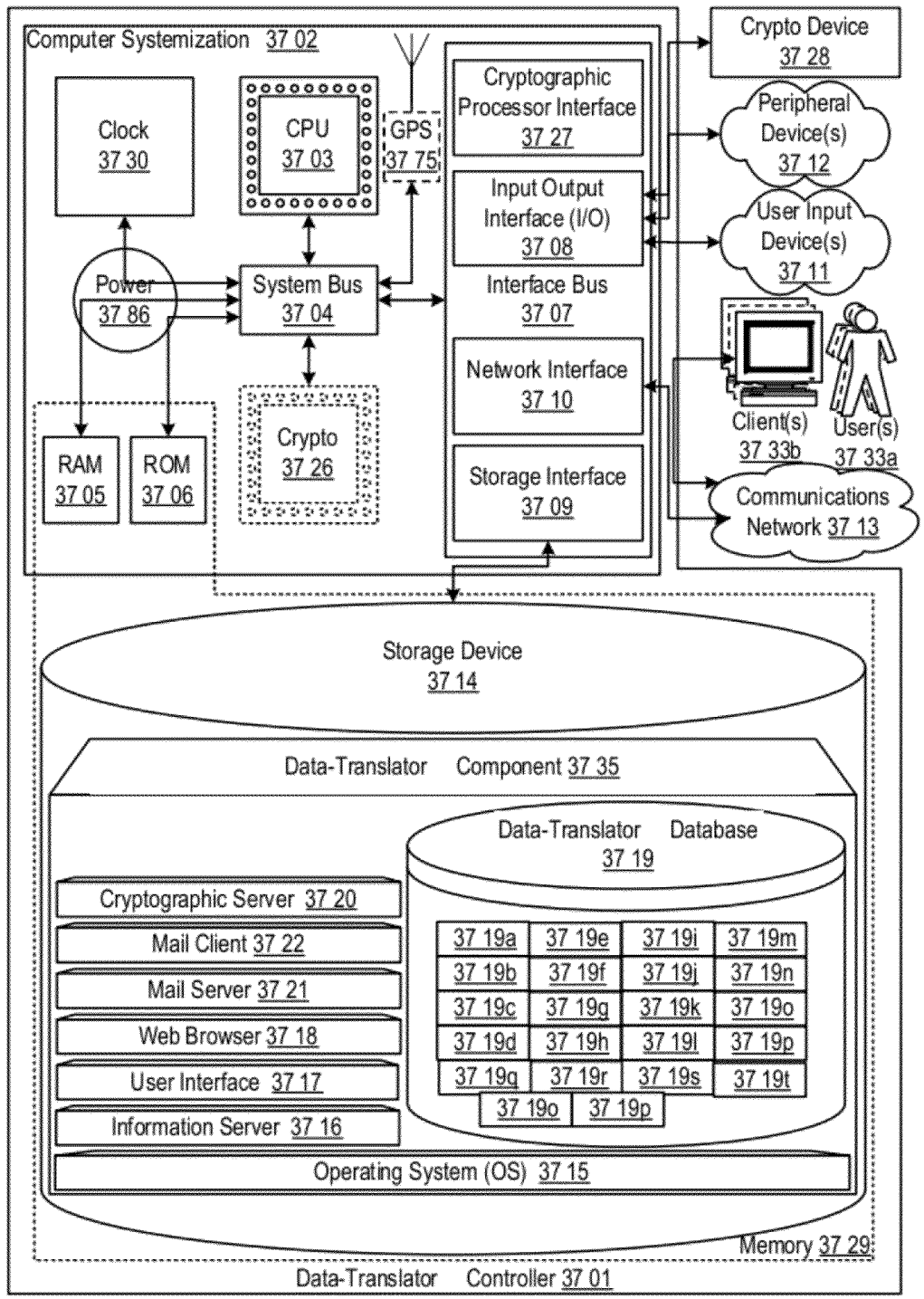
FIG. 37 is of a block diagram illustrating embodiments of the Data-Translator controller.

FIG. 37 illustrates inventive aspects of a Data-Translator controller 3701 in a block diagram. In this embodiment, the Data-Translator controller 3701 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 3703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Data-Translator controller 3701 may be connected to and/or communicate with entities such as, but not limited to: one or more users from user input devices 3711; peripheral devices 3712; an optional cryptographic processor device 3728; and/or a communications network 3713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Data-Translator controller 3701 may be based on computer systems that may comprise, but are not limited to, components such as: a computer systemization 3702 connected to memory 3729.

Computer Systemization

A computer systemization 3702 may comprise a clock 3730, central processing unit ("CPU(s)" and/or "processor(s)" (these terms are used interchangeable throughout the disclosure unless noted to the contrary)) 3703, a memory 3729 (e.g., a read only memory (ROM) 3706, a random access memory (RAM) 3705, etc.), and/or an interface bus 3707, and most frequently, although not necessarily, are all interconnected and/or communicating through a system bus 3704 on one or more (mother)board(s) 3702 having conductive and/or otherwise transportive circuit pathways through which instructions (e.g., binary encoded signals) may travel to effect communications, operations, storage, etc. Optionally, the computer systemization may be connected to an internal power source 3786. Optionally, a cryptographic processor 3726 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Data-Translator controller and beyond through various interfaces. Should processing requirements dictate a greater amount speed and/or capacity, distributed processors (e.g., Distributed Data-Translator), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the Data-Translator may be achieved by implementing a microcontroller such as CAST's R8051XC2 microcontroller; Intel's MCS 51 (i.e., 8051 microcontroller); and/or the like. Also, to implement certain features of the Data-Translator, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Data-Translator component collection (distributed or otherwise) and/or features may be implemented via the microprocessor and/or via embedded components; e.g., via ASIC, coprocessor, DSP, FPGA, and/or the like. Alternately, some implementations of the Data-Translator may be implemented with embedded components that are configured and used to achieve a variety of features or signal processing.

Depending on the particular implementation, the embedded components may include software solutions, hardware solutions, and/or some combination of both hardware/software solutions. For example, Data-Translator features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Data-Translator features. A hierarchy of programmable interconnects allow logic blocks to be interconnected as needed by the Data-Translator system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the Data-Translator may be developed on regular FPGAs and then migrated into a fixed version that more resembles ASIC implementations. Alternate or coordinating implementations may migrate Data-Translator controller features to a final ASIC instead of or in addition to FPGAs. Depending on the implementation all of the aforementioned embedded components and microprocessors may be considered the "CPU" and/or "processor" for the Data-Translator.

Power Source

The power source 3786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3786 is connected to at least one of the interconnected subsequent components of the Data-Translator thereby providing an electric current to all subsequent components. In one example, the power source 3786 is connected to the system bus component 3704. In an alternative embodiment, an outside power source 3786 is provided through a connection across the I/O 3708 interface. For example, a USB and/or IEEE 1394 connection carries both data and power across the connection and is therefore a suitable source of power.

Interface Adapters

Interface bus(ses) 3707 may accept, connect, and/or communicate to a number of interface adapters, conventionally although not necessarily in the form of adapter cards, such as but not limited to: input output interfaces (I/O) 3708, storage interfaces 3709, network interfaces 3710, and/or the like. Optionally, cryptographic processor interfaces 3727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3709 may accept, communicate, and/or connect to a number of storage devices such as, but not limited to: storage devices 3714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3710 may accept, communicate, and/or connect to a communications network 3713. Through a communications network 3713, the Data-Translator controller is accessible through remote clients 3733b (e.g., computers with web browsers) by users 3733a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Data-Translator), architectures may similarly be employed to pool, load balance, and/or otherwise increase the communicative bandwidth required by the Data-Translator controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3710 may be used to engage with various communications network types 3713. For example, multiple network interfaces may be employed to allow for the communication over broadcast, multicast, and/or unicast networks.

Input Output interfaces (I/O) 3708 may accept, communicate, and/or connect to user input devices 3711, peripheral devices 3712, cryptographic processor devices 3728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 3711 may be card readers, dongles, finger print readers, gloves, graphics tablets, joysticks, keyboards, mouse (mice), remote controls, retina readers, trackballs, trackpads, and/or the like.

Peripheral devices 3712 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Data-Translator controller may be embodied as an embedded, dedicated, and/or monitor-less (i.e., headless) device, wherein access would be provided over a network interface connection.

Cryptographic units such as, but not limited to, microcontrollers, processors 3726, interfaces 3727, and/or devices 3728 may be attached, and/or communicate with the Data-Translator controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 3729. However, memory is a fungible technology and resource, thus, any number of memory embodiments may be employed in lieu of or in concert with one another. It is to be understood that the Data-Translator controller and/or a computer systemization may employ various forms of memory 3729. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 3729 will include ROM 3706, RAM 3705, and a storage device 3714. A storage device 3714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 3729 may contain a collection of program and/or database components and/or data such as, but not limited to: operating system component(s) 3715 (operating system); information server component(s) 3716 (information server); user interface component(s) 3717 (user interface); Web browser component(s) 3718 (Web browser); database(s) 3719; mail server component(s) 3721; mail client component(s) 3722; cryptographic server component(s) 3720 (cryptographic server); the Data-Translator component(s) 3735; and/or the like (i.e., collectively a component collection). These components may be stored and accessed from the storage devices and/or from storage devices accessible through an interface bus. Although non-conventional program components such as those in the component collection, typically, are stored in a local storage device 3714, they may also be loaded and/or stored in memory such as: peripheral devices, RAM, remote storage facilities through a communications network, ROM, various forms of memory, and/or the like.

Operating System

The operating system component 3715 is an executable program component facilitating the operation of the Data-Translator controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Data-Translator controller to communicate with other entities through a communications network 3713. Various communication protocols may be used by the Data-Translator controller as a subcarrier transport mechanism for interaction, such as, but not limited to: multicast, TCP/IP, UDP, unicast, and/or the like.

Information Server

An information server component 3716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Data-Translator controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Data-Translator database 3719, operating systems, other program components, user interfaces, Web browsers, and/or the like.

Access to the Data-Translator database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Data-Translator. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Data-Translator as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 3717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Data-Translator enabled nodes. The combined application may be nugatory on systems employing standard Web browsers.

Mail Server

A mail server component 3721 is a stored program component that is executed by a CPU 3703. The mail server may be a conventional Internet mail server such as, but not limited to sendmail, Microsoft Exchange, and/or the like. The mail server may allow for the execution of program components through facilities such as ASP, ActiveX, (ANSI) (Objective−) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Data-Translator.

Access to the Data-Translator mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3722 is a stored program component that is executed by a CPU 3703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3720 is a stored program component that is executed by a CPU 3703, cryptographic processor 3726, cryptographic processor interface 3727, cryptographic processor device 3728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Data-Translator may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Data-Translator component to engage in secure transactions if so desired. The cryptographic component facilitates the secure accessing of resources on the Data- Translator and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Data-Translator Database

The Data-Translator database component 3719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Data-Translator database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Data-Translator database is implemented as a data-structure, the use of the Data-Translator database 3719 may be integrated into another component such as the Data-Translator component 3735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3719 includes several tables 3719*a-s*. A ClientProgram table 3719*a* may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. A Sales table 3719*b* may include fields such as, but not limited to: SalesID, SalesName, SalesCode, StartDate, EndDate, CreatedBy, CreatedDate, UpdatedBy, UpdatedDate, TS, and/or the like. A ProgramType table 3719*c* may include fields such as, but not limited to: ProgramTypeID, ProgramTypeName, StartDate, EndDate, CreatedBy, CreatedDate, UpdatedBy, UpdatedDate, TS, and/or the like. A BusinessType table 3719*d* may include fields such as, but not limited to: BusinessTypeID, BusinessTypeCode, BusinessTypeName, StartDate, EndDate, CreatedBy, CreatedDate, UpdatedBy, UpdatedDate, TS, and/or the like. A ClientProgramHistory table 3719*e* may include fields such as, but not limited to: ProgramHistoryID, OldProgramCode, ChangeDate, EndDate, CreatedBy, CreatedDate, UpdatedBy, UpdatedDate, TS, ProgramID (FK), and/or the like. A Country table 3719*f* may include fields such as, but not limited to: CountryID, CountryName, CountryCode, StartDate, EndDate, CreatedBy, CreatedDate, UpdatedBy, UpdatedDate, TS, and/or the like. A LegalEntity table 3719*g* may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. A Client table 3719*h* may include fields such as, but not limited to: ClientID, ClientName, StartDate, EndDate, CreatedBy, CreatedDate, UpdatedBy, UpdatedDate, TS, CountryID (FK), VerticalID (FK)and/or the like. A Vertical table 3719*i* may include fields such as, but not limited to: VerticalID, VerticalName, VerticalCode, StartDate, EndDate, CreatedBy, CreatedDate, UpdatedBy, UpdatedDate, TS, and/or the like. A DepartmentCode table 3719*j* may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. A Department table 3719*k* may include fields such as, but not limited to: DepartmentID, Name, Code, Type, CreatedBy, CreatedDate, TS, and/or the like. A DepartmentHistory table 3719l may include fields such as, but not limited to: DepartmentHistoryID, DepartmentFullName, DepartmentCode, DepartmentID, ParentDepartmentID, ChangedDepartmentID, ChangedDate, StartDate, EndDate, CreatedBy, CreatedDate, UpdatedBy, UpdatedDate, TS, and/or the like. A Location table 3719*m* may include fields such as, but not limited to: LocationID, LocationName, LocationCode, StartDate, EndDate, CreatedBy, CreatedDate, UpdatedBy, UpdatedDate, TS, CountryID (FK), and/or the like. A Class table 3719*n* may include fields such as, but not limited to: ClassID, ClassName, ClassCode, StartDate, EndDate, CreatedBy, CreatedDate, UpdatedBy, UpdatedDate, TS, and/or the like. A SubClass table 3719o may include fields such as, but not limited to: SubClassID, SubClassName, SubClassCode, StartDate, EndDate, CreatedBy, CreatedDate, UpdatedBy, UpdatedDate, TS, ClassID (FK), SubClassTypeID (FK), and/or the like. An Assignment table 3719*p* may include fields such as, but not limited to: AssignmentID, StartDate, EndDate, CreatedBy, CreatedDate, UpdatedBy, UpdatedDate, TS, ProgramID (FK), DepartmentCodeID (FK), and/or the like. An Employee table 3719*q* may include fields such as, but not limited to: UserID, GUID, UserName, Email, SubTitleID, SubFunctionID, ISOwner, StartDate, EndDate, CreatedBy, CreatedDate, UpdatedBy, UpdatedDate, TS, TitleID (FK), FunctionID (FK), DepartmentCodeID, and/or the like. A Universal Data Library table 3719*r* may include fields such as, but not limited to: variable_ID, family, subfamily, field_name, display_name, type, category, used_by, associated_database(s), associated_table(s), associated_field(s), reformatting_instruction(s), value_combination_instruction(s), and/or the like. A Data Transaction table 3719*s* may include fields such as, but not limited to: transaction_ID, variable_ID(s), schedule and/or trigger_condition(s), data_repository ID, data_repository_address, report_type, data_layout and/or data_configuration, file_type, file_name, file_password, program_code, department_code, limiter, chooser, and/or the like. A Consumer Contact History table 3019*t* may include fields such as, but not limited to: Consumer_ID, PhoneNumber, ConsumerDemog, ContactHistory, CreditHistory, PaymentHistory, DebtAmount, DebtTerm, and/or the like. A Phones table 3719*u* may include fields such as, but not limited to: Consumer_ID, Client_ID, PhoneNumber, ContactHistory, PhoneNumberSource, and/or the like. A Strategy table 3019*v* includes fields such as, but not limited to: Consumer_ID, PhoneNumber, ConsumerProbContact, ConsumerM30, ConsumerMaxCash, ConsumerProbCure, PriorityWieght, TransferCondition, and/or the like. One or more of the tables discussed above may support and/or track multiple entity accounts on a Data-Translator.

In one embodiment, the Data-Translator database may interact with other database systems. For example, employing a distributed database system, queries and data access by search Data-Translator component may treat the combination of the Data-Translator database, an integrated data security layer database as a single database entity.

In one embodiment, user programs may contain various user interface primitives, which may serve to update the Data-Translator. Also, various accounts may require custom database tables depending upon the environments and the types of clients the Data-Translator may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3719*a-s*. The Data-Translator may be configured to keep track of various settings, inputs, and parameters via database controllers.

The Data-Translator database may communicate to and/or with other components in a component collection, including itself, and/or facilities of the like. Most frequently, the Data-Translator database communicates with the Data-Translator component, other program components, and/or the like. The database may contain, retain, and provide information regarding other nodes and data.

The Data-Translators

The Data-Translator component 3735 is a stored program component that is executed by a CPU. In one embodiment, the Data-Translator component incorporates any and/or all combinations of the aspects of the Data-Translator that was discussed in the previous figures. As such, the Data-Translator affects accessing, obtaining and the provision of information, services, transactions, and/or the like across various communications networks.

The Data-Translator component enables the management of enterprise and human resources, the provision of tailored and/or personalized computing experiences, massively scalable monitoring and regulation of personnel, efficient collection, organization, distribution, and presentation of enterprise data, and/or the like and use of the Data-Translator.

The Data-Translator component enabling access of information between nodes may be developed by employing standard development tools and languages such as, but not limited to: Apache components, Assembly, ActiveX, binary executables, (ANSI) (Objective–) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Data-Translator server employs a cryptographic server to encrypt and decrypt communications. The Data-Translator component may communicate to and/or with other components in a component collection, including itself, and/or facilities of the like. Most frequently, the Data-Translator component communicates with the Data-Translator database, operating systems, other program components, and/or the like. The Data-Translator may contain, communicate, generate, obtain, and/or provide program component, system, user, and/or data communications, requests, and/or responses.

Distributed Data-Translators

The structure and/or operation of any of the Data-Translator node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Data-Translator controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/ or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be mData-Translator without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. An automated, data integrating, processor-implemented method, comprising:

accessing a database of consumer information; obtaining information of at least one consumer account from the accessed database;

generating a list of updated account information based on the obtained information, comprising:

obtaining a timestamp of the obtained information, forming a query based on the timestamp of the obtained information, determining what information was updated after the timestamp, and storing the information updated after the timestamp in the list of updated account information;

storing the obtained information of the at least one consumer account in temporary memory space;

querying a list of existing consumer accounts based on the obtained information of the at least one consumer account;

if the obtained information of the at least one consumer account matches with an existing consumer account, storing the obtained information of the at least one consumer associated with the matched consumer account;

if the obtained information of the at least one consumer account does not match with any existing consumer account, creating a new consumer account based on the obtained information of the at least one consumer account;

receiving a data report specification including at least a limiter and a chooser;

generating a database query statement based on the chooser;

querying tables in a database associated with the limiter using the database query statement;

retrieving at least one data value corresponding to the chooser based on the querying the tables; and generating a report comprising the at least one data value.

2. The method of claim 1, wherein the accessed database may be any of: an external client database, a third party data service, and an internal database storing consumer interaction history.

3. The method of claim 2, wherein the consumer information is stored in the database based on at least one universal variable.

4. The method of claim 3, wherein the universal variable may be consumer demographic information.

5. The method of claim 1, wherein the timestamp indicates a time of last data synchronization with the accessed database.

6. The method of claim 1, wherein the query is formed based on a universal variable associated with the at least one consumer account.

7. The method of claim 1, further comprising:
releasing the temporary memory space after data integration is finished.

8. The method of claim 1, wherein the automated data integrating is periodically scheduled.

9. The method of claim 1, further comprising:
generate a list of updated consumer accounts;
sending the generated list to a third party entity for verification;
receiving an indication of match result from the third party entity; and
for every updated account on the list:
deleting the account if the account does not exist in the third party record,
storing the account if the account exists in the third party record.

10. The method of claim 9, further comprising:
receiving at least one phone number from the third party entity; and
storing the at least one phone number in a phone buffer.

11. The method of claim 9, wherein the third party entity is a credit report company.

12. The method of claim 1, further comprising:
periodically checking updates of a stored record of phone numbers; and
sending an updated phone number record to a consumer scoring module.

13. The method of claim 10, further comprising:
receiving information of a consumer associated with the at least one phone number from the third party; and
storing the information associated with consumer.

14. The method of claim 13, wherein the received information comprises consumer credit history.

15. An automated, data integrating, processor-accessible medium, comprising:
a plurality of processing instructions stored in the medium and issuable by a processor to:
access a database of consumer information;
obtain information of at least one consumer account from the accessed database;
generate a list of updated account information based on the obtained information, comprising:
obtain a timestamp of the obtained information,
form a query based on the timestamp of the obtained information,
determine what information was updated after the timestamp, and
store the information updated after the timestamp in the list of updated account information;
store the obtained information of the at least one consumer account in temporary memory space;
query a list of existing consumer accounts based on the obtained information of the at least one consumer account;
if the obtained information of the at least one consumer account matches with an existing consumer account, store the obtained information of the at least one consumer associated with the matched consumer account;
if the obtained information of the at least one consumer account does not match with any existing consumer account, create a new consumer account based on the obtained information of the at least one consumer account;
receive a data report specification including at least a limiter and a chooser;
generate a database query statement based on the chooser;
querying tables in a database associated with the limiter using the database query statement;
retrieving at least one data value corresponding to the chooser based on the querying the tables; and
generate a report comprising the at least one data value.

16. An automated, strategic dialing, processor-implemented system, comprising:
means to access a database of consumer information;
means to obtain information of at least one consumer account from the accessed database;
means to generate a list of updated account information based on the obtained information, comprising:
means to obtain a timestamp of the obtained information,
means to form a query based on the timestamp of the obtained information,
means to determine what information was updated after the timestamp, and
means to store the information updated after the timestamp in the list of updated account information;
means to store the obtained information of the at least one consumer account in temporary memory space;
means to query a list of existing consumer accounts based on the obtained information of the at least one consumer account;
means to if the obtained information of the at least one consumer account matches with an existing consumer account, store the obtained information of the at least one consumer associated with the matched consumer account;
means to if the obtained information of the at least one consumer account does not match with any existing consumer account, create a new consumer account based on the obtained information of the at least one consumer account;
receive a data report specification including at least a limited and a chooser;
generate a database query statement based on the chooser;
query tables in a database associated with the limiter using the database query statement;
retrieve at least one data value corresponding to the chooser based on the querying the tables; and
generate a report comprising the at least one data value.

17. An automated strategic dialing apparatus, comprising:
a memory;
a processor disposed in communication with said memory and configured to issue a plurality of processing instructions stored in the memory, wherein the processor issues instructions to:
access a database of consumer information;
obtain information of at least one consumer account from the accessed database;
generate a list of updated account information based on the obtained information, comprising:
form a query based on a timestamp of the obtained information, and store information updated after the timestamp in the list of updated account information;
store the obtained information of the at least one consumer account in temporary memory space;
query a list of existing consumer accounts based on the obtained information of the at least one consumer account;
if the obtained information of the at least one consumer account matches with an existing consumer account, store the obtained information of the at least one consumer associated with the matched consumer account;
if the obtained information of the at least one consumer account does not match with any existing consumer account, create a new consumer account based on the obtained information of the at least one consumer account;
receive a data report specification including at least a limiter and a chooser;
generate a database query statement based on the chooser;
query tables in a database associated with the limiter using the database query statement;
retrieve at least one data value corresponding to the chooser based on the querying the tables; and
generate a report comprising the at least one data value.

* * * * *